(12) United States Patent
Ogawa

(10) Patent No.: US 7,078,083 B2
(45) Date of Patent: *Jul. 18, 2006

(54) OPTICAL RECORDING FILM, METHOD FOR MANUFACTURING THE SAME, OPTICAL RECORDING MEDIUM, INFORMATION RECORDING/REPRODUCING DEVICE, COMPUTER SYSTEM AND VIDEO SIGNAL RECORDING/REPRODUCING SYSTEM

(75) Inventor: Kazufumi Ogawa, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 757 days.

This patent is subject to a terminal disclaimer.

(21) Appl. No.: 10/153,150

(22) Filed: May 22, 2002

(65) Prior Publication Data

US 2003/0003381 A1    Jan. 2, 2003

(30) Foreign Application Priority Data

May 29, 2001    (JP)    .............................. 2001-161268

(51) Int. Cl.
    *B32B 3/02*    (2006.01)
(52) U.S. Cl. ................ 428/64.1; 428/64.4; 430/270.11
(58) Field of Classification Search ............... 428/64.4; 430/270.11
    See application file for complete search history.

(56) References Cited

U.S. PATENT DOCUMENTS

| | | | | |
|---|---|---|---|---|
| 5,049,428 A | * | 9/1991 | Kanno et al. ............... | 428/64.7 |
| 5,372,851 A | * | 12/1994 | Ogawa et al. ............ | 427/255.7 |
| 5,397,597 A | * | 3/1995 | Soga et al. ............... | 427/255.6 |
| 5,447,778 A | * | 9/1995 | Ohtake et al. ........... | 428/195.1 |
| 5,468,551 A | * | 11/1995 | Ogawa ........................ | 428/333 |
| 6,686,017 B1 | * | 2/2004 | Ogawa ....................... | 428/64.1 |
| 6,706,359 B1 | * | 3/2004 | Mino et al. ................ | 428/64.1 |

FOREIGN PATENT DOCUMENTS

| | | |
|---|---|---|
| EP | 0 436 228 | 7/1991 |
| EP | 0 445 534 | 9/1991 |
| EP | 1 063 645 | 12/2000 |
| JP | 5-241151 | 9/1993 |
| JP | 11-167114 | 6/1999 |
| JP | 2001-6208 | 1/2001 |

OTHER PUBLICATIONS

European Search Report.

* cited by examiner

*Primary Examiner*—Elizabeth Mulvaney
(74) *Attorney, Agent, or Firm*—Hamre, Schumann, Mueller & Larson, P.C.

(57) ABSTRACT

An optical recording film in the form of a monomolecular layer, includes chemisorptive molecules that are chemically bonded by covalent bonding to a surface of a substrate. The optical recording film has the property that, when irradiated with polarized light, a long axis orientation of the chemisorptive molecules is changed to a direction in which the polarized light is irradiated. A reflective film may be formed on the substrate surface. For the chemisorptive molecules it is possible to use $CH_3-COO-C_6H_4-(CH_2)_6-SiCl_3$, for example. The molecules undergo a dehydrochlorination with active hydrogen in the base material surface, and are chemically bonded to the base material surface by covalent bonding. Thus, an erasable or a write-once optical recording medium of high density can be provided by chemisorption without necessitating vacuum vapor deposition to form the recording layer.

40 Claims, 28 Drawing Sheets

Initialization State

After Recording    Before Recording

Initialization State

After Recording    Before Recording

Initialization State

After Recording    Before Recording

Initialization State

After Recording    Before Recording

Initialization State

After Recording    Before Recording

Initialization State

After Recording Before Recording

OPTICAL RECORDING FILM, METHOD FOR MANUFACTURING THE SAME, OPTICAL RECORDING MEDIUM, INFORMATION RECORDING/REPRODUCING DEVICE, COMPUTER SYSTEM AND VIDEO SIGNAL RECORDING/REPRODUCING SYSTEM

FIELD OF THE INVENTION

The present invention relates to an optical recording film, a method for manufacturing the same, an optical recording medium, an information recording/reproducing device, a computer system and a video signal recording/reproducing system.

More specifically, the present invention relates to a monomolecular optical recording film, made by bonding and fixing a cluster of chemisorptive molecules to the surface of a substrate, on which information can be recorded by irradiating polarized or unpolarized light to change the long-axis direction of the chemisorptive molecules, as well as a method for manufacturing the same, an optical recording medium, an information recording/reproducing device, a computer system and a video signal recording/reproducing system.

BACKGROUND OF THE INVENTION

In recent years, the amount of electronic information has risen dramatically, and there is a need for the development of low-cost high-capacity recording media. In particular, low-cost erasable recording media are in high demand as auxiliary storage media for computers. However, all the technologies that are currently used for high-capacity erasable recording media are based on magnetic recording, optical recording or optomagnetic recording, and all use vacuum vapor deposition to form the recording layer, so that there is the problem of high manufacturing costs.

SUMMARY OF THE INVENTION

It is thus an object of the present invention to provide low-cost optical recording media by developing an erasable optical recording medium and a write-once optical recording medium that can be manufactured by a process not requiring vacuum vapor deposition for the formation of the recording layer, and on which information can be recorded at high densities. It is another object of the present invention to provide an information recording/reproducing device for the recording and reproducing of information on this optical recording medium, as well as a computer system and a video information recording/reproducing system provided with the optical recording medium and an information recording/reproducing device.

To achieve these objects, an optical recording film in accordance with the present invention is an optical recording film in form of a monomolecular layer, comprising chemisorptive molecules that are chemically bonded by covalent bonding to a surface of a substrate, wherein the optical recording film has the property that, when irradiated with polarized light, a long axis orientation of the chemisorptive molecules is changed to a direction in which the polarized light is irradiated. The molecules in the monomolecular layer may independent from one another or they may be linked to one another by crosslinking or polymerization.

A method for manufacturing an optical recording film in accordance with the present invention includes: providing a substrate including active hydrogen at its surface, providing a chemisorptive solution, by mixing in a non-aqueous organic solvent chemisorptive molecules having at one end a reactive group that chemically bonds with the active hydrogen at the surface of the substrate, and having the property that, when irradiated with polarized light for molecule orientation, a long axis orientation of the chemisorptive molecules is changed into a specific direction depending on a polarization direction of the polarized light; and forming the optical recording film in form of a monomolecular layer chemically bonded to the surface of the substrate by bringing the chemisorptive solution and the substrate into contact and causing a low molecular elimination reaction between the active hydrogen in the substrate surface and the reactive groups of the chemisorptive molecules. Herein, "low molecular elimination reaction" refers to a dehydrohalogenation reaction, a dealcoholization reaction (wherein the alcohol has a carbon number of 1 to 3) or a deisocyanation reaction.

An optical recording medium in accordance with the present invention includes an optical recording film in form of a monomolecular layer including chemisorptive molecules that are chemically bonded by covalent bonding to a surface of a substrate, wherein the optical recording film has the property that, when irradiated with polarized light, a long axis orientation of the chemisorptive molecules is changed to a direction in which the polarized light is irradiated.

An information recording/reproducing device in accordance with the present invention records/reproduces information on an optical recording medium that includes an optical recording film in form of a monomolecular layer comprising chemisorptive molecules that are chemically bonded by covalent bonding to a surface of a medium substrate, wherein the optical recording film has the property that, when irradiated with polarized light, a long axis orientation of the chemisorptive molecules is changed to a direction in which the polarized light is irradiated. The information recording/reproducing device includes:

a signal input/output portion for input and output, with respect to an external device, of operation instruction signals and information signals resulting from converting information into electrical signals;

a recording light emission portion for emitting recording light that writes information elements by controlling the long axis orientation of the chemisorptive molecules constituting the recording layer, in accordance with the information signals from the signal input/output portion;

a reference light emission portion for emitting reference light that does not change the long axis orientation of the chemisorptive molecules constituting the recording layer;

an information element detecting portion that, upon irradiation of reference light onto the recording layer, detects differences in an intensity or differences in an intensity distribution of polarized light components of the reference light that has passed through the recording layer, those differences being caused by differences between the information elements, and outputs a predetermined electrical signal in accordance with a result of this detection to the signal input/output portion;

a position control driving portion for selectively irradiating the recording light and the reference light onto predetermined positions of the optical recording medium; and a control circuit portion for controlling-the recording operation by coordinating the recording light emission portion and the position control driving portion, and controlling the reproduction operation by coordinating the reference light emission portion, the position control driving portion and the information element detecting portion.

A computer system in accordance with the present invention includes an arithmetic processing device including a main memory, an auxiliary storage device, an input device, an output device, and a communication control device for controlling communication between those devices;

wherein, upon a recording instruction from the input device, input information from the input device is sent via the arithmetic processing device to the auxiliary storage device as recording information signals resulting from converting input information into electrical signals, and the sent recording information signals are recorded on the auxiliary storage device;

wherein, upon a reproduction instruction from the input device, the information recorded in the auxiliary storage device is read out as reproduction information signals from the auxiliary storage device, sent via the arithmetic processing device to the output device, and a reproduction based on the sent reproduction information signals is carried out with the output device.

The auxiliary storage device is a device for recording and reproducing information on an optical recording medium that includes an optical recording film in form of a monomolecular layer comprising chemisorptive molecules that are chemically bonded by covalent bonding to a surface of a medium substrate, wherein the optical recording film has the property that, when irradiated with polarized light, a long axis orientation of the chemisorptive molecules is changed to a direction in which the polarized light is irradiated, and the auxiliary storage device comprises:

an information storage portion comprising said optical recording medium;

a signal input/output portion for input and output, with respect to an external device, of operation instruction signals and information signals resulting from converting information into electrical signals;

a recording light emission portion for emitting recording light that writes information elements by controlling the long axis orientation of the chemisorptive molecules constituting the recording layer, in accordance with the information signals from the signal input/output portion;

a reference light emission portion for emitting reference light that does not change the long axis orientation of the chemisorptive molecules constituting the recording layer;

an information element detecting portion that, upon irradiation of reference light onto the recording layer, detects differences in an intensity or differences in an intensity distribution of polarized light components of the reference light that has passed through the recording layer, those differences being caused by differences between the information elements, and outputs a predetermined electrical signal in accordance with a result of this detection to the signal input/output portion;

a position control driving portion for selectively irradiating the recording light and the reference light onto predetermined positions of the optical recording medium; and a control circuit portion for controlling the recording operation by coordinating the recording light emission portion and the position control driving portion, and controlling the reproduction operation by coordinating the reference light emission portion, the position control driving portion and the information element detecting portion.

A video recording/reproducing system in accordance with the present invention includes a video signal input/output control device for controlling input/output of video signals, a video storage device, a video output device, and a control instruction input device for sending input/output control instructions to the video signal input/output control device;

wherein, upon a recording instruction from the control instruction input device, a video signal from an external video signal sender is sent via the video signal input/output control device to the video storage device, and video information is recorded on the video storage device based on the sent video signals;

wherein, upon a reproduction instruction from the control instruction input device, the video information recorded in the video storage device is read out as reproduction video signals, sent via the video signal input/output control device to the video output device, and a reproduction based on the sent reproduction video signals is carried out with the video output device.

The video storage device is an information recording/reproducing device for recording/reproducing video information on an optical recording medium that includes an optical recording film in the form of a monomolecular layer comprising chemisorptive molecules that are chemically bonded by covalent bonding to a surface of a medium substrate, wherein the optical recording film has the property that, when irradiated with polarized light, a long axis orientation of the chemisorptive molecules is changed to a direction in which the polarized light is irradiated. The video storage device includes:

a video information storage portion comprising said optical recording medium;

a signal input/output portion for input and output, with respect to an external device, of operation instruction signals and electrical signals resulting from converting information into electrical signals;

a recording light emission portion for emitting recording light that writes information elements by controlling the long axis orientation of the chemisorptive molecules constituting the recording layer, in accordance with the information signals from the signal input/output portion;

a reference light emission portion for emitting reference light that does not change the long axis orientation of the chemisorptive molecules constituting the recording layer;

an information element detecting portion that, upon irradiation of reference light onto the recording layer, detects differences in an intensity or differences in an intensity distribution of polarized light components of the reference light that has passed through the recording layer, those differences being caused by differences between the information elements, and outputs a predetermined electrical signal in accordance with a result of this detection to the signal input/output portion;

a position control driving portion for selectively irradiating the recording light and the reference light onto predetermined positions of the optical recording medium; and a control circuit portion for controlling the recording operation by coordinating the recording light emission portion and the position control driving portion, and controlling the reproduction operation by coordinating the reference light emission portion, the position control driving portion and the information element detecting portion.

BRIEF DESCRIPTION OF THE DRAWINGS

FIG. 3A is a cross-sectional view of an optical recording medium in which the optical recording layer is formed on an optically reflective base material. FIG. 3B is a cross-sectional view of an optical recording medium in which an optically reflective film and an optical recording film are formed on a base material. FIG. 3C is a cross-sectional view of an optical recording medium in which an optically reflective film and an optically transmissive coating are formed on the base material, and the optical recording film is formed on top of that. FIG. 3D is a cross-sectional view of an optical recording medium in which an optically reflective film is formed on the base material, and the recording layer is formed partially on top of the optically reflective film. FIG. 3E shows an optical recording medium in which an optically reflective film is formed on the base material, and an optical recording layer 2 is formed over the entire top of the optically reflective film 5.

FIG. 4A is a cross-sectional view of an optical recording medium in which the optical recording film is formed directly on the surface of an optically transmissive base material. FIG. 4B is a cross-sectional view of an optical recording medium in which a transparent film is formed on a base material, and the optical recording film is formed on top of the optically transmissive coating. FIG. 4C is a cross-sectional view of an optical recording medium in which the optical recording layer is partially formed directly on the optical transmissive base material.

FIG. 7A shows a method for rubbing the medium substrate in one direction. FIG. 7B shows a method for rubbing the medium substrate in a circumferential direction. FIG. 7C shows a method for rubbing the medium substrate at a uniform rubbing density in a circumferential direction.

FIG. 8A is a schematic plan view showing information recording unit regions arranged in groups of concentric circles. FIG. 8B is a schematic plan view showing information recording unit regions arranged in a spiral shape.

FIG. 9A is a schematic perspective view showing a method for initialization with a polarizer provided with a photo-mask of a predetermined pattern, and FIG. 9B is a schematic perspective view showing a method for initialization by successively changing the location irradiated with light.

FIG. 10A is a plan view showing a recording layer that has been partially initialized in a predetermined orientation state. FIG. 10B is a plan view showing a recording layer that has been completely initialized in an arbitrary orientation state. FIG. 10C shows a recording layer 2 that has been completely initialized in a predetermined orientation state.

FIG. 11A is a schematic plan view showing information recording unit regions that are arranged in one straight line in a longitudinal direction. FIG. 11B is a schematic plan view showing information recording unit regions that are arranged in groups of parallel straight lines forming a right angle with the longitudinal direction (lattice point arrangement). FIG. 11C is a schematic plan view showing information recording unit regions that are arranged in groups of parallel straight lines that are tilted at a predetermined angle relative to the longitudinal direction (uni-axially tilted lattice point arrangement). FIG. 11D shows information recording unit regions that are arranged in a triangular waveform made of parallel straight lines tilted at a first predetermined angle relative to the longitudinal direction and parallel straight lines tilted at a second predetermined angle relative to the longitudinal direction. FIG. 11E shows information recording unit regions that are arranged in groups of parallel straight lines that are tilted at a predetermined angle relative to the longitudinal direction (bi-axially tilted lattice point arrangement).

FIG. 12A is a schematic plan view showing a recording layer 2 that has been partially initialized in a predetermined orientation state that follows the longitudinal direction. FIG. 12B is a schematic plan view showing a recording layer 2 that has been completely initialized in a predetermined orientation state that follows the longitudinal direction. FIG. 12C is a schematic plan view showing a recording layer 2 that has been partially initialized in a predetermined orientation state that does not follow the longitudinal direction.

FIG. 15A is a cross-sectional view showing an orientation state with different tilt angles. FIG. 15B is a perspective view showing an orientation state with different orientation directions.

FIG. 16A shows an example of a binary recording, in which the orientation of the chemisorptive molecules constituting the recording layer in the information recording unit regions is taken as the information element. FIG. 16B shows an example of a binary recording, in which the orientation of the chemisorptive molecules constituting the recording layer in the information recording unit regions is taken as the information element. FIG. 16C shows an example of a binary recording on a disk-shaped optical recording medium, in which the orientation of the chemisorptive molecules constituting the recording layer in the information recording unit regions is taken as the information element. FIG. 16D shows an example of a ternary recording in which the area ratio between two kinds of orientations of the chemisorptive molecules constituting the recording layer in the information recording unit regions is taken as the information element.

FIG. 17A shows the initialization state. FIG. 17B shows a state in which binary information has been recorded with a random state and a predetermined orientation state as information elements. FIG. 17C shows a state in which binary information has been recorded with a first predetermined orientation state and a second predetermined orientation state as information elements.

FIG. 18A shows the initialization state. FIG. 18B shows a state in which binary information has been recorded with the initialization state (predetermined orientation state) and a random state as information elements. FIG. 18C shows a state in which binary information has been recorded with a predetermined orientation state whose orientation is different from the initialization state and a random state as information elements. FIG. 18D shows a state in which binary information has been recorded with the initialization state (predetermined orientation state) and a predetermined orientation state whose orientation is different from the initialization state as information elements. FIG. 18E shows a state in which binary information has been recorded with a first predetermined orientation state whose orientation is different from the initialization state and a second predetermined orientation state whose orientation is different from the initialization state.

FIG. 19A shows the initialization state. FIG. 19B shows a state in which binary information has been recorded with the initialization state (predetermined orientation state) and a random state as information elements. FIG. 19C shows a state in which binary information has been recorded with a predetermined orientation state whose orientation is different from the initialization state and a random state as information elements. FIG. 19D shows a state in which binary information has been recorded with the initialization state (predetermined orientation state) and a predetermined orientation state whose orientation is different from the initialization state as information elements. FIG. 19E shows a state in which binary information has been recorded with a first predetermined orientation state whose orientation is different from the initialization state and a second predetermined orientation state whose orientation is different from the initialization state.

FIG. 20A shows the initialization state. FIG. 20B shows a state in which ternary information has been recorded with a first predetermined orientation state and a second predetermined orientation state as information elements. FIG. 20C shows a state in which ternary information has been recorded with a first predetermined orientation state, a second predetermined orientation state, and a third predetermined orientation state as information elements.

FIG. 21A shows the initialization state. FIG. 21B shows a state in which ternary information has been recorded with the initialization (first predetermined orientation state), a random state, and a second predetermined orientation state as information elements. FIG. 21C shows a state in which ternary information has been recorded with a random state, a first predetermined orientation state, and a second predetermined orientation state as information elements. FIG. 21D shows a state in which ternary information has been recorded with the initialization state (first predetermined orientation state), a second predetermined orientation state and a third predetermined orientation state as information elements. FIG. 21E shows a state in which ternary information has been recorded with a first predetermined orientation state, a second predetermined orientation state and a third predetermined orientation state as information elements.

FIG. 22A shows the initialization state. FIG. 22B shows a state in which ternary information has been recorded with the initialization state (first predetermined orientation state), a random state and a second predetermined orientation state as information elements. FIG. 21C shows a state in which ternary information has been recorded with a random state, a first predetermined orientation state, and a second predetermined orientation state as information elements. FIG. 22D shows a state in which ternary information has been recorded with the initialization state (first predetermined orientation state), a second predetermined orientation state and a third predetermined orientation state as information elements. FIG. 22E shows a state in which ternary information has been recorded with a first predetermined orientation state, a second predetermined orientation state and a third predetermined orientation state as information elements.

In FIG. 25A, the recording light and the reference light are irradiated from the side of the recording layer. In FIG. 25B, the recording light is irradiated from the side of the recording layer, and the reference light is irradiated from the side of the medium substrate. In FIG. 25C, the recording light is irradiated from the side of the medium substrate 3, and the reference light is irradiated from the side of the recording layer. In FIG. 25D, the recording light and the reference light are irradiated from the side of the medium substrate.

FIG. 26A is a perspective view of a light emission portion emitting unpolarized light and one kind of polarized light. FIG. 26B is a perspective view of a light emission portion emitting unpolarized light and several kinds of polarized light of different polarization directions by using a plurality of shiftable polarizers. FIG. 26C is a perspective view of a light emission portion emitting unpolarized light and several kinds of polarized light of different polarization directions by using a polarizer that is shiftable and rotatable or pivotable.

FIG. 27A illustrates the use of a square polarizer, and FIG. 27B illustrates the use of a polarizer provided with holes.

FIG. 28A shows an information element detecting portion having a rotatable or pivotable polarizer and an optical sensor. FIG. 28B shows an information element detecting portion having a plurality of shiftable polarizers and an optical sensor. FIG. 28C shows an information element detecting portion having a plurality of optical sensors provided with polarizers on the side on which light is incident.

FIG. 31A is a schematic cross-sectional view illustrating a method of writing in accordance with a recording signal. FIG. 31B is a schematic cross-sectional view illustrating the state after writing. FIG. 31C is a schematic plan view illustrating the state after writing.

DETAILED DESCRIPTION OF THE INVENTION

Figure 1:
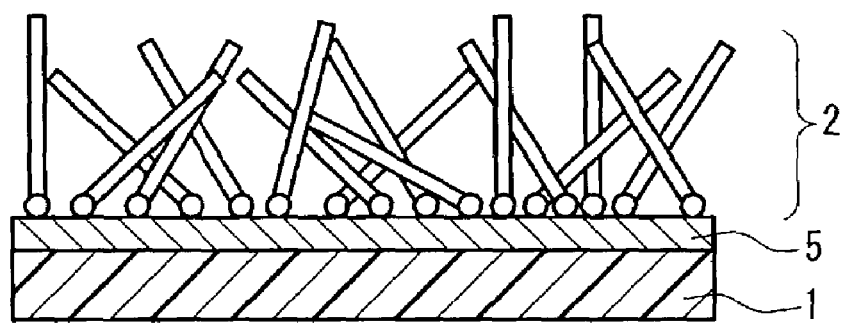
FIG. 1 shows a cross-sectional view, magnified to the molecular level, of an optical recording film in the form of a monomolecular film formed on a substrate.

The present invention provides an erasable optical recording film with which information can be recorded in an erasable manner by changing the long-axis orientation of chemisorptive molecules constituting this optical recording film. With polarized orientation light, it is possible to record on this optical recording film information indicating that polarized orientation light has been irradiated, or information indicating the place where the polarized orientation light has been irradiated, or the polarization direction of the irradiated polarized light. Moreover, controlling the long-axis orientation of the chemisorptive molecules by irradiating the optical recording film systematically with polarized orientation light makes it possible to record information representing characters or graphics or digitized information.

When irradiated with polarized orientation light, the chemisorptive molecule group constituting the optical recording film has a characteristic orientation direction, and it seems that this orientation direction depends on the molecular structure of the chemisorptive molecules and the film structure of the optical recording film. In general, this orientation direction defines a certain angle with the propagation direction of the polarization direction of the polarized orientation light within the plane formed by the polarization direction and the propagation direction of the polarized orientation light. For the chemisorptive molecules used in the present invention, it is also possible to use molecules that are not oriented within the plane formed by the polarization direction and the propagation direction of the polarized orientation light.

Throughout this specification, "light" means polarized or unpolarized light. "Polarized light" means completely linearly polarized light, completely elliptically polarized light with high ellipticity, or partially polarized light with a high degree of polarization (polarization ratio) including completely linearly polarized light or completely elliptically polarized light with high ellipticity. "Unpolarized light" means completely unpolarized light or partially polarized light with a low polarization ratio including linearly polarized light or elliptically polarized light.

Throughout this specification, "polarization direction" means, in the case of completely linearly polarized light or partially polarized light with a high polarization degree including linearly polarized light with a high polarization degree (also referred to inclusively as "linear polarized light), the direction of the line of intersection between the plane perpendicular to the propagation direction (forward direction) of that light and the oscillation plane of the E-vector of the completely linearly polarized light. In the case of elliptically polarized light and partially polarized light including completely elliptically polarized light, "polarization direction" means the direction of the major elliptical axis (long axis direction) given by the E-vector of the completely elliptically polarized light projected onto the plane perpendicular to the propagation direction.

The present invention provides an erasable optical recording film on which information can be recorded by changing the long axis direction of the chemisorptive molecules constituting the optical recording film. On this optical recording film, it is possible to record information indicating that polarized orientation light or unpolarized light absorbed by the chemisorptive molecules has been irradiated, or information indicating the place where the polarized orientation light or unpolarized light has been irradiated, or the polarization direction of the irradiated polarized light. Moreover, controlling the long-axis orientation of the chemisorptive molecules by irradiating the optical recording film systematically with polarized orientation light or unpolarized light makes it possible to record information representing characters or graphics or digitized information.

The optical recording molecules of the present invention are straight-chained linear polymers, so that they have a large dipole moment within the chemisorptive molecules, and information can be recorded and reproduced with high sensitivity. Furthermore, since the spatial spread of the substrate plane of the chemisorptive molecules and the horizontal direction is small, a monomolecular recording film with a high molecule density is achieved.

If the chemisorptive molecules constituting the erasable optical recording film include an optically absorbing functional group that absorbs light of a certain wavelength, then the long axis orientation of the chemisorptive molecules can be oriented using light of a wavelength that is absorbed by the optically absorbing functional group. Also, the irradiation energy necessary to change the long axis orientation of the chemisorptive molecules to a random orientation can be reduced. The necessary irradiation energy can be further reduced using light near the absorption peak wavelength in the optical absorption spectrum of the optically absorbing functional group.

If the optically absorbing functional group in the erasable optical recording film is a UV light absorbing functional group that absorbs light of a wavelength in the UV region, then an erasable optical recording film with recording permanency can be provided, in which the writing efficiency is high, and the orientation state is not easily lost even after repeated reproductions. Furthermore, the possibility that UV light is irradiated onto the optical recording medium during indoor use and storage is low, so that convenient handling is possible.

If the UV light absorbing functional group in the erasable optical recording film is an aryl backbone group, an arylene backbone group or a carbonyl group, then information can be recorded with light of a low energy density.

If, in an optical recording film of monomolecular form including a cluster of chemisorptive molecules having the above-described photoreactive functional group, which is chemically bonded to the surface of a substrate, the optical recording film further has the property that, when irradiated with polarized reaction light causing a reaction with the photoreactive functional group, the long axis orientation of the chemisorptive molecules changes to a specific direction determined by the polarization direction and the propagation direction of the polarized reaction light, and the long axis direction of the chemisorptive molecules is fixed, then a write-once optical recording medium recording information by changing the long axis direction of the chemisorptive molecules constituting the optical recording film can be achieved. The long axis orientation of the chemisorptive molecules that are chemically reacted by irradiation with the polarized reaction light is permanent, and cannot be reverted to its original state. Consequently, a write-once optical recording medium with superior recording permanency is achieved.

In this write-once optical recording film, the photoreactive functional group is a photopolymerizable functional group, and, when irradiated with the polarized reaction light, the long axis orientation of the chemisorptive molecules constituting the optical recording film is oriented in the specific direction and the specific direction is fixed by polymerizing or crosslinking the chemisorptive molecules with one another. That is to say, a write-once optical recording film is achieved, in which the long axis orientation of the chemisorptive molecules constituting the optical recording film can be fixed by irradiation of polarized reaction light.

If, in this write-once optical recording film, the photopolymerizable functional group is a UV polymerizable functional group that reacts under light of a wavelength in the UV region, then the long axis orientation of the chemisorptive molecules does not change even when after repeated reproduction, and an erasable optical recording film with high recording permanency can be provided. Furthermore, the possibility that UV light is irradiated onto the optical recording film during indoor use and storage is low, so that convenient handling is possible.

If, in this write-once optical recording film, the UV polymerizable functional group is a chalcone backbone group, a cinnamate backbone group or a diacetylene backbone group, then an optical recording can be carried out using polarized reaction light of low energy density, and a write-once optical recording film allowing optical recordings with high permanency is achieved.

By forming the optical recording film directly on the substrate surface, a low-cost optical recording film can be formed.

If the base material for the optical recording film is ceramic, glass or a synthetic resin, then an optical recording film that shows great stability can be provided. Furthermore, it can be handled easily and is thus suitable for many applications.

If the substrate is made of a base material and a primer layer coating formed on the substrate, and the optical recording film is formed on a surface of the primer layer coating, then the optical recording film can be formed on any base material, which increases the degree of freedom with which the base material can be selected.

With the above-described method, an erasable optical recording film can be manufactured that records information in an erasable manner using polarized orientation light, and the chemisorptive molecules easily can be chemically bonded to the substrate surface. This film is an erasable optical recording film with high resistance against exfoliation.

If in the above-described method the chemisorptive molecules include an optically absorbing functional group that absorbs light of a certain wavelength, then an optical recording medium can be manufactured that allows recording with light of a low energy density.

If in the above-described method the optically absorbing functional group is a UV light absorbing functional group that absorbs light of a wavelength in the UV region, then an optical recording film can be manufactured that has a high writing efficiency, a high recording permanency and is easy to handle.

If in the above-described method chemisorptive molecules are used that have an aryl backbone group, an arylene backbone group or a carbonyl group as the UV light absorbing functional group, then an optical recording film can be manufactured that allows recording with light of a low energy density, that has a high recording permanency and that is easy to handle.

Furthermore, since the optical recording film can be oriented with polarized orientation light, the optical recording film can be initialized to various states, thus expanding its scope of utility.

If in the above-described method the photoreactive functional groups in the chemisorptive molecules are polymerizable functional groups, then an optical recording film can be manufactured in which irradiation with polarized reaction light can orient the long axis orientation of the chemisorptive molecules constituting the optical recording film in a specific direction and fix the orientation by polymerization or crosslinking.

If in the above-described method the photopolymerizable functional group is a UV polymerizable functional group that reacts under light of a wavelength in the UV region, then an optical recording film can be manufactured that has a high writing efficiency, a high recording permanency and that is easy to handle.

If in the above-described method the UV polymerizable functional group is a chalcone backbone group, a cinnamate backbone group or a diacetylene backbone group, then an optical recording film can be manufactured that allows recording with light of a low energy density, that has a high recording permanency and that is easy to handle.

In the chemisorptive solution preparation step of the above-described method, there may be 1 to 3 functional groups to be chemically bonded. Si has four bonding sites, so that there may be 1 to 3 functional groups reacting with the active hydrogen of the surface of the base material, and 1 to 3 optically absorbing functional groups.

However, the functional group X that reacts with the active hydrogen of the surface of the base material is generally a halogen atom, an alkoxyl group or an isocyanate group. If the functional group X is an alkoxyl group, then a dealcoholization reaction with the active hydrogen of the surface of the base material occurs. If the functional group X is a halogen atom, then a dehydrohalogenation reaction with the active hydrogen of the surface of the base material occurs. If the functional group X is an isocyanate group, then a deisocyanation reaction with the active hydrogen of the surface of the base material occurs. Such thin films that are covalently bonded by a low molecular elimination reaction to the surface of the base material are also known as chemisorptive films or "self-assembling films" to the person skilled in the art. In this specification, they are referred to as "chemisorptive films."

A non-aqueous organic solvent is used in the chemisorptive solution preparation step of the above-described method. Thus, it is possible to prevent the hydrolysis of the chemisorptive molecules.

In the above-described method, it is preferable that, after the recording layer formation step, non-adsorbed chemisorptive molecules are rinsed away by immersion in a non-aqueous organic solvent. Thus, a monomolecular film with an unblemished surface can be formed, diffused reflections at the optical recording film surface can be reduced, and an optical recording film with high writing and reading precision can be formed.

In the above-described method, it is also possible to introduce or supply functional groups including active hydrogen to the substrate surface before the recording layer formation step. Thus, if there is no or insufficient active hydrogen at the surface of the base material, then an optical recording film easily can be fabricated by first introducing or supplying functional groups including active hydrogen.

In a pretreatment step of this method, the surface of the substrate can be subjected to a plasma treatment, a corona treatment, an electron beam treatment or a UV light treatment. Thus, it is possible to introduce functional groups including active hydrogen to the substrate surface.

In the recording layer formation step of the above-described method, it is possible to use as the substrate a base material with active hydrogen that includes functional groups having active hydrogen at the base material surface, and to form the optical recording film on the surface of this base material with active hydrogen. Thus, the chemisorptive molecules can be chemisorbed to the medium substrate. Moreover, an organic thin film is formed directly on the base material surface, so that the manufacturing process is simplified.

In the recording layer formation step of the above-described method, it is also possible to use as the substrate a coated base material in which a coating having functional groups including active hydrogen is provided on any base material, and to form the optical recording film on the coating surface. Thus, the optical recording film can be manufactured regardless of the material of the material quality of the base material, and the degree of freedom with which the base material can be selected is increased.

The optical recording medium of the present invention provides an erasable optical recording medium, with which information can be recorded in an erasable manner by changing the long axis orientation of the chemisorptive molecules constituting the recording layer formed on the medium substrate. Information indicating that polarized orientation light has been irradiated or information indicating the location where polarized light has been irradiated or the polarization direction of the polarized light can be recorded on the recording layer with polarized orientation light. Moreover, it is possible to record information representing characters or graphics or digitized information, by controlling the long axis orientation of the chemisorptive molecules through regular irradiation of polarized orientation light onto the recording layer.

In this specification, "medium substrate" means all lower layers onto which the recording layer is formed, and these lower layers may be of a single-layer structure (e.g. in case only a base material such as a substrate is used), or they may be of a multi-layer structure.

The recording medium of the present invention provides an erasable optical recording medium on which digitized information can be recorded. It can be an erasable optical recording medium having a recording layer only at the information recording unit regions on the medium substrate, or an erasable optical recording medium having a recording layer across the entire medium substrate.

Throughout this specification, "information recording unit region" means a region in the recording layer that records one information element. Consequently, if the recording layer is formed only in the information recording unit regions, the information recording unit regions can be recognized. Otherwise, for example if the recording layer is formed across the entire surface of the medium substrate and the entire surface is in the same orientation state, the information recording unit regions cannot be recognized, so that the information recording unit regions are virtual regions into which information elements are written.

Throughout this specification, "information element" refers to the structural elements of the information units when the information has been broken down to its minimal units. More specifically, in conventional binary representations, in which the information units are single bits of information expressed by "0"s and "1"s, those "0"s and "1"s are the information elements. Consequently, any information can be represented by a string of information elements. In accordance with the present invention, not only binary recordings but also recordings of higher base representation are possible. For n-ary recordings, n kinds of different information elements are used.

The optical recording medium of the present invention also provides a write-once optical recording medium on which information can be recorded in a write-once fashion by changing the long axis orientation of the chemisorptive molecules constituting the recording layer formed on the medium substrate and fixing it. A chemical reaction caused by irradiation with polarized reaction light fixes the long axis orientation of the chemisorptive molecules, so that a write-once optical recording medium with superior recording permanency can be attained.

The optical recording medium of the present invention also provides an optical recording medium on which information can be recorded in a write-once fashion by changing the long axis orientation of the chemisorptive molecules forming the recording layer formed on the medium substrate and fixing it. A chemical reaction caused by irradiation with polarized reaction light fixes the long axis orientation of the chemisorptive molecules, so that a write-once optical recording medium with superior recording permanency can be attained. Furthermore, due to their property of being oriented by polarized light, the chemisorptive molecules constituting the recording layer can be oriented by irradiation with polarized orientation light.

If the medium substrate of the optical recording medium is an optically transmissive medium substrate, then the information written into the recording layer can be read out by irradiation with light. In this case, light that has passed through the recording layer and the optically transmissive medium substrate is measured to specify the written information. In the following, this is also referred to as "optically transmissive reading method."

If the optically transmissive coating of the optical recording medium is a silica film or a silicon nitride film, then an optical recording medium provided with an optically transmissive coating with superior transparency can be attained. Thus, it is possible to reduce the changes in the polarized components of polarized light or unpolarized light when passing through the optically transmissive coating.

If the medium substrate of the optical recording medium is an optically reflective medium substrate, then the information written into the recording layer can be read out by irradiation with light. In this case, light that has passed through the recording layer and then is reflected by the optically reflective medium substrate is measured to specify the written information. In the following, this also is referred to as "optically reflective reading method."

If the optical recording medium includes metallic aluminum as the material for the optical recording film, then an optical recording medium having an optical recording film with high reflectivity is achieved. This makes it possible to read information with precision.

If the medium substrate of the optical recording medium is provided with an optically transmissive coating as its topmost layer and a recording layer is provided on the surface of this optically transmissive coating, then an optical recording medium provided with a recording layer that is highly resistant for example against exfoliation can be attained. Furthermore, if it is formed on the surface of an optically reflective film, then it serves also to prevent oxidation of the optically reflective film, thus improving the permanency of the recording layer.

If the substance constituting the optically transmissive coating in the optical recording medium is an inorganic substance, then changes in the polarized components of the polarized light or the unpolarized light passing through the optically transmissive coating can be reduced.

If the inorganic substance in the optical recording medium is silica or silicon nitride, then an optical recording medium provided with an optically transmissive coating with superior transparency can be attained.

If the recording layer of the optical recording medium is formed on a front and a rear side of the optically reflective medium substrate, then twice the storage capacity per optical recording medium can be attained, so that an optical recording medium with large capacity can be provided.

If the medium substrate of the optical recording medium is a tape-shaped medium substrate or a card-shaped medium substrate, an easy-to-handle optical recording medium can be attained. Furthermore, using conventional technology for the elements besides the recording layer, it is possible to provide an optical recording medium similar to CDs, MOs, FDs or cassette tapes.

If the medium substrate of the optical recording medium is a disk-shaped medium substrate, and the information recording unit regions of the recording layer are arranged in groups of concentric circles or in a spiral shape on the medium substrate, then an optical recording medium is attained that can be read easily and quickly.

If the medium substrate of the optical recording medium is a tape-shaped or a card-shaped medium substrate, and the information recording unit regions in the recording layer are arranged in parallel linear groups intersecting at a predetermined angle with a longitudinal direction of the medium substrate, then recording at high densities becomes possible. Furthermore, the mechanism for the recording is also simplified.

If all information recording unit regions of the recording layer in the optical recording medium are initialized to become oriented regions in which the long axis orientation of the chemisorptive molecules is oriented, then an optical recording medium is provided that can be adapted to various applications. Furthermore, the possibility of malfunctioning during the recording or reproducing also can be reduced.

The following is an explanation of the details of the present invention along with preferable embodiments of the present invention. Below is a simple outline of the embodiments described thereafter.

Embodiment 1 and Embodiment 2 relate to optical recording films. Embodiment 1 illustrates an erasable optical recording film, whereas Embodiment 2 illustrates a write-once optical recording film. Embodiment 3 and Embodiment 4 relate to optical recording media. Embodiment 3 illustrates an erasable optical recording medium, whereas Embodiment 4 illustrates a write-once optical recording film. Embodiment 5 and Embodiment 6 relate to recording/reproducing methods. Embodiment 5 illustrates an information recording/reproducing method for erasable optical recording media, whereas Embodiment 6 illustrates an information recording/reproducing method for write-once optical recording media. Next, Embodiment 7 to Embodiment 9 relate to information recording/reproducing devices. Embodiment 7 illustrates the parts that are common to information recording/reproducing devices for erasable optical recording media and information recording/reproducing devices for write-once optical recording media. Embodiment 8 illustrates an information recording/reproducing device for erasable optical recording media, and Embodiment 9 illustrates an information recording/reproducing device for write-once optical recording media.

Embodiment 10 and Embodiment 11 relate to computer systems. Embodiment 10 illustrates a computer system provided with an information recording/reproducing device for erasable optical recording media, whereas Embodiment 11 illustrates a computer system provided with an information recording/reproducing device for write-once optical recording media.

Finally, Embodiment 12 and Embodiment 13 illustrate video information recording/reproducing systems. Embodiment 12 illustrates a video information recording/reproducing system provided with an information recording/reproducing device for erasable optical recording media, whereas Embodiment 13 illustrates a video information recording/reproducing system provided with an information recording/reproducing device for write-once optical recording media.

EMBODIMENT 1

Embodiment 1 explains an erasable optical recording film ("erasable" films are also called "rewritable" films) in terms of its manufacturing method.

Figure 2:
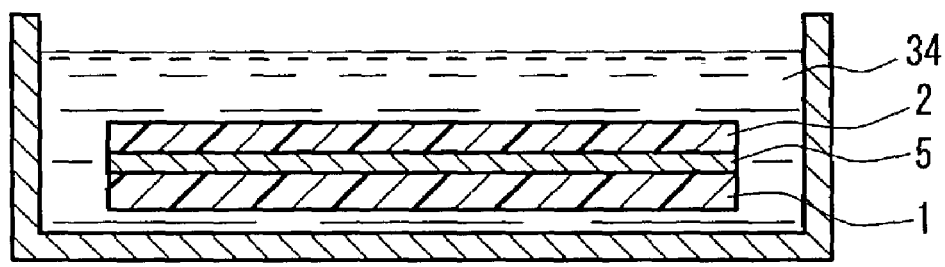
FIG. 2 shows a schematic diagram illustrating an example of a recording film formation step in accordance with the present invention.

FIG. 1 shows a cross-section, magnified to the molecular level, of an optical recording film 2 according to Embodiment 1. FIG. 2 shows a schematic diagram illustrating an immersion method as an example of a recording film formation step. FIG. 2 shows how a substrate in which an optically reflective film 5 has been formed on a base material 1 is immersed in a chemisorptive solution 34.

For the chemisorptive molecules constituting the recording layer of the erasable optical recording medium, it is possible to use chemisorptive molecules having the property to be oriented by polarized light such that when irradiated with polarized orientation light, they are oriented in a characteristic direction determined by the polarization direction and the propagation direction of the polarized orientation light, or chemisorptive molecules that, when irradiated with polarized orientation light, are oriented in a certain direction determined by the polarization direction of the polarized light and its propagation direction, and when irradiated with unpolarized light, are oriented in random directions without specific orientation. Chemisorptive molecules having the property to be oriented by polarized light usually have the property to be oriented in random directions when irradiated with unpolarized light, but it is also possible to use molecules not having that property.

When the chemisorptive molecules have at one end a functional group forming a chemical bond with active hydrogen, then it is easy to form a recording film in the form of a chemically bonded monomolecular film. Metal base materials, ceramic base materials and glass base materials, which are typically used, have functional groups including active hydrogen at their topmost surface, so that using such base materials, there is no need for a special treatment of the base material. The functional group including active hydrogen at the base material surface can be for example —OH, —COOH, —CHO, —NH$_2$ or >NH.

For the chemisorptive molecules having a functional group that chemically reacts with active hydrogen as described above, it is possible to use a silane-based surface active agent. For example, it is possible to use a trihalogenosilane surface active agent, a dihalogenosilane surface active agent, a monohalogenosilane surface active agent, a trialkoxysilane surface active agent, a dialkoxysilane surface active agent, a monoalkoxysilane surface active agent, a triisocyanatosilane surface active agent, a diisocyanatosilane surface active agent or a monoisocyanatosilane surface active agent.

Furthermore, when the chemisorptive molecules include a functional group that absorbs light, then it is possible to change the long axis orientation of the chemisorptive molecules with little irradiation energy. Thus, the power consumption can be reduced, and the time necessary for recording can be shortened. If light is used for reading out, then the writing efficiency and precision as well as the precision with which recordings are maintained increases the larger the difference between the wavelength of the light used for reading and the wavelength of the light used for writing is, so that UV-light absorbing functional groups (i.e., functional groups that absorb light of wavelengths in the UV region) are preferable.

As such UV-light absorbing functional groups, it is possible to use chemisorptive molecules including an aryl backbone group, an arylene backbone group or a carbonyl group. Here, "aryl backbone group" means a group of atoms forming the backbone of an aryl molecule. Consequently, it can be a monovalent characteristic group or a divalent characteristic group.

The molecular structure of the chemisorptive molecules can be somewhat branched, as long as this does not impede the variability of the long axis of the chemisorptive molecules, but it is preferable that they are linear molecules with as few branched chains as possible. With such chemisorptive molecules, the dipole moment in the molecules is large, and the spatial obstruction caused by neighboring chemisorptive molecules when changing the long axis orientation of the chemisorptive molecules is small, thus improving the responsiveness to light as well as the writing sensitivity and precision. Furthermore, in random regions, in which the long axes of the chemisorptive molecules are random, the optical transmissivity is particularly isotropic, whereas in oriented regions, in which the long axes of the chemisorptive molecules are oriented, the optical transmissivity is particularly anisotropic, increasing the reading precision. Furthermore, because the spatial obstruction is small, an optical recording film with a high density of chemisorptive molecules can be formed, which also improves the reading precision.

The linear molecules are preferably molecules having, excluding the functional group bonding with active hydrogen, a straight-chain carbon backbone (referred to as "straight-chain backbone molecules" in the following), molecules having a linear backbone in which some of the carbon atoms have been replaced with a group of atoms (referred to as "linear backbone molecules" in the following) such as a phenyl group (—C$_6$H$_4$—), a carbonyl group (—CO—), or an oxycarbonyl group (—CO—O—), or straight-chain backbone molecules or linear backbone molecules including substitution groups such as halogen atoms, carbon trifluoride (CF$_3$—), alkyl or alkylene groups with a carbon number of 1 to 25, or phenyl groups (C$_6$H$_5$—).

For the organic solvent in the chemisorptive solution preparation step, a non-aqueous organic solvent is used. Using a non-aqueous organic solvent, a monomolecular optical recording film with a very uniform film thickness can be formed.

As a method for bringing the substrate and the chemisorptive solution into contact during the recording film formation step, it is possible to apply the chemisorptive solution to the substrate or to immerse the substrate in the chemisorptive solution. It is preferable that this step is performed in a dry atmosphere of not more than 30% relative humidity, such as in dry air, dry nitrogen or dry helium.

Using a base material having functional groups including active hydrogen makes the manufacturing of the optical recording film easy. In particular, if a metal base material, ceramic base material or glass base material that already has been in contact with air is used, then it will have a sufficient amount of active hydrogen for the formation of the optical recording film at its surface even without subjecting it to a special surface treatment. If a metal base material is used, then the surface oxidizes naturally when it is exposed to air including a water component, and the oxide formed by this natural oxidation further reacts with water molecules, introducing functional groups with active hydrogen, and mainly hydroxyl groups. Also in ceramic base materials and glass base materials, the atoms of the substrate surface react with the water molecules in air, introducing functional groups including active hydrogen.

In general, base materials with a hydrophilic surface include many hydroxyl groups, and the hydrogen atoms included in these hydroxyl groups are active hydrogen. Consequently, using hydrophilic substrates makes it easy to manufacture the optical recording film.

In the case of a synthetic resin substrate, functional groups including active hydrogen easily can be introduced for example by subjecting the surface to a plasma treatment, a corona treatment or a UV-light treatment. Consequently, the optical recording film also can be manufactured on a synthetic resin base material into which active hydrogen has been introduced. With a synthetic resin substrate having functional groups including active hydrogen at its surface, the optical recording film can be manufactured without performing the above-noted treatments.

In the case of metal base materials, ceramic base materials and glass base materials that do not have or do not have sufficient active hydrogen at their surface, it is possible to introduce functional groups including active hydrogen by subjecting the surface to a plasma treatment, a corona treatment or a UV-light treatment.

If the chemisorptive molecules cannot be chemisorbed directly to the surface, or if the surface cannot be easily modified by subjecting it to surface processing, then the surface may be coated with a coating having functional groups including active hydrogen at its surface. Thus, the optical recording film can be formed on any base material, so that the base material can be selected from a broader range.

It is preferable that after the recording film formation step, unreacted chemisorptive molecules remaining on the substrate are rinsed away. Performing such a rinsing step, a monomolecular film with an unblemished surface can be formed, and an optical recording film with high writing precision and reading precision can be formed. Furthermore, for the organic solvent in the rinsing step, a non-aqueous organic solvent is used.

EMBODIMENT 2

A write-once optical recording film can be manufactured in the same manner as in Embodiment 1, except that chemisorptive molecules including photoreactive functional groups are used for the chemisorptive molecules constituting the optical recording film.

Chemisorptive molecules including photo-polymerizable functional groups can be used for the photoreactive functional groups. If the photoreactive functional groups are photo-polymerizable groups, then a permanent orientation direction can be attained by orienting the chemisorptive molecules in a characteristic orientation by irradiating polarized light for the purpose of reaction, and polymerizing or crosslinking the chemisorptive molecules constituting the optical recording film to one another. Here, photopolymerization also includes thermal polymerization caused by optical absorption.

The larger the difference between the wavelength of the reference light for reading and the wavelength of the polarized reaction light is, the higher is the writing precision and the precision with which recordings are maintained, so that functional groups that are reacted by UV light are preferable as photoreactive functional groups. In order to improve the writing efficiency, it is even more preferable to use light of a wavelength near the absorption peak wavelength to cause a reaction of the photoreactive functional groups.

For the chemisorptive molecules having functional groups that can be polymerized by light of a wavelength in the UV region, it is possible to use chemisorptive molecules having a chalcone backbone group, a cinnamate backbone group or an acetylene backbone group.

In write-once optical recording films, the ability to hold recordings and the permanency with respect to repeated reproduction is given the most weight, so that chemisorptive molecules whose long axis orientation changes upon irradiation with light can be used as the chemisorptive molecules constituting the optical recording film, even when their responsiveness to irradiation with light is low. Furthermore, in order to improve the recording speed, it is preferable that the chemisorptive molecules have as few branched chains as possible. Such molecules have a large dipole moment, which improves the responsiveness to light and enhances the anisotropy of the optical transmissivity, thus improving the writing sensitivity and precision as well as the reading precision. Preferably, the chemisorptive molecules are straight-chain backbone molecules or linear backbone molecules or are straight-chain backbone molecules or linear backbone molecules having substitution groups, as in Embodiment 1.

The chemisorptive molecules may be molecules having photoreactive functional groups and, at one end, functional groups that chemically bond with the substrate. If the functional groups that chemically bond with the substrate have at their end a functional group that reacts with active hydrogen, then an optical recording film in the form of a chemically bonded monomolecular film can be formed. It is possible to use a silane-based surface active agent having a photoreactive functional group for these molecules. For the silane-based surface active agent, it is possible to use a chlorosilane-based surface active agent, an alkoxysilane-based surface active agent, or an isocyanate-based surface active agent, as in Embodiment 1.

EMBODIMENT 3

This embodiment illustrates an erasable optical recording medium whose medium substrate surface is provided with the erasable optical recording film of Embodiment 1 as the recording layer.

An erasable optical recording medium is manufactured in the same manner as in Embodiment 1, except that an optically reflective medium substrate or an optically transparent medium substrate is used instead of the substrate used in Embodiment 1. If the chemisorptive molecules have at one end a functional group that reacts with active hydrogen, then it is easy to form such a chemically bonded monomolecular recording layer. For such chemisorptive molecules, it is possible to use a silane-based surface active agent, such as a chlorosilane-based surface active agent, an alkoxysilane-based surface active agent, or an isocyanatosilane-based surface active agent.

It is preferable that the chemisorptive molecules include optically absorbing functional groups, and it is even more preferable that they have functional groups absorbing UV light. As such chemisorptive molecules, it is possible to use molecules including an aryl backbone group, an arylene backbone group or a carbonyl group.

The chemisorptive molecules may have some branched chains, as long as this does not compromise their ability to be oriented, but it is preferable that they have as few branched chains as possible. It is even more preferable to use straight-chain backbone molecules, linear backbone molecules or straight-chain backbone molecules or linear backbone molecules having substitution groups, as described in Embodiment 1.

As in Embodiment 1, a non-aqueous organic solvent is used as the organic solvent in the chemisorptive solution preparation step. Furthermore, a rinsing step for rinsing away the unreacted chemisorptive molecules remaining on the medium substrate is carried out after the recording film formation step. A non-aqueous organic solvent is used for the organic solvent in the rinsing step.

As a method for bringing the medium substrate and the chemisorptive solution into contact during the recording layer formation step, it is possible to apply the chemisorptive solution to the substrate, or to immerse the substrate in the chemisorptive solution. When forming a recording layer on both sides of the medium substrate, it is preferable to use immersion in the chemisorptive solution. With this method, the recording layer can be formed simultaneously on the front and the rear side of the medium substrate.

The following is an explanation of the structure of the optical recording medium, with reference to FIGS. 3A to E and FIGS. 4A to C.

Figure 3A:
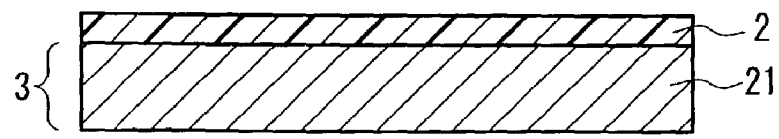
FIGS. 3A to E are cross-sectional views illustrating examples of the structure of an optical recording medium in accordance with the present invention in which an optical recording layer is provided on an optically reflective substrate.
Figure 3B:
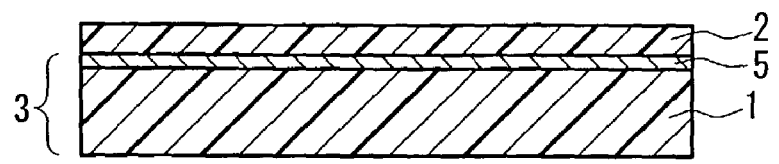
Figure 3C:
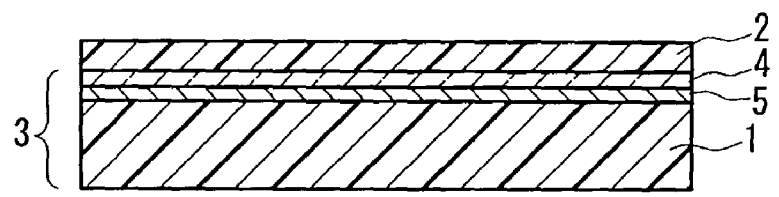
Figure 3D:
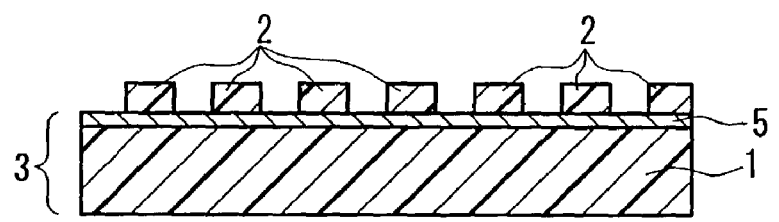
Figure 3E:
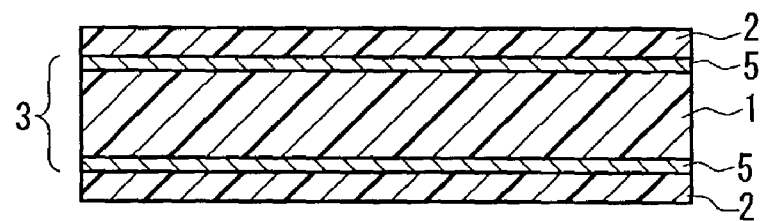

FIGS. 3A to E are cross-sectional views illustrating examples of the structure of an optical recording medium in which an optical recording layer 2 is provided on an optically reflective medium substrate 3. FIG. 3A shows an optical recording medium in which the optical recording layer 2 is formed directly on the surface of an optically reflective base material 21. FIG. 3B shows an optical recording medium in which an optically reflective film 5 is formed on a base material 1, and the optical recording layer 2 is formed on top of the optically reflective film 5. FIG. 3C shows an optical recording medium in which an optically reflective film 5 and an optically transmissive coating 4 are formed on the base material 1, and the optical recording layer 2 is formed on top of that. FIG. 3D shows an optical recording medium in which an optically reflective film 5 is formed on the base material 1, and an optical recording layer 2 is formed partially on top of the optically reflective film 5. FIG. 3E shows an optical recording medium in which optically reflective films 5 are formed on both sides of the base material 1, and optical recording layers 2 are formed on the optically reflective films 5.

Figure 4A:
FIGS. 4A to C are cross-sectional views illustrating examples of the structure of an optical recording medium in accordance with the present invention, in which an optical recording layer is provided on an optically transmissive medium substrate 3.
Figure 4B:
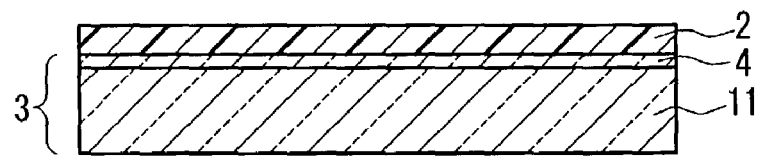
Figure 4C:
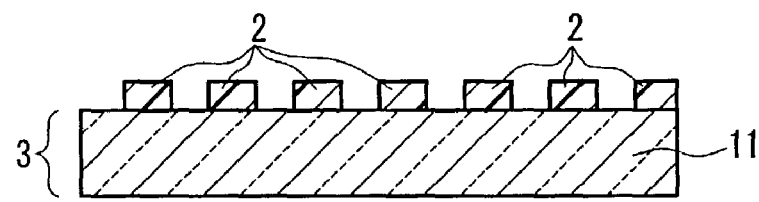

FIGS. 4A to C are cross-sectional views illustrating examples of the structure of an optical recording medium in which an optical recording layer 2 is provided on an optically transmissive medium substrate 3. FIG. 4A shows an optical recording medium in which the optical recording layer 2 is formed directly on the surface of an optically transmissive base material 11. FIG. 4B shows an optical recording medium in which an optically transmissive coating 4 is formed on a base material 11, and the optical recording layer 2 is formed on top of the optically transmissive coating 4. FIG. 4C shows an optical recording medium in which the optical recording layer 2 is partially formed directly on the optical transmissive base material 11.

As for the shape, it is preferable that the medium substrate is disk-shaped, tape-shaped or card-shaped. For disk-shaped or card-shaped medium substrates, base materials with high rigidity, such as metal, ceramic or glass base materials can be utilized. For tape-shaped medium substrates, base materials with high flexibility, such as synthetic resin base materials can be utilized.

Furthermore, depending on whether the method for reading the recorded information is for transmissive medium substrates or reflective medium substrates, medium substrates can be broadly classified into optically transmissive medium substrates and optically reflective medium substrates.

For optically transmissive medium substrates 3, an optically transmissive base material 11, for example a glass base material, is used, and the recording layer 2 is formed on the surface of the optically transmissive base material 11 (see FIG. 4A). Alternatively, it is also possible to form an optically transmissive coating 4 made of an optically transmissive substance group on top of the optically transmissive base material 11, and to form the recording layer 2 on the surface of the optically transmissive coating 4 (see FIG. 4B). If the recording layer 2 is formed via an optically transmissive coating 4 in this manner, the substrate can be selected from a broader range. Alternatively, it is also possible to form the recording film 2 only at predetermined locations on the surface of the medium substrate 3, forming information recording unit regions (see FIG. 4C).

A reflective optical recording medium can be manufactured using a medium substrate 3 provided with an optically reflective film 5 made of an optically reflective substance group on any base material 1 as the optically reflective medium substrate 3, and forming the recording film 2 on the surface of the optically reflective medium substrate 3 (see FIG. 3B). It is preferable that the optically reflective film has a high reflectance, and examples of suitable materials for such an optically reflective film 5 are materials mainly including metallic aluminum or silver. Furthermore, if a material with high smoothness is used, an optically reflective film 5 that has uniform film thickness and even surface can be formed. An example of materials with high optical reflectance and smoothness is metallic aluminum including several percent by weight of silicon.

Furthermore, using an optically reflective base material 21 made of an optically reflective substance group, it is possible to manufacture an optically reflective optical recording medium provided with a monomolecular recording optical layer 2 provided on the surface of the optically reflective base material 21 (see FIG. 3A). It is also possible to form the recording layer 2 only at predetermined locations of the optically reflective medium substrate 3, and form information recording unit regions (see FIG. 3D).

It is also possible to form the recording layer 2 on an optically reflective film 5 or an optically reflective base material 21, with an optically transmissive coating 4 disposed therebetween. With this configuration, an optical recording medium provided with an optically reflective film that is highly resistant against for example exfoliation can be attained.

It is preferable that after the recording layer formation step, the long axis orientation of the chemisorptive molecules constituting the recording layer is initialized to a certain direction by irradiating the optical recording medium with orientation light (polarized orientation light or unpolarized orientation light). The following is an explanation of the initialization of an erasable optical recording medium. First, it will be explained with reference to FIG. 5 to FIGS. 7A–C how the entire recording layer can be initialized.

Then, it will be explained how at least a partial region of the recording layer including information recording unit regions can be initialized.

After the recording layer formation step, the long axis orientations of the chemisorptive molecules in the recording layer are in a random state (random regions), and no particular initialization is necessary to take this random state as the initial state. However, when oriented information recording unit regions that are oriented in a specified orientation are formed, then there is the possibility of malfunctioning during usage, so that in the case of an optical recording medium having a recording layer that is changed into a random state by irradiation with unpolarized light, it is preferable that the entire recording layer is irradiated with unpolarized light to ensure a random state.

Figure 5:
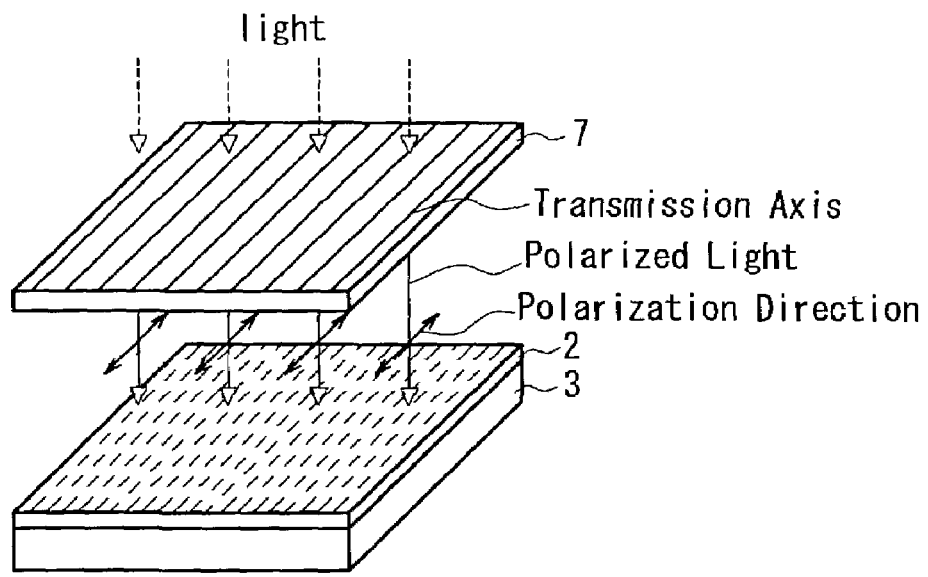
FIG. 5 is a schematic diagram illustrating a method for orientation by (polarized) light in accordance with the present invention.
Figure 7A:
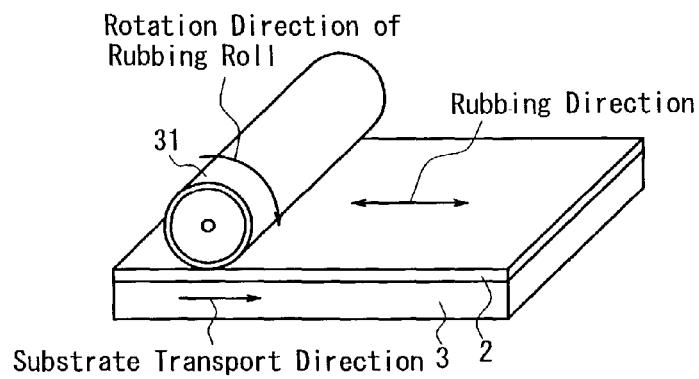
FIGS. 7A to 7C are schematic diagrams illustrating methods for orientation by rubbing in accordance with the present invention.
Figure 7B:
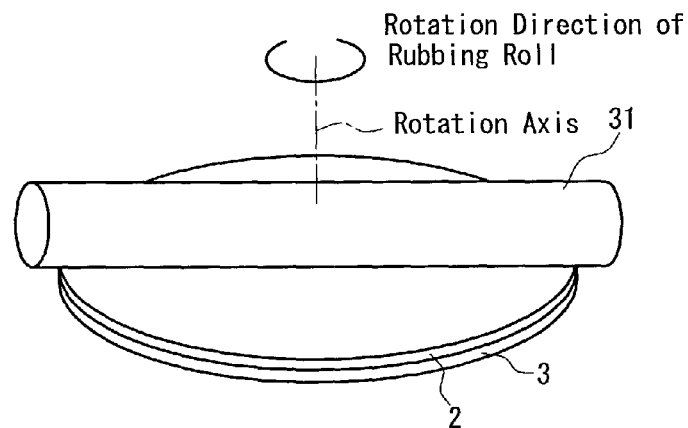
Figure 7C:
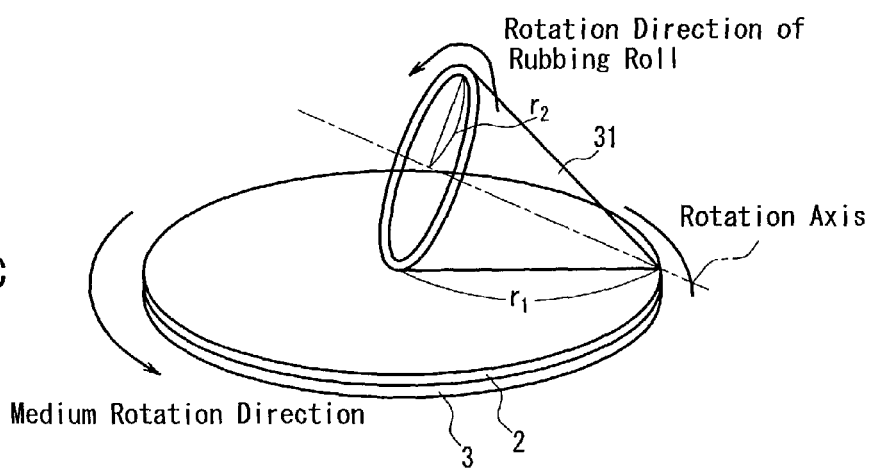

To initialize the entire recording layer to an oriented state, it is possible to perform bulk irradiation or scanning irradiation of the entire surface of the recording layer 2 with polarized orientation light, thus orienting the chemisorptive molecules constituting the recording film 2 in a predetermined orientation (orienting by polarized light), but it is also possible to orient them into a predetermined orientation by rubbing the recording layer 2 with a rubbing roll 31 (orienting by rubbing). FIG. 5 shows a schematic diagram illustrating methods for orientation by (polarized) light. FIGS. 7A to 7C are schematic diagrams illustrating a method for orientation by rubbing. FIG. 7A shows a method for rubbing the medium substrate in one direction. FIG. 7B shows a method for rubbing the medium substrate 3 in a circumferential direction. FIG. 7C shows a method for rubbing the medium substrate 3 at a uniform rubbing density in a circumferential direction (that is, a direction vertical to the radius). In FIG. 7C, it is possible to rub with a uniform rubbing density by appropriately selecting the length of the disk radius $r_1$ and the radius $r_2$ of the rubbing roll.

Figure 6:
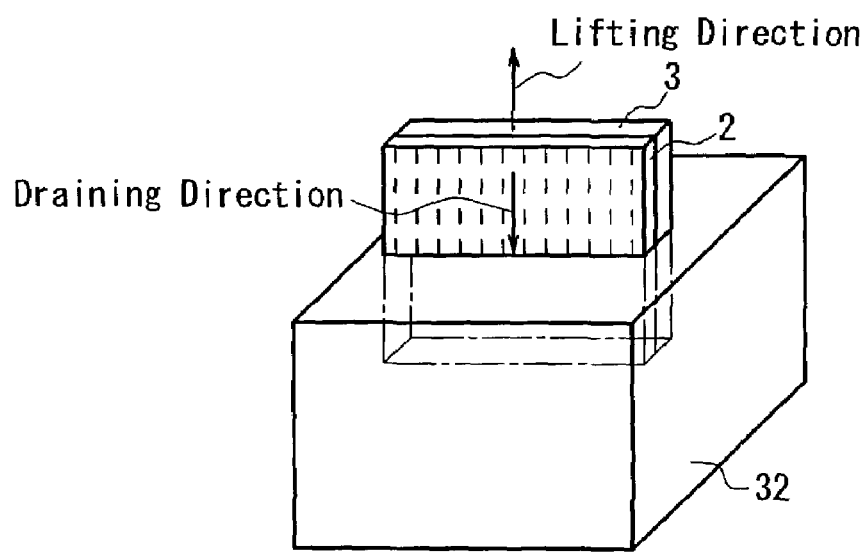
FIG. 6 is a schematic diagram illustrating a method for orientation by draining a solution in accordance with the present invention.

Furthermore, it is also possible to orient the long axis orientation of the chemisorptive molecules constituting the recording layer 2 by lifting the surface of the medium substrate 3 at a certain angle, preferably a right angle, with respect to the surface of the organic solvent 32 when retrieving the medium substrate 3 from the organic solvent 32 in the recording layer formation step, or, if a rinsing step is performed, in the rinsing step (orienting by draining a solution). FIG. 6 is a schematic diagram illustrating a method for orientation by draining a solution.

It is possible to initialize the recording layer (to form orientation regions) with high precision to a uniaxially oriented orientation state by further applying polarized light after orienting by draining a solution and/or by rubbing. It is preferable to initialize the recording layer by orienting with polarized light after orienting by draining a solution. This way of initialization is superior in that there is no possibility of damaging the surface of the substrate medium as by rubbing, and in that can simplify the process. As described above, by using an orientation state in which the long axis orientation of the chemisorptive molecules has been uniaxially oriented as information elements or structural elements of information elements, it is possible to write and read information with high precision.

Next, it is also possible to initialize to an arbitrary or predetermined orientation state of the long axis orientation of the chemisorptive molecules included in the information recording unit regions by irradiating polarized orientation light on each information recording unit region (formation of arbitrary oriented regions or predetermined oriented regions). In the case of an optical recording medium having the property that the long axis orientation of the chemisorptive molecules is changed into random orientations by irradiation with unpolarized light, it is also possible to initialize the information recording unit regions to a random state by irradiating unpolarized orientation light on each information recording unit region (forming random regions).

The following explanation is for the case of initializing a disk-shaped optical recording medium, a tape-shaped optical recording medium or a card-shaped optical recording medium in this manner. However, the case of initializing to a random state the information recording unit regions of an optical recording medium having the property that the long axis orientation of the chemisorptive molecules is changed into random orientations by irradiating unpolarized light has been omitted. If need be, "polarized orientation light" may be replaced by "unpolarized orientation light" and "orientation state" by "arbitrary orientation state," and "predetermined orientation state" by "random state."

Figure 8A:
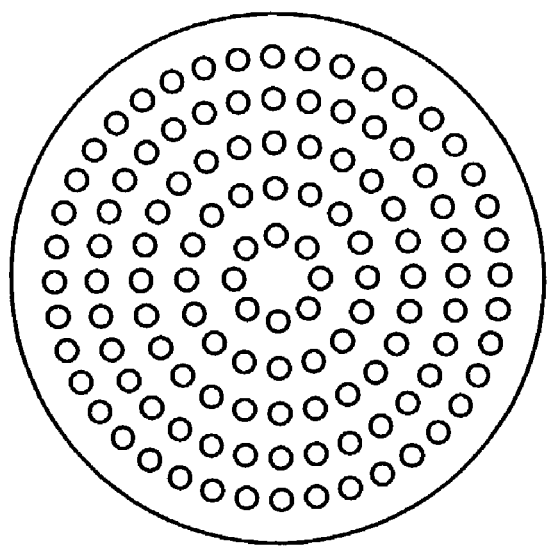
FIGS. 8A and 8B are schematic plan views illustrating examples of how the information recording unit regions can be arranged in the recording layer of a disk-shaped optical recording medium in accordance with the present invention.
Figure 8B:
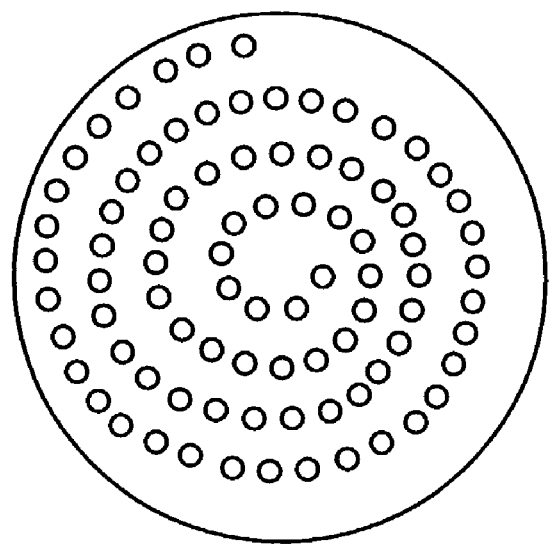

In the case of a disk-shaped recording medium, the information recording unit regions may be arranged in concentric circles as shown in FIG. 8A or in a spiral shape as shown in FIG. 8B. In this case, the information recording unit regions can be initialized in a predetermined orientation state by rotating the disk-shaped optical recording medium and shifting polarized orientation light with fixed polarization direction and propagation direction in the radial direction.

It is also possible to initialize all information recording unit regions into an arbitrary orientation state at once without rotating the disk-shaped optical recording medium by preparing a photo-mask provided with a predetermined pattern and irradiating polarized orientation light with fixed polarization direction and propagation direction through the photo-mask onto the recording layer. Furthermore, it is also possible to initialize all information recording unit regions into an arbitrary orientation state at once by forming a photo-mask on or below a polarizer, irradiating unpolarized orientation light through the polarizer, and irradiating the recording layer with the polarized orientation light of a predetermined pattern that has passed through the polarizer.

Figure 9A:
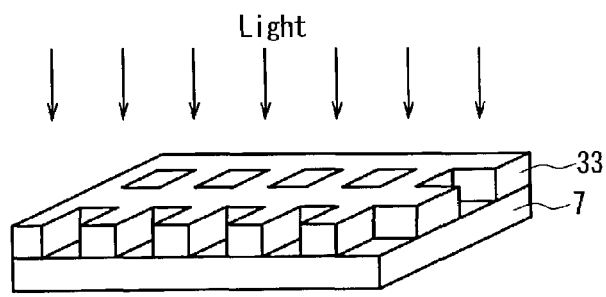
FIGS. 9A and 9B are schematic perspective views illustrating a method for partially initializing the recording layer in accordance with the present invention.
Figure 9A:
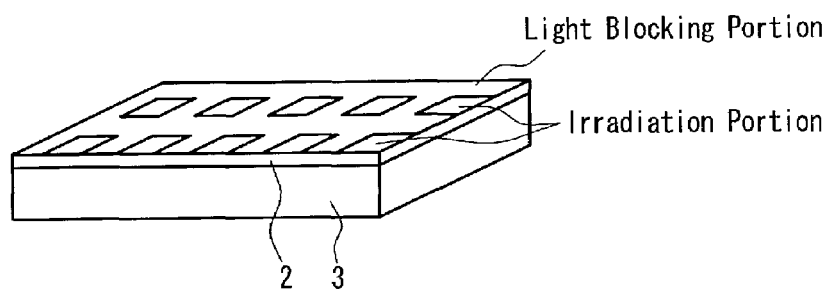
Figure 9B:
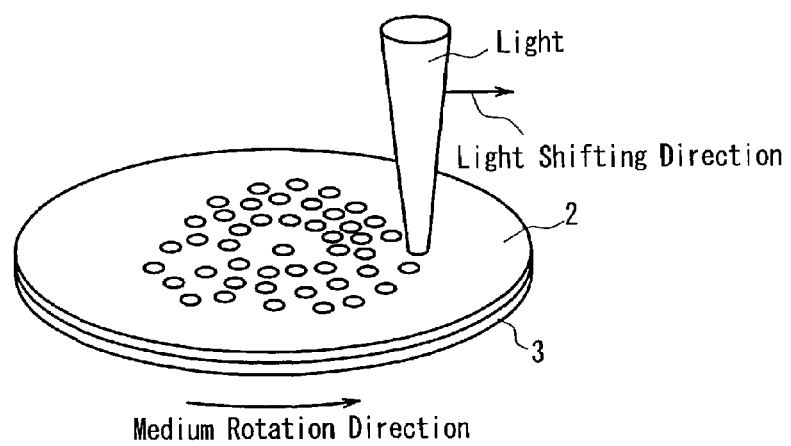

FIGS. 9A and 9B are schematic perspective views illustrating a method for partially initializing the recording layer 2. FIG. 9A shows a method for initialization with a polarizer 7 provided with a photo-mask 33 of a predetermined pattern, and FIG. 9B shows a method for initialization by successively changing the location irradiated with light.

For the initialization of a disk-shaped optical recording medium, it is possible to irradiate orientation light intermittently onto each information recording unit region, or to successively irradiate the orientation light continuously onto the information recording unit regions. In this case it is preferable to rotate the disk-shaped optical recording medium continuously. Furthermore, it is preferable to irradiate the medium substrate with unpolarized orientation light or polarized orientation light from a direction substantially perpendicular to the disk-shaped medium substrate surface.

Figure 10A:
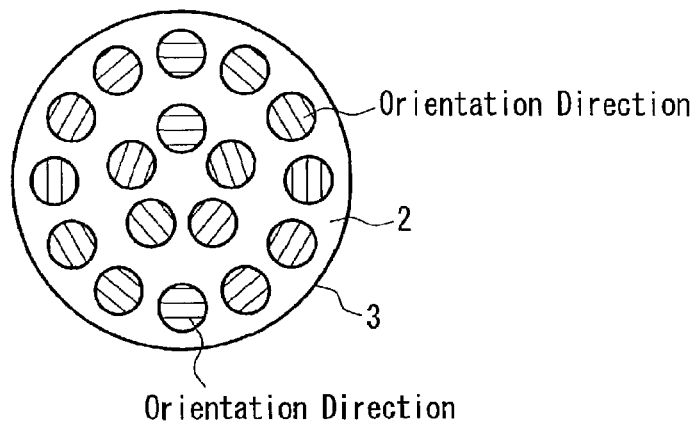
FIGS. 10A to 10C are schematic plan views showing initialization examples for disk-shaped optical recording media in accordance with the present invention.
Figure 10B:
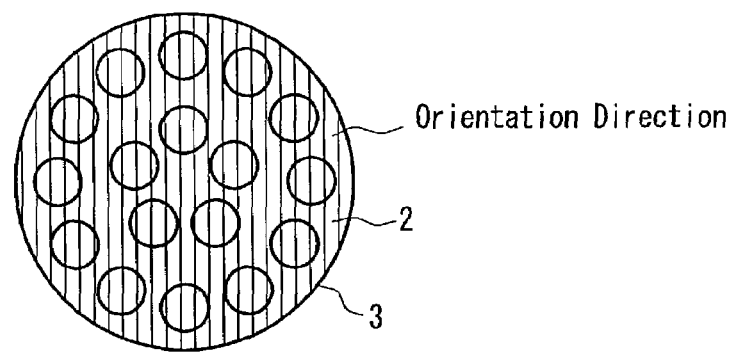
Figure 10C:
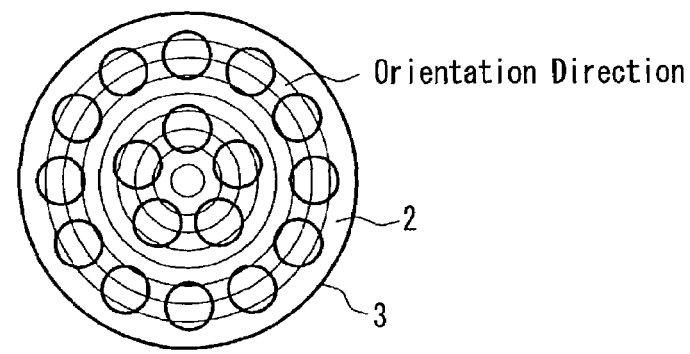

FIGS. 10A to 10C are schematic plan views showing initialization examples for disk-shaped optical recording media. FIG. 10A shows a recording layer 2 that has been partially initialized in a predetermined orientation state. FIG. 10B shows a recording layer 2 that has been completely initialized in an arbitrary orientation state. FIG. 10C shows a recording layer 2 that has been completely initialized in a predetermined orientation state.

Figure 11A:
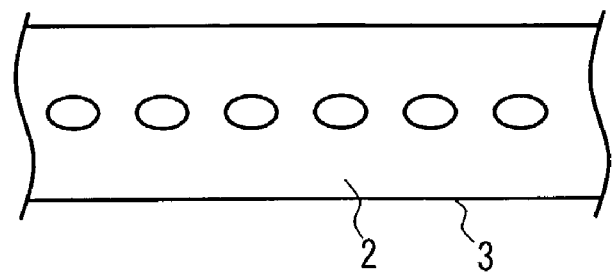
FIGS. 11A to 11E are schematic plan views illustrating examples of how the information recording unit regions can be arranged on the recording layer of a tape-shaped optical recording medium or a card-shaped optical recording medium.
Figure 11B:
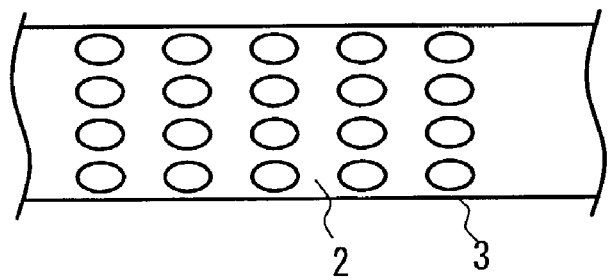
Figure 11C:
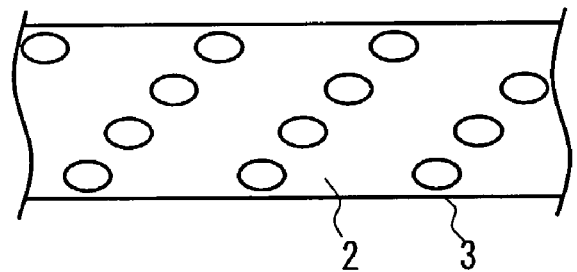
Figure 11D:
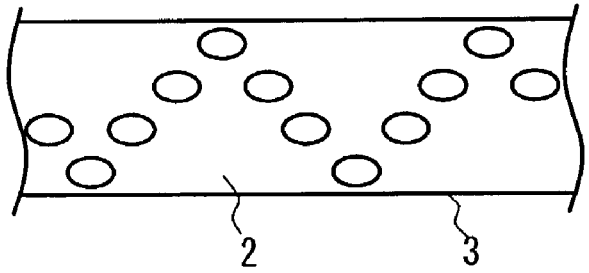
Figure 11E:
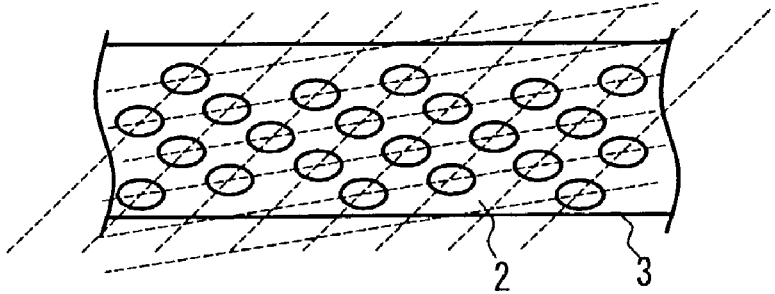

In the case of a tape-shaped optical recording medium or a card-shaped optical recording medium, it is preferable that the information recording unit regions are arranged in groups of parallel lines extending in a longitudinal direction of the optical recording medium, or in groups of parallel lines that intersect at a predetermined angle with the longitudinal direction of the medium. FIGS. 11A to 11E are schematic plan views illustrating examples of tape-shaped optical recording media and how the information recording unit regions can be arranged on the recording layer of the tape-shaped optical recording media. FIG. 11A shows information recording unit regions that are arranged in one straight line in the longitudinal direction. FIG. 11B shows information recording unit regions that are arranged in groups of parallel straight lines forming a right angle with the longitudinal direction (lattice point arrangement). FIG. 11C shows information recording unit regions that are arranged in groups of parallel straight lines that are tilted at a predetermined angle relative to the longitudinal direction (uni-axially tilted lattice point arrangement). FIG. 11D shows information recording unit regions that are arranged in a triangular waveform made of parallel straight lines tilted at a first predetermined angle relative to the longitudinal direction and parallel straight lines tilted at a second predetermined angle relative to the longitudinal direction. FIG. 11E shows information recording unit regions that are arranged in groups of parallel straight lines that are tilted at a predetermined angle relative to the longitudinal direction (bi-axially tilted lattice point arrangement).

For these types of initialization, the tape-shaped optical recording medium or card-shaped optical recording medium is transported in a longitudinal direction and the light beam is shifted in a direction perpendicular to the longitudinal direction of the medium, irradiating polarized orientation light with fixed polarization direction and propagation direction onto the information recording unit regions, so that the long axis orientation of the chemisorptive molecules included in the information recording unit regions can be initialized to a predetermined orientation state.

In these tape-shaped optical recording media or card-shaped optical recording media, the information recording unit regions can be initialized by intermittently irradiating the polarized orientation light onto each of the information recording unit regions, but they also can be initialized by irradiating the polarized orientation light continuously. It is preferable to continuously transport the tape-shaped optical recording medium or card-shaped optical recording medium. Furthermore, it is preferable that, for the initialization, unpolarized light or polarized light is irradiated onto the medium substrate from a direction that is substantially perpendicular to the surface of the medium substrate.

In particular in the case of a card-shaped optical recording medium, it is also possible to initialize all information recording unit regions to a predetermined orientation state by irradiating polarized light with a fixed polarization direction and propagation direction onto all information recording unit regions of the recording layer while moving the irradiation position without transporting the optical recording medium forward. Furthermore, it is also possible to initialize all information recording unit regions at once into a random state or a predetermined orientation states by preparing a photo-mask provided with a predetermined pattern and irradiating unpolarized or polarized light through the photo-mask onto the recording layer.

Figure 12A:
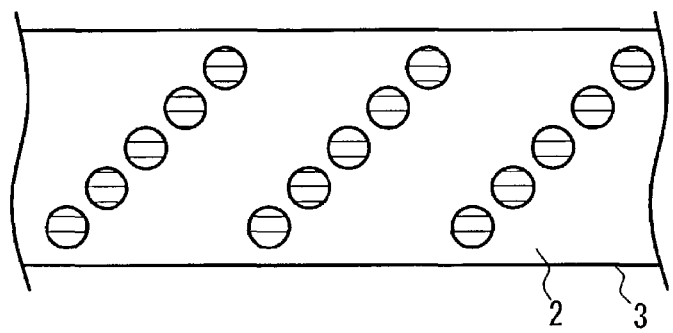
FIGS. 12A to 12C are schematic plan views showing initialization examples for tape-shaped and card-shaped optical recording media in accordance with the present invention.
Figure 12B:
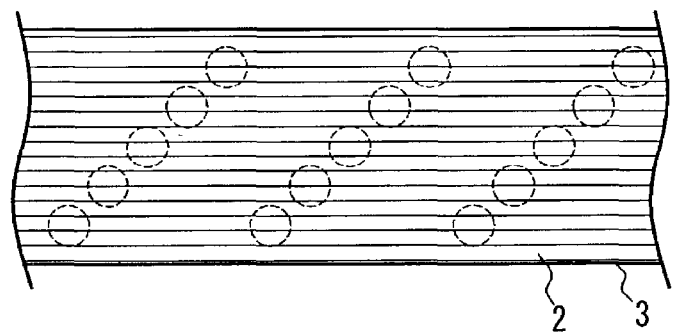
Figure 12C:
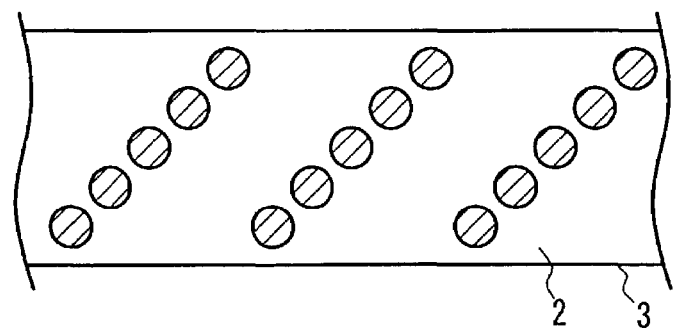

FIGS. 12A to 12C are schematic plan views showing initialization examples for tape-shaped and card-shaped optical recording media. FIG. 12A shows a recording layer 2 that has been partially initialized in a predetermined orientation state taking the longitudinal direction as the orientation direction. FIG. 12B shows a recording layer 2 that has been completely initialized in a predetermined orientation state taking the longitudinal direction as the orientation direction. FIG. 12C shows a recording layer 2 that has been partially initialized in a predetermined orientation state taking a direction other than the longitudinal direction as the orientation direction.

The following is an explanation of the response of the chemisorptive molecules constituting the recording layer to irradiation with orientation light. Linearly polarized light is most preferable as the polarized orientation light. Elliptically polarized light is also acceptable, but in this case, it is preferable that elliptically polarized light with a large ellipticity is used. It is also possible to use partially polarized light including linearly polarized components or partially polarized light including elliptically polarized components, but this lowers the writing and reading precisions unless partially polarized light is used that has a high polarization ratio (also called "polarization degree").

Figure 13:
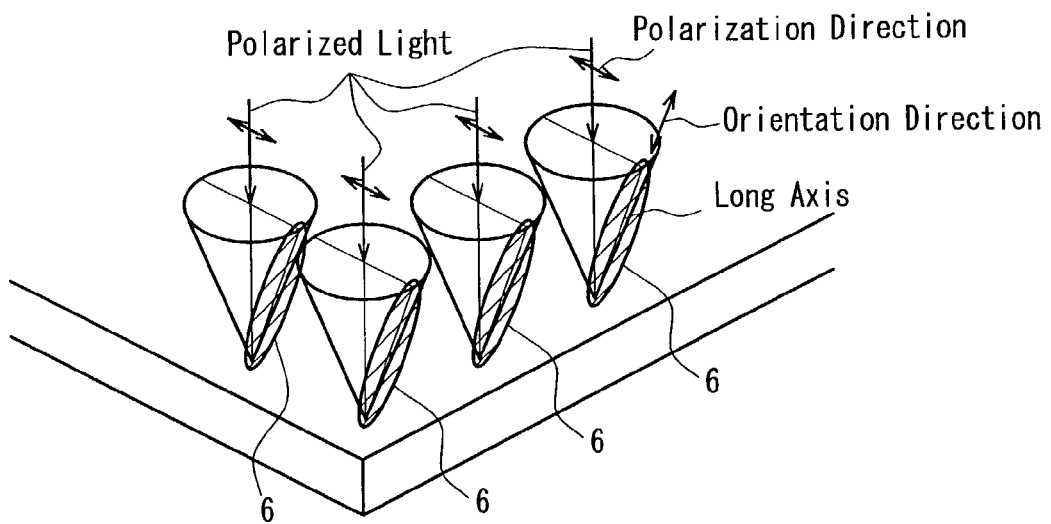
FIG. 13 is a schematic perspective view illustrating the orientation state of chemisorptive molecules constituting the recording film that have been irradiated with polarized light, in accordance with the present invention.

For the sake of simplicity, the following explanations are for the case that linearly polarized light is irradiated. When polarized orientation light is irradiated, the chemisorptive molecules constituting the recording layer generally are oriented at a predetermined angle with the propagation direction of the polarized light within the plane defined by the polarization direction of the irradiated polarized light and its propagation direction (also referred to as "polarization plane" in the following), as shown in FIG. 13. This predetermined angle is a characteristic angle that depends mainly on the chemisorptive molecules forming the recording layer. However, it seems that it also depends on other factors such as the molecular density of the recording layer.

The orientation direction can be either of two directions that are symmetric with respect the propagation direction of the polarized light. As will be explained further below, even when molecules oriented in those two directions are mixed, then the two orientation directions cannot be distinguished if the propagation direction is set to a predetermined direction in case that the reference light used for the read-out is unpolarized reference light or if the polarization direction and the propagation direction are set to predetermined directions in case that the reference light used for the read-out is polarized reference light. That is to say, they can be regarded as the same orientation state. By performing uniaxial orientation by rubbing or draining as explained above, it is possible to avoid that the chemisorptive molecules are oriented in two directions.

In the present invention, chemisorptive molecules are suitable that are oriented in a specified direction determined by the polarization direction and propagation direction of the polarized orientation light, so that they do not necessarily have to be chemisorptive molecules that are oriented within the polarization plane upon irradiation with polarized orientation light.

FIG. 13 shows a case in which the medium substrate is irradiated with polarized orientation light from a perpendicular direction (incidence angle of 0°) but as the incidence angle increases, the interaction between adjacent chemisorptive molecules and with the medium substrate increases, and it may occur that the chemisorptive molecules are not oriented within the plane defined by the polarization direction and the propagation direction of the polarized orientation light or that the above-mentioned two directions are not symmetric with respect to the propagation direction of the polarized orientation light.

Figure 14:
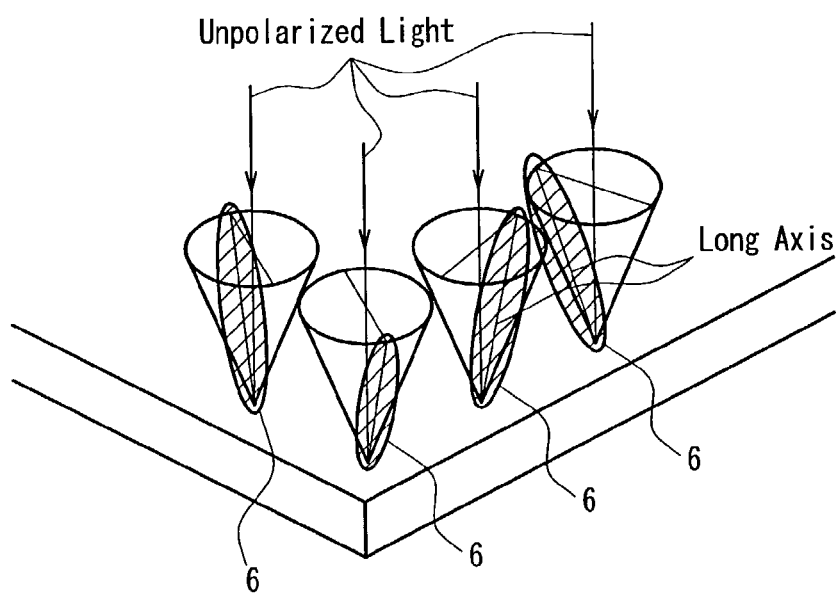
FIG. 14 is a schematic perspective view illustrating the orientation state of chemisorptive molecules constituting the recording film that have been irradiated with unpolarized light, in accordance with the present invention.

If unpolarized light is used, it does not have to be completely unpolarized, but also may be elliptically polarized light with low ellipticity or partially polarized light with a low polarization ratio. When completely unpolarized light is irradiated, the orientation of the chemisorptive molecules changes unsystematically among positions on the conical surface of a circular cone whose rotation axis coincides with the propagation direction of the completely unpolarized light (that is, in random directions), as shown in FIG. 14. Consequently, a random state is achieved in which the long axis orientation of the chemisorptive molecules is distributed randomly. Here, a random state means a state in which the tilt angle of the chemisorptive molecules against the medium substrate is fixed, but their orientation is not specified, or a state in which both the tilt angle and the orientation of the chemisorptive molecules are not specified.

The following is an explanation of how the orientation state of the chemisorptive molecules constituting the recording layer is read out. Polarized reference light and unpolarized reference light are light that does not change the long axis orientation of the chemisorptive molecules when irradiated on them. The wavelength and the intensity of the reference light have to be determined in view of the optical absorption properties of the chemisorptive molecules constituting the recording layer. Generally speaking, the long axis orientation of the chemisorptive molecules constituting the recording layer does not change unless a certain energy is absorbed by the chemisorptive molecules. Consequently, if a wavelength is selected for which the absorption efficiency in the optical absorption spectrum is low, the irradiation intensity can be selected from a broader range, which is preferable.

Figure 15A:
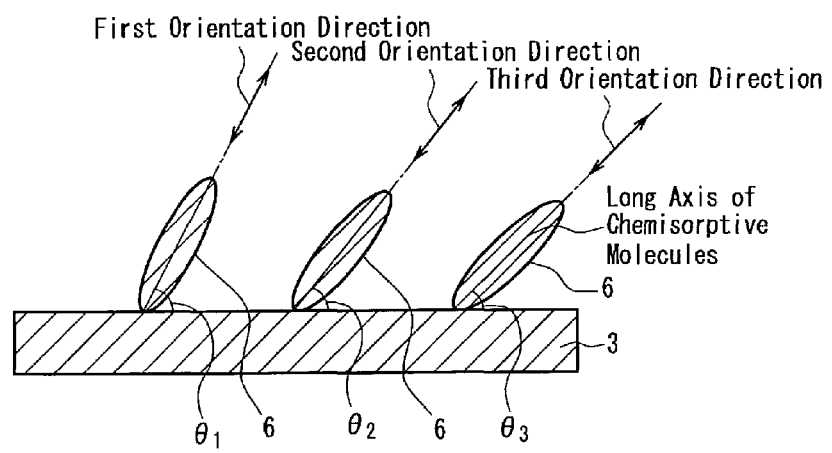
FIGS. 15A and 15B are schematic diagrams illustrating the orientation state of the chemisorptive molecules constituting the recording layer, in accordance with the present invention.
Figure 15B:
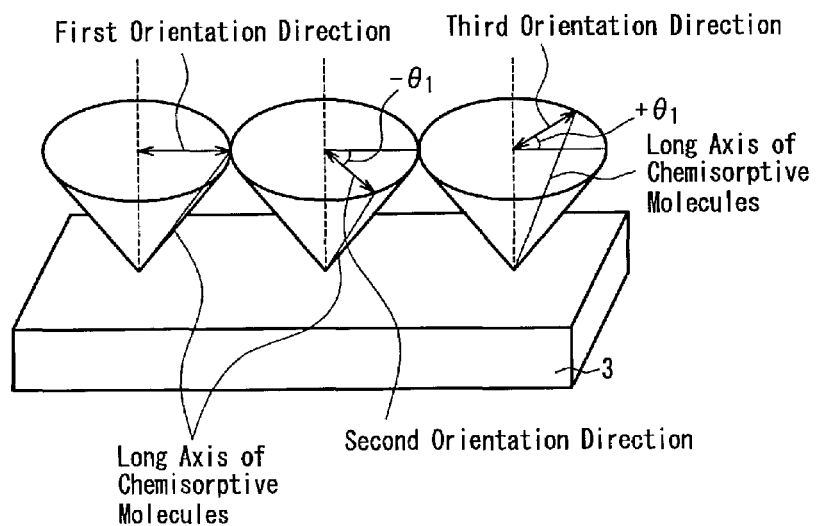

The change of the polarized components of the reference light when passing through an oriented recording layer is explained with reference to FIG. 15. FIGS. 15A and 15B are schematic diagrams illustrating the orientation state of the chemisorptive molecules constituting the recording layer. FIG. 15A is a cross-sectional view showing an orientation state with different tilt angles. FIG. 15B is a perspective view showing an orientation state with different orientation directions.

When the reference light passes through an oriented recording layer, polarized light components oscillating in a direction that is orthogonal to the orientation direction projected into the plane whose normal is the propagation direction of the reference light have the highest transmissivity. As the angle between the polarized light components and the projected orientation direction becomes smaller, the transmissivity of the polarized components oscillating in that angular direction becomes smaller as well, and polarized light components oscillating in that projected orientation direction have the lowest transmissivity. It should be noted, however, that if the chemisorptive molecules constituting the recording film have optical rotatory power, such as molecules including asymmetric carbon, the oscillation direction of the polarized light components with the highest transmissivity and the oscillation direction of the polarized light components with the lowest transmissivity are respectively rotated in the same direction by an angle characteristic for the chemisorptive molecules. But in the present invention, this rotation angle (rotatory angle) is small enough to be ignored, because the recording layer is extremely thin.

For like projected orientation directions but different angles defined by the projected orientation direction and the orientation direction, the transmissivity is higher the larger this angle is, and lower the smaller this angle is.

The erasable optical recording media produced as described above can be used as follows. First, an erasable optical recording medium whose recording layer is in a random state can be used as a photosensitive plate for recording the position and the polarization direction of irradiated polarized light. Similarly, an erasable optical recording medium whose recording layer is in a predetermined orientation state can be used as a photosensitive plate for recording the position of irradiated unpolarized light. The erasable optical recording media can be used repeatedly by reinitializing after each use.

Using polarized light for an erasable optical recording medium provided with a recording layer in a random state, or, in the case of an erasable optical recording medium provided with a recording medium in a first predetermined orientation state, using unpolarized light or polarized light that changes the orientation state to a second orientation state that is different from the first orientation state, these optical recording media can be used to record information by rendering characters or graphics on the optical recording media.

If there are information recording unit regions in the recording layer of the erasable optical recording medium, the optical recording media also can be used to record digital information by writing information elements into one information recording unit region at a time by irradiating light for a predetermined orientation. The recording of digital information is explained in more detail in Embodiment 5 below.

EMBODIMENT 4

In this embodiment, a write-once optical recording medium whose medium substrate surface is provided with the write-once optical recording film as the recording layer is explained. Instead of using the substrate of Embodiment 1, it is also possible to manufacture a write-once optical recording medium in the same manner as in Embodiment 1, except that an optically reflective medium substrate or an optically transmissive medium substrate is used instead of the substrate of Embodiment 1.

In the case of chemisorptive molecules having at one end a functional group reacting with active hydrogen, a recording layer in the form of a chemically bonded monomolecular recording film can be formed easily. For such chemisorptive molecules, it is possible to use a silane-based surface active agent, such as a chlorosilane-based surface active agent, an alkoxysilane-based surface active agent, or an isocyanatosilane-based surface active agent, as in Embodiment 1.

As chemisorptive molecules having photoreactive functional groups, it is possible to use molecules having photopolymerizable functional groups. If the photoreactive functional groups are photo-polymerizable functional groups, the chemisorptive molecules can be oriented in a specified direction by irradiation with polarized reaction light, and the orientation direction can be fixed by polymerizing or crosslinking the chemisorptive molecules constituting the optical recording film to one another. Here, "photo-polymerizable" also includes thermally polymerizable by optical absorption.

The chemisorptive molecules may have some branched chains, as long as this does not compromise the orientation properties, but it is preferable that they have as few branched chains as possible. It is even more preferable to use straight-chain backbone molecules, linear backbone molecules or straight-chain backbone molecules or linear backbone molecules having substitution groups, as described in Embodiment 1.

As in Embodiment 1, a non-aqueous organic solvent is used as the organic solvent in the chemisorptive solution preparation step. Furthermore, a rinsing step for rinsing away the unreacted chemisorptive molecules remaining on the medium substrate is carried out after the recording film formation step. A non-aqueous organic solvent is used as the organic solvent in the rinsing step.

As a method for bringing the substrate and the chemisorptive solution into contact during the recording film formation step, it is possible to apply the chemisorptive solution to the substrate or to immerse the substrate in the chemisorptive solution. When forming a recording layer on both sides of the medium substrate, it is preferable to use immersion in the chemisorptive solution. With this method, recording layers can be formed simultaneously on the front and the rear side of the medium substrate.

As for the shape, it is preferable that the medium substrate is disk-shaped, tape-shaped or card-shaped. For disk-shaped or card-shaped medium substrates, base materials with high rigidity, such as metal, ceramic or glass base materials are suitable. For tape-shaped medium substrates, base materials with high flexibility, such as synthetic resin base materials are suitable.

Furthermore, depending on whether the method for reading the recorded information is for transmissive medium substrates or reflective medium substrates, medium substrates can be classified broadly into optically transmissive medium substrates and optically reflective medium substrates.

A transmissive optical recording medium can be fabricated by using an optically transmissive base material, such as glass, for the optically transmissive substrate, and forming the recording layer on the surface of the optically transmissive base material. It is also possible to form a transparent coating made of an optically transmissive substance group on the optically transmissive base material, and to form the recording layer on the surface of this transparent coating. Forming the recording layer via such a transparent coating broadens the range of base materials that can be selected.

A reflective optical recording medium can be fabricated by using an optically reflective medium substrate in which a suitable base material is provided with a reflective film made of an optically reflective material, and forming the recording layer on the surface of this medium substrate. It is preferable that the reflective film has superior optical reflectance, and examples of materials for such a reflective film are materials mainly including metallic aluminum. Furthermore, if a material with high smoothness is used, a reflective film that has uniform film thickness and an even surface can be formed. Using metallic aluminum including several percent by weight of silicon for example, a reflective film with superior optical reflectance and smoothness can be formed.

Furthermore, using an optically reflective base material made of an optically reflective material, it is possible to manufacture a reflective optical recording medium provided with a monomolecular recording layer on the surface of an optically reflective substrate.

It is also possible to form the recording layer on a reflective film or optically reflective base substrate with a transparent coating made of an optically transmissive material disposed therebetween. With this configuration, an optical recording medium provided with a reflective film that is highly resistant against for example exfoliation can be attained. And if it is a transparent coating having functional groups including active hydrogen at the transparent coating surface or into which such functional groups can be introduced easily, then a monomolecular recording layer can be formed easily even on a reflective film to which the chemisorptive molecules cannot be easily chemisorbed.

When, after the recording layer formation step, the chemisorptive molecules constituting the information recording unit regions are initialized to a predetermined orientation direction by irradiating the optical recording medium with (polarized light or unpolarized) light, write-once optical recording media of various initialization states can be manufactured. After the recording layer formation step, the chemisorptive molecules in the recording layer are in a random state in which their orientation direction is not specified. It is also possible to use the recording medium without initialization, but if there are regions that are oriented in a certain direction, then this may lead to unexpected malfunctioning during operation, so that in the case of a recording layer that is changed into a random state by irradiation with unpolarized light, it is preferable that the chemisorptive molecules are reliably initialized into a random state in an initialization step. The following is an explanation of the initialization as well as the initialized state of a write-once optical recording medium.

If all information recording unit regions of the write-once optical recording medium can be set to the same orientation state, then it is possible to initialize the entire recording layer in the initialization step, or to initialize the recording layer partially. The orientation state may be a random state, an arbitrary orientation state with fixed orientation direction, or a predetermined orientation state with fixed orientation direction. If the chemisorptive molecules constituting the recording layer can be oriented optically, then the orientation state also may be an arbitrary orientation state without fixed orientation direction, or a predetermined orientation state without fixed orientation direction.

Furthermore, in the initialization step, it is also possible to subject the surface of the recording layer to a rubbing process to initialize the recording layer to an arbitrary orientation state or a predetermined orientation state. In this case, the reading precision may be lowered due to diffused reflection when the surface of the medium substrate is damaged, so that it is essential to ensure that the surface of the medium substrate is damaged as little as possible.

To initialize the entire recording layer, it is possible to initialize the entire recording layer into an arbitrary fixed orientation state or a predetermined fixed orientation state by bulk irradiation or scanning irradiation with polarized reaction light with fixed polarization direction and propagation direction. A recording layer that can be oriented with polarized light can be initialized to an arbitrary orientation state or a predetermined orientation state by bulk irradiation or scanning irradiation of the entire recording layer with polarized orientation light with fixed polarization direction and propagation direction. A recording layer also having the property that it can be changed to a random state by irradiation with unpolarized light can be initialized to a random state by bulk irradiation or scanning irradiation of the entire recording layer with unpolarized orientation light.

Taking disk-shaped, tape-shaped and card-shaped optical recording media as examples, the following is an explanation of how the recording layer can be partially initialized.

In the case of a disk-shaped optical recording medium, it is preferable to arrange the information recording unit regions in groups of concentric circles or in a spiral shape. In this case, the orientation state of all chemisorptive molecules included in the information recording unit regions can be initialized to a random state or a predetermined orientation state or a predetermined fixed orientation state by rotating the disk-shaped optical recording medium and moving unpolarized orientation light or polarized orientation light or polarized reaction light with fixed polarization direction and propagation direction in radial direction.

To initialize a disk-shaped optical recording medium, it is possible to intermittently irradiate unpolarized orientation light, polarized orientation light, or polarized reaction light onto each of the information recording unit regions, or to successively irradiate the information recording unit regions continuously with orientation light. In this case, it is preferable that the disk-shaped optical recording medium is rotated continuously. Furthermore, it is preferable to irradiate the medium substrate with unpolarized orientation light or polarized orientation light from a direction substantially perpendicular to the disk-shaped medium substrate surface.

It is also possible to initialize all information recording unit regions into an arbitrary fixed orientation state at once without rotating the disk-shaped optical recording medium by preparing a photo-mask provided with a predetermined pattern and irradiating polarized reaction light with fixed polarization direction and propagation direction through the photo-mask onto the recording layer.

Furthermore, it is also possible to initialize all information recording unit regions into an arbitrary fixed orientation state at once by forming a photo-mask on a polarizer, irradiating unpolarized reaction light through the polarizer, and irradiating the recording layer with the polarized reaction light that has passed through the polarizer.

In the case of a tape-shaped optical recording medium or a card-shaped optical recording medium, it is preferable that the information recording unit regions are arranged in parallel lines or groups of parallel lines extending in a longitudinal direction of the optical recording medium, or in groups of parallel lines that intersect at a predetermined angle with the longitudinal direction of the medium.

For these types of initialization, the tape-shaped optical recording medium or card-shaped optical recording medium is transported in longitudinal direction and the polarized orientation light or polarized reaction light with fixed polarization direction and propagation direction is shifted in a direction perpendicular to the longitudinal direction of the medium, so that the orientation state of all chemisorptive molecules included in the information recording unit regions can be initialized to a predetermined orientation state or a predetermined fixed orientation state.

In these tape-shaped optical recording media or card-shaped optical recording media, all information recording unit regions can be initialized by intermittently irradiating the polarized orientation light or the polarized reaction light onto each of the information recording unit regions, but it is also possible to initialize all information recording unit regions with continuously irradiated polarized orientation light or polarized reaction light. It is preferable to continuously rotate the tape-shaped optical recording medium or card-shaped optical recording medium. Furthermore, it is preferable that the polarized orientation light or polarized reaction light is irradiated onto the medium substrate from a direction that is substantially perpendicular to the surface of the medium substrate.

In particular in the case of a card-shaped optical recording medium, it is also possible to initialize all information recording unit regions to a first predetermined orientation state, a first predetermined fixed orientation state, an arbitrary orientation state or an arbitrary fixed orientation state by irradiating polarized light with a fixed polarization direction and propagation direction onto all information recording unit regions of the recording layer while moving the irradiation position without transporting the optical recording medium forward. Furthermore, it is also possible to initialize all information recording unit regions at once by preparing a photo-mask provided with a predetermined pattern and irradiating polarized light through the photo-mask onto the recording layer.

EMBODIMENT 5

Embodiment 5 illustrates a recording method for recording digital information onto an erasable optical recording medium and a reproduction method for reading digital information recorded on an erasable optical recording medium.

The recording and reproduction methods for the erasable optical recording medium do not depend on the initialization state of the erasable optical recording medium. Consequently, all of the following recording and reproduction methods can be applied for any initialization state, if the recording layer has the property of being oriented by polarized light that changes the long axis orientation of the chemisorptive molecules in a specified direction that is determined by the polarization direction and the propagation direction of the polarized orientation light when polarized orientation light that is absorbed by the optically absorbing functional groups is irradiated, and the property that the long axis orientation of the chemisorptive molecules is changed in random directions when irradiated with unpolarized light that is absorbed by the optically absorbing functional groups. However, with recording layers having only the property of being oriented by polarized light, it is not possible to apply recording and reproduction methods using a random state as an information element.

First, the relationship between information elements and the long axis orientation of the chemisorptive molecules constituting the recording layer of the optical recording medium is explained. The ways to write information elements into the information recording unit regions can be broadly classified into two approaches, depending on whether the long axis orientation of the chemisorptive molecules included in the information recording unit regions is changed comprehensively into the same state, or whether the information recording unit regions are divided into two partitioned regions, and the long axis orientation of the chemisorptive molecules included in the partitioned regions is changed such that it is the same within the same partitioned regions and different among different partitioned regions. In the former, the information elements are specified by the orientation of the chemisorptive molecules, and in the latter, the information elements are specified by the area ratio of the partitioned regions in the two different orientation states.

Figure 16A:
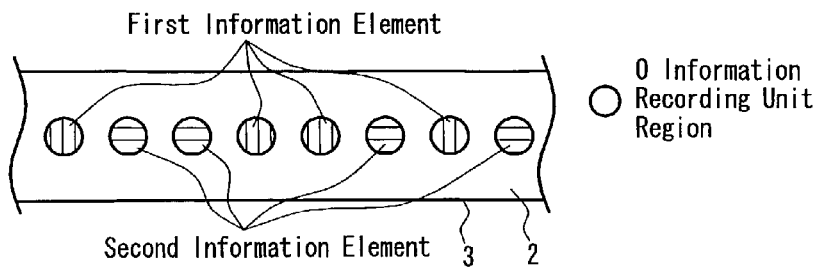
FIGS. 16A to 16D are schematic plan views illustrating the relationship between the information elements and the orientation states of the chemisorptive molecules constituting the recording layer, in accordance with the present invention.
Figure 16B:
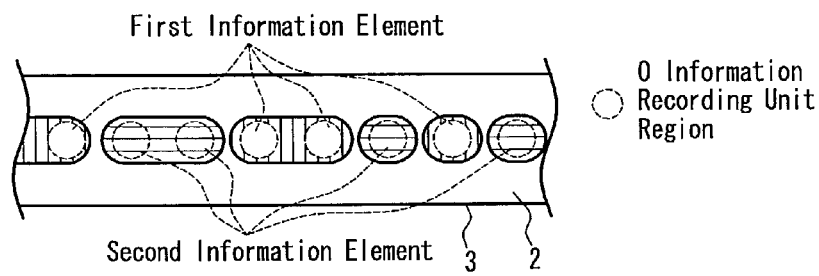
Figure 16C:
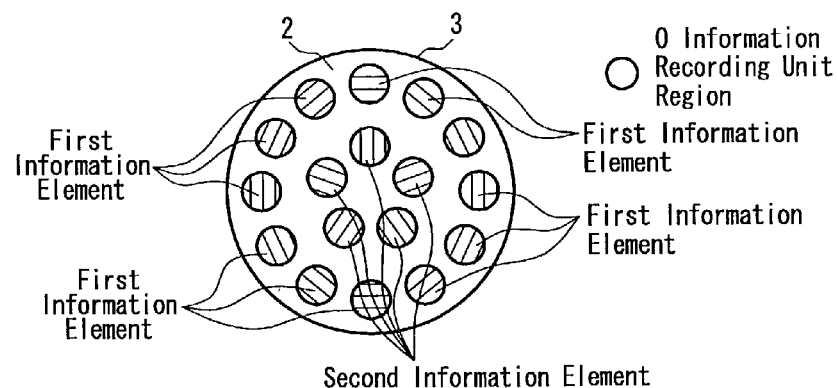
Figure 16D:
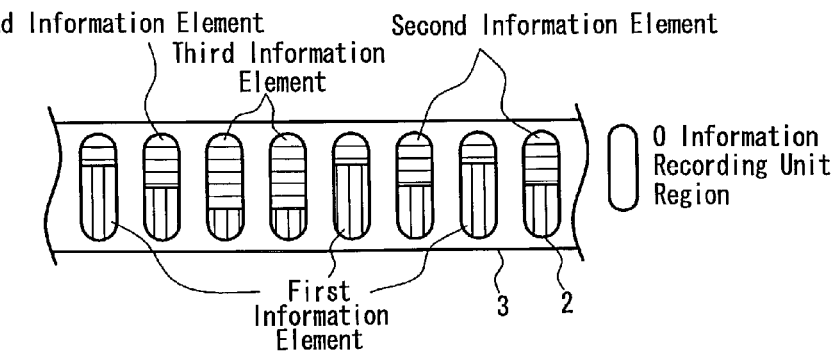

FIGS. 16A to 16D are schematic plan views illustrating the relationship between the information elements and the orientation states of the chemisorptive molecules constituting the recording layer. FIG. 16A shows an example of a binary recording, in which the long axis orientation of the chemisorptive molecules constituting the information recording unit regions in the recording layer 2 is taken as the information element. FIG. 16B shows an example of a binary recording, in which the long axis orientation of the chemisorptive molecules constituting the information recording unit regions in the recording layer 2 is taken as the information element. FIG. 16C shows an example of a binary recording on a disk-shaped optical recording medium, in which the long axis orientation of the chemisorptive molecules constituting the information recording unit regions in the recording layer 2 is taken as the information element. FIG. 16D shows an example of a ternary recording, in which the area ratio between two kinds of orientations of the chemisorptive molecules constituting the information recording unit regions in the recording layer 2 is taken as the information element.

In a recording in which the information element is specified by the orientation state of the chemisorptive molecules, it is possible to record information in binary representation using two kinds of information elements, or record the information in a higher base representation using three or more information elements.

In binary representation, possible sets of two kinds of information elements include a random state and an arbitrary orientation state, a first predetermined orientation state and an arbitrary orientation state other than the first predetermined orientation state, a random state and a predetermined orientation state, and a first predetermined orientation state and a second predetermined orientation state. The latter two are preferable.

Figure 17A:
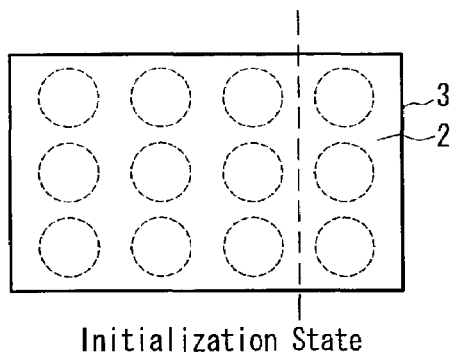
FIGS. 17A to 17C are schematic plan views illustrating binary recordings on a recording layer 2 whose initialization state is entirely in a random state, in accordance with the present invention.
Figure 17B:
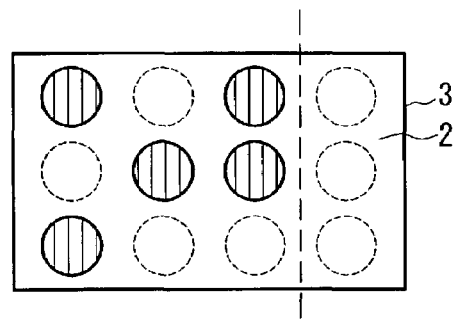
Figure 17C:
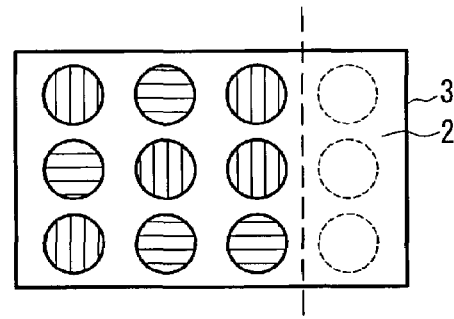

FIGS. 17A to 17C are schematic plan views illustrating binary recordings on a recording layer 2 whose initialization state is entirely in a random state. FIG. 17A shows the initialization state. FIG. 17B shows a state in which binary information has been recorded with a random state and a predetermined orientation state as information elements. FIG. 17C shows a state in which binary information has been recorded with a first predetermined orientation state and a second predetermined orientation state as information elements.

Figure 18A:
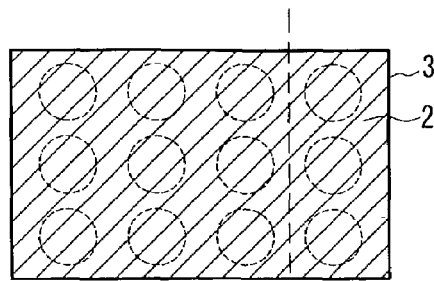
FIGS. 18A to 18E are schematic plan views illustrating binary recordings on a recording layer whose initialization state is entirely in a predetermined orientation state, in accordance with the present invention.
Figure 18B:
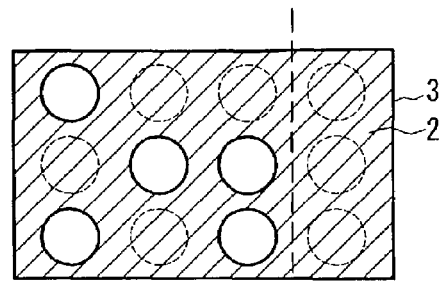
Figure 18C:
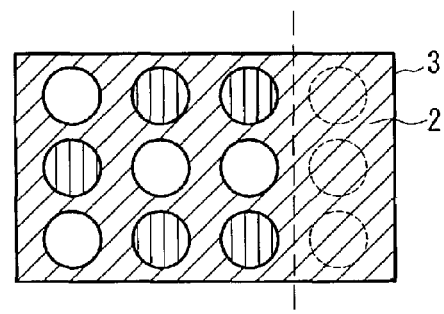
Figure 18D:
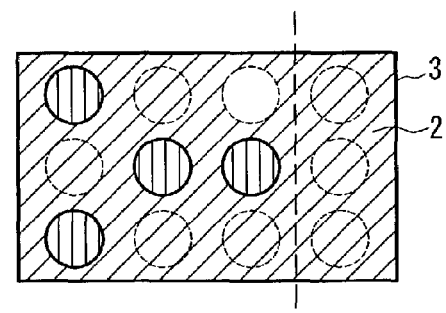
Figure 18E:
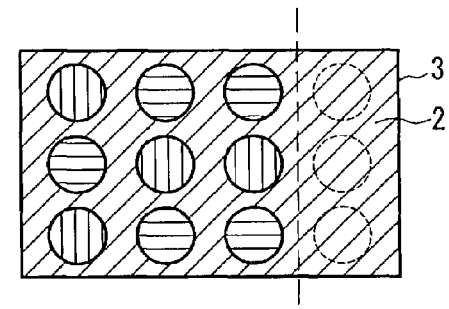

FIGS. 18A to 18E are schematic plan views illustrating binary recordings on a recording layer 2 whose initialization state is entirely in a predetermined orientation state. FIG. 18A shows the initialization state. FIG. 18B shows a state in which binary information has been recorded with the initialization state (predetermined orientation state) and a random state as information elements. FIG. 18C shows a state in which binary information has been recorded with a predetermined orientation state whose orientation is different from the initialization state and a random state as information elements. FIG. 18D shows a state in which binary information has been recorded with the initialization state (predetermined orientation state) and a predetermined orientation state whose orientation is different from the initialization state as information elements. FIG. 18E shows a state in which binary information has been recorded with a first predetermined orientation state whose orientation is different from the initialization state and a second predetermined orientation state whose orientation is different from the initialization state.

Figure 19A:
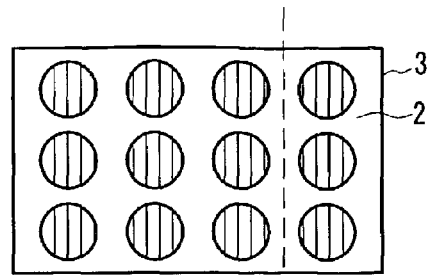
FIGS. 19A to 19E are schematic plan views illustrating examples of binary recordings on a recording layer whose initialization state is partially in a predetermined orientation state, in accordance with the present invention.
Figure 19B:
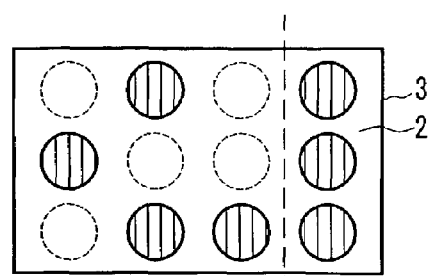
Figure 19C:
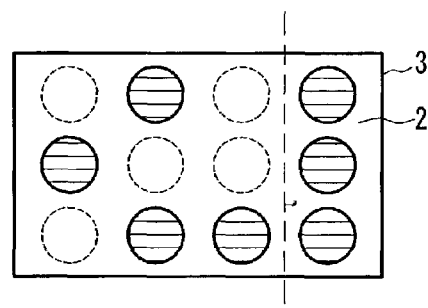
Figure 19D:
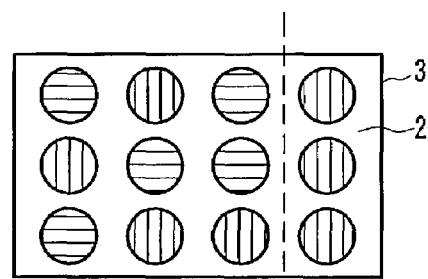
Figure 19E:
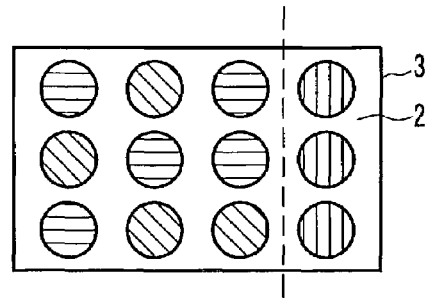

FIGS. 19A to 19E are schematic plan views illustrating examples of binary recordings on a recording layer 2 whose initialization state is partially in a predetermined orientation state. FIG. 19A shows the initialization state. FIG. 19B shows a state in which binary information has been recorded with the initialization state (predetermined orientation state) and a random state as information elements. FIG. 19C shows a state in which binary information has been recorded with a predetermined orientation state whose orientation is different from the initialization state and a random state as information elements. FIG. 19D shows a state in which binary information has been recorded with the initialization state (predetermined orientation state) and a predetermined orientation state whose orientation is different from the initialization state as information elements. FIG. 19E shows a state in which binary information has been recorded with a first predetermined orientation state whose orientation is different from the initialization state and a second predetermined orientation state whose orientation is different from the initialization state.

For n-ary representations as examples of higher base representations, it is preferable to take a random state, a first predetermined orientation state, a second predetermined orientation state . . . a n-$1^{st}$ predetermined orientation state, or a first predetermined orientation state, a second predetermined orientation state . . . a $n^{th}$ predetermined orientation state as the sets of n types information elements.

Figure 20A:
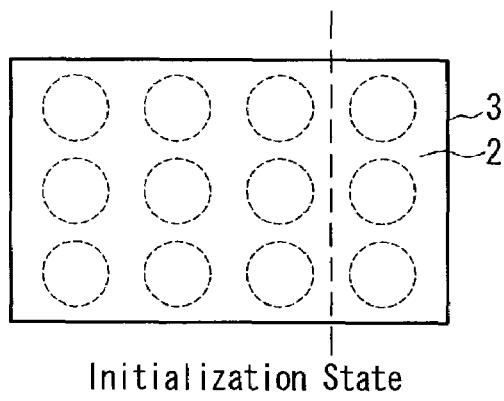
FIGS. 20A to 20C are schematic plan views illustrating examples of higher base recordings on a recording layer whose initialization state is entirely in a random state, in accordance with the present invention.
Figure 20B:
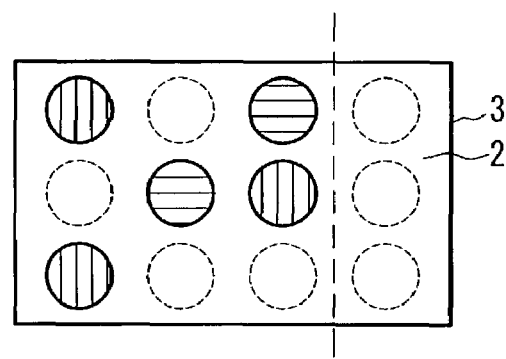
Figure 20C:
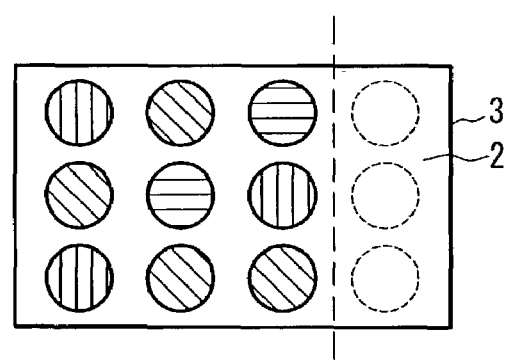

FIGS. 20A to 20C are schematic plan views illustrating examples of higher base recordings on a recording layer 2 whose initialization state is entirely in a random state. FIG. 20A shows the initialization state. FIG. 20B shows a state in which ternary information has been recorded with a first predetermined orientation state and a second predetermined orientation state as information elements. FIG. 20C shows a state in which ternary information has been recorded with a first predetermined orientation state, a second predetermined orientation state, and a third predetermined orientation state as information elements.

Figure 21A:
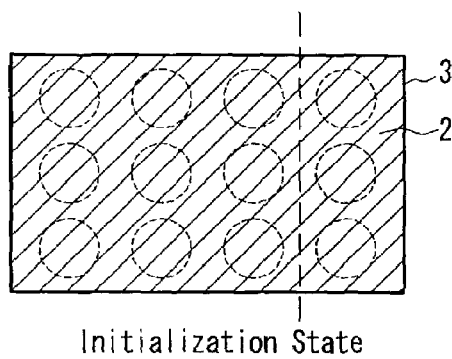
FIGS. 21A to 21E are schematic plan views illustrating examples of higher base recordings on a recording layer whose initialization state is entirely in a predetermined orientation state.
Figure 21B:
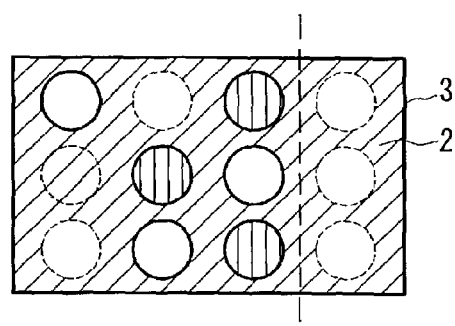
Figure 21C:
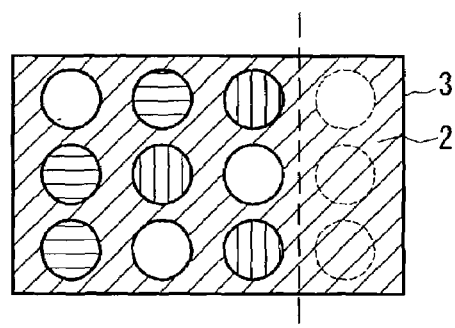
Figure 21D:
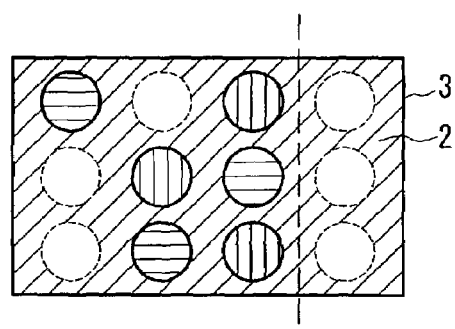
Figure 21E:
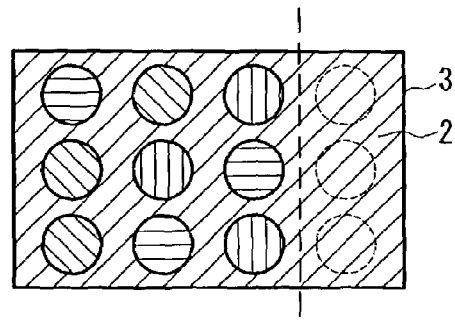

FIGS. 21A to 21E are schematic plan views illustrating examples of higher base recordings on a recording layer 2 whose initialization state is entirely in a predetermined orientation state. FIG. 21A shows the initialization state (first predetermined orientation state). FIG. 21B shows a state in which ternary information has been recorded with a random state and a second predetermined orientation state as information elements. FIG. 21C shows a state in which ternary information has been recorded with a random state, a first predetermined orientation state, and a second predetermined orientation state as information elements. FIG. 21D shows a state in which ternary information has been recorded with the initialization state (first predetermined orientation state), a second predetermined orientation state and a third predetermined orientation state as information elements. FIG. 21E shows a state in which ternary information has been recorded with a first predetermined orientation state, a second predetermined orientation state and a third predetermined orientation state as information elements.

Figure 22A:
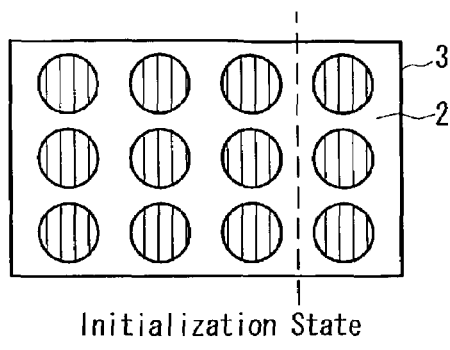
FIGS. 22A to 22E are schematic plan views illustrating examples of higher base recordings on a recording layer whose initialization state is partially in a predetermined orientation state, in accordance with the present invention.
Figure 22B:
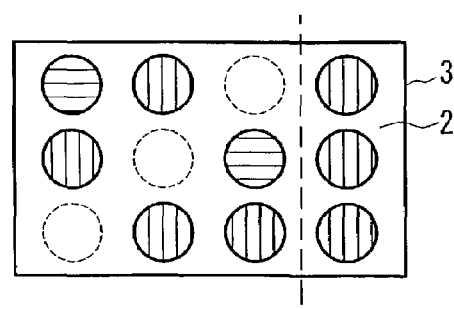
Figure 22C:
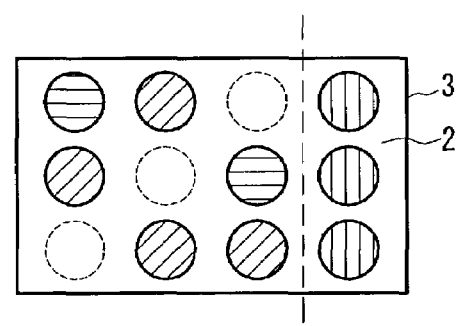
Figure 22D:
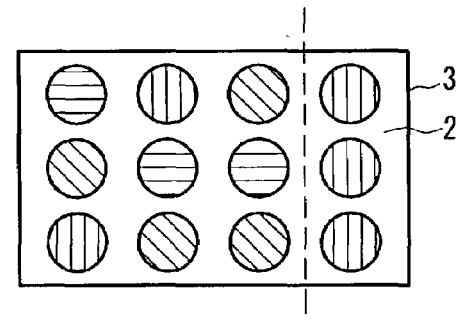
Figure 22E:
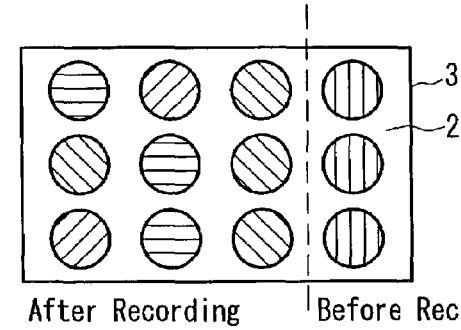

FIGS. 22A to 22E are schematic plan views illustrating examples of higher base recordings on a recording layer 2 whose initialization state is partially in a predetermined orientation state. FIG. 22A shows the initialization state (first predetermined orientation state). FIG. 22B shows a state in which ternary information has been recorded with a random state and a second predetermined orientation state as information elements. FIG. 22C shows a state in which ternary information has been recorded with a random state, a first predetermined orientation state, and a second predetermined orientation state as information elements. FIG. 22D shows a state in which ternary information has been recorded with the initialization state (first predetermined orientation state), a second predetermined orientation state and a third predetermined orientation state as information elements. FIG. 22E shows a state in which ternary information has been recorded with a first predetermined orientation state, a second predetermined orientation state and a third predetermined orientation state as information elements.

For higher base representations, in case of base 2m representations (wherein m is an natural number), the conversion from binary information signals to base 2m information signals becomes easy. In general, even-numbered bit information is used as the information units, so that it is preferable to use a base 2m representation (wherein m is an natural number).

For the plurality of different predetermined orientation states in the recording, it is preferable that the tilt angle with respect to the medium substrate is constant and only the inclination angle is different, or that the inclination angle with respect to the medium substrate is constant and only the tilt angle is different. The former case can be achieved by irradiating recording light whose propagation direction is held in a predetermined direction with respect to a reference direction of the optical recording medium, but with different polarization directions. In this case, it is preferable that the propagation direction of the polarized recording light is perpendicular to the surface of the optical recording medium. In the latter case, the polarization direction is held in a reference direction of the optical recording medium, and the polarized recording light is irradiated with different propagation directions.

Considering the ease and the precision with which information can be written or read out, it is preferable that for the plurality of predetermined orientation states with different orientation directions, predetermined orientation states in which the tilt angle with respect to the medium substrate is constant and only the orientation direction is different are taken as information elements.

In recordings in which the information elements are specified by the area ratio of the partitioned regions with two different orientation states, preferable sets of two kinds of orientation states are sets of a random state and a predetermined orientation state, and sets of a first predetermined orientation state and a second predetermined orientation state. Information recordings with binary representations using a first area ratio and a second area ratio as the information elements, or with higher base representations using three or more area ratios as the information elements are also possible.

The following is an explanation of a method for reproducing information. This should be a method in which the information elements written into the information recording unit regions can be specified by irradiating reference light, and the reference light can be irradiated one by one on each of the information recording unit regions, or it can be irradiated on a region including a plurality of information recording unit regions. If the reference light is irradiated one by one on each of the information recording unit regions, then it is preferable that the reference light is focused within the information recording unit regions, which improves the reading precision. If the reference light is irradiated on a region including a plurality of information recording unit regions, then the information elements in a plurality of information recording unit regions can be specified simultaneously by specifying the intensity of the reference light that has passed through the various information recording unit regions or the intensity distribution of the polarized light components of that reference light.

The following is an explanation of information reproduction methods in which reference light is irradiated one by one onto each set of information elements in the recording layer, one by one for each information recording unit region.

Firstly, in the reproduction of information that has been recorded using a random state and an arbitrary orientation state as information elements, the information elements can be specified in terms of the presence of an arbitrary orientation by irradiating unpolarized reference light one by one onto each of the information recording unit regions and measuring the intensity of light that is transmitted through the information recording unit regions to detect the presence of an arbitrary orientation. It is also possible to specify the information elements in terms of the random state by passing the transmitted light through a polarizer and measuring the intensity of the reference light for a plurality of orientations of the transmission axis of the polarizer, and detecting the absence of a dependency of the intensity distribution of the polarized components of the transmitted light from the orientation (indicating a random state).

Secondly, in the reproduction of information that has been recorded using a random state and a predetermined orientation state as information elements, the information elements can be specified in terms of the presence of the predetermined orientation by irradiating unpolarized reference light onto the recording layer and measuring the intensity of the transmitted light.

The information elements also can be specified with high precision in terms of orientation differences by irradiating unpolarized reference light onto the recording layer and measuring the intensity of transmitted light that has passed through a polarizer whose transmission axis has been arranged in a predetermined orientation. In this case, it is preferable that the orientation of the transmission axis is set such that changes due to the differences among the information elements become maximal.

The information elements also can be specified by irradiating polarized reference light onto the recording layer and measuring the intensity of transmitted light. In this case, if the polarization direction of the reference light is identical with or perpendicular to the polarization direction of the polarized recording light used to introduce the different predetermined orientation states, then the information elements can be specified with high precision in terms of their different orientations, which is preferable.

The information elements also can be specified in terms of orientation differences by irradiating polarized reference light onto the recording layer and measuring the intensity of transmitted light that has further passed through a polarizer. In this case, if the polarization direction of the polarized reference light is identical with or perpendicular to the polarization direction of the polarized recording light used to introduce the different predetermined orientation states, then the information elements can be specified with high precision in terms of their different orientations, which is preferable.

Thirdly, in the reproduction of information that has been recorded using two predetermined orientation states as information elements, the information elements can be specified in terms of their different orientations by irradiating unpolarized reference light onto the recording layer and measuring the intensity of the transmitted light through a polarizer. Here, the method for specifying the information elements may be a method of specifying the information elements by detecting the orientation direction by ascertaining whether the measured intensity is larger or smaller than a predetermined first intensity, a method of specifying the information elements by detecting the orientation direction by ascertaining whether the measured intensity is within a predetermined first intensity range, a method of specifying the information elements by detecting the orientation direction by ascertaining whether the measured intensity is larger than a predetermined first intensity or smaller than a predetermined second intensity, or it can be the reliable method of specifying the information elements by detecting the orientation direction by ascertaining whether the measured intensity is within a predetermined first intensity range or within a predetermined second intensity range.

The information elements also can be specified in terms of orientation differences by irradiating polarized reference light onto the recording layer and measuring the intensity of transmitted light. If the polarization direction of the reference light is identical with or perpendicular to the polarization direction of the polarized recording light used to introduce the two different predetermined orientation states, then the information elements can be specified with high precision.

The information elements also can be specified in terms of orientation differences by irradiating polarized reference light onto the recording layer and measuring the intensity of transmitted light that has passed through the recording layer and further passed through a polarizer. If the polarization direction of the reference light is identical with or perpendicular to the polarization direction of the polarized recording light used to introduce the two different predetermined orientation states, then the information elements can be specified with extremely high precision.

Fourthly, in the reproduction of information that has been recorded using a predetermined orientation state and an arbitrary orientation state different from the predetermined orientation state as information elements, the information elements can be specified in terms of their different orientations by irradiating unpolarized reference light onto the recording layer and measuring the intensity of the transmitted light through a polarizer. Here, the method for specifying the information elements may be a method of specifying the information elements by detecting the orientation direction by ascertaining whether the measured intensity is within a predetermined intensity range.

Fifthly, in the reproduction of information that has been recorded using three or more predetermined orientation states of different orientations as information elements, the information elements can be specified by irradiating unpolarized reference light onto the recording layer and measuring the intensity distribution of the polarized light components of the light that has been transmitted through the recording layer for a plurality of different orientations of the transmission axis of a polarizer to detect the intensity distribution of the polarized light components of the transmitted light.

Furthermore, using polarized reference light with a polarization direction that is not linearly symmetric to any two predetermined orientation states selected from three or more predetermined orientation states corresponding to information elements, the various information elements can be specified by irradiating polarized reference light onto the recording layer and measuring the intensity of the transmitted light. To specify the information elements in this case, it is possible to detect the orientation direction by ascertaining whether the measured intensity is within predetermined intensity ranges corresponding to respective information elements.

Sixthly, in the reproduction of information that has been recorded using a random state and a plurality of predetermined orientation states of different orientations as information elements, the information elements can be specified by irradiating unpolarized reference light onto the recording layer and measuring the intensity distribution of the polarized light components of the light that has been transmitted through the recording layer for a plurality of different orientations of the transmission axis of a polarizer to detect the intensity distribution of the polarized light components of the transmitted light.

Furthermore, using polarized reference light with a polarization direction that is not linearly symmetric to any two predetermined orientation states selected from three or more predetermined orientation states corresponding to information elements, the various information elements can be specified by irradiating polarized reference light onto the recording layer and measuring the intensity of the transmitted light. To specify the information elements in this case, it is possible to detect the long axis orientation of the chemisorptive molecules (i.e. predetermined and random orientation), depending on whether the measured intensity is within predetermined intensity ranges corresponding to respective information elements.

Seventhly, in the reproduction of information that has been recorded using, as information elements, a plurality of partition states with different area partition ratios between a first partition region of a random state and a second partition region of an arbitrary orientation state in the information recording unit regions, the information elements can be specified by irradiating unpolarized reference light onto the recording layer and measuring the intensity of the light that has been transmitted through the recording layer.

Eighthly, in the reproduction of information that has been recorded using, as information elements, n partition states (with n being an integer of 2 or greater) with different area partition ratios between a first partition region of a random state and a second partition region of a predetermined orientation state in the information recording unit regions, the information elements can be specified by irradiating unpolarized reference light onto the recording layer and measuring the intensity of the light that has been transmitted through the recording layer and furthermore passed through a polarizer.

Furthermore, the information elements can be specified by irradiating unpolarized reference light onto the recording layer and measuring the intensity of transmitted light that furthermore has been passed through a polarizer whose transmission axis is set to a predetermined direction. In this case, it is preferable that the direction of the transmission axis of the polarizer is set such that the changes due to the difference of the information elements become maximal.

Furthermore, the information elements can be specified by irradiating polarized reference light onto the recording layer and measuring the intensity of transmitted light. In this case, it is preferable that the polarization direction of the polarized reference light is identical or perpendicular to the polarization direction of the polarized recording light used to introduce the different predetermined orientation states.

Furthermore, the information elements can be specified by irradiating polarized reference light onto the recording layer and measuring the intensity of transmitted light that further has been passed through a polarizer. In this case, if the polarization direction of the polarized reference light is identical or perpendicular to the polarization direction of the polarized recording light used to introduce the different predetermined orientation states, then the information elements can be specified with high precision in terms of the differences between the orientation directions.

Ninthly, in the reproduction of information that has been recorded using, as information elements, a plurality of partition states with different area partition ratios between a first partition region of first predetermined orientation state and a second partition region of a second predetermined orientation state in the information recording unit regions, the information elements can be specified by irradiating unpolarized reference light onto the recording layer and measuring the intensity of the light that has been transmitted through the recording layer and furthermore passed through a polarizer.

Furthermore, the information elements can be specified by irradiating polarized reference light onto the recording layer and measuring the intensity of light that has been transmitted through the recording layer. In this case, it is preferable to set the polarization direction of the polarized reference light to be identical or perpendicular to the polarization direction of the polarized recording light used to introduce the two predetermined orientation states.

Furthermore, the information elements also can be specified in terms of differences in the orientation direction by irradiating polarized reference light onto the recording layer and measuring the intensity of light that has been transmitted through the recording layer and further passed through a polarizer. In this case, it is preferable to set the polarization direction of the polarized reference light to be identical or perpendicular to the polarization direction of the polarized recording light used to introduce the two predetermined orientation states.

As the method for specifying the information elements in the seventh to ninth methods of reproducing recorded information, it is preferable to specify the information elements by ascertaining whether the intensity is within a predetermined first intensity region, a predetermined second intensity region, . . . or a predetermined n-th intensity region. Furthermore, if two partition states are taken as the information elements, then it is possible to use a method of specifying the information elements by detecting the area partition ratio by ascertaining whether the measured intensity is larger or smaller than a predetermined intensity, a method of specifying the information elements by detecting the area partition ratio by ascertaining whether the measured intensity is within a predetermined first intensity range, or a method of specifying the information elements by ascertaining whether the measured intensity is larger than a predetermined first intensity or smaller than a predetermined second intensity lower than the first intensity.

EMBODIMENT 6

Embodiment 6 illustrates a recording method for recording digital information onto a write-once optical recording medium and a reproduction method for reading digital information recorded on a write-once optical recording medium.

In contrast to the erasable optical recording medium of Embodiment 5, the recording methods for a write-once optical recording medium depend on the initialization state of the write-once optical recording medium. Consequently, the recording methods are explained for each of the initialization states of the write-once optical recording medium in Embodiment 4. In this Embodiment 6, different predetermined directions mean different orientation directions.

First, as in Embodiment 5, the ways to write information elements can be broadly classified into two approaches, depending on whether the orientation state of the chemisorptive molecules included in the information recording unit regions is changed comprehensively into the same state, or whether the information recording unit regions are divided into two partitioned regions, and the orientation state of the chemisorptive molecules included in the partitioned regions is changed such that it is the same within the same partitioned regions and different among different partitioned regions. In the former, the information elements are specified by the orientation of the chemisorptive molecules, and binary representations using two information elements or higher base representations using three or more information elements are possible. In the latter, the information elements are specified by the area ratio of the two partitioned regions in the different orientation states, and binary representations using two partition ratios or higher base representations using three or more partition ratios are possible.

Different from Embodiment 5, at least one kind of information element has to be in a fixed state of orientation. It is not preferable that a state in which the orientation is fixed to the random state is used as an information element. This is because it is very difficult to polymerize the organic molecules constituting the recording layer while maintaining the random state at high precision.

Firstly, when recording information on a write-once optical recording medium provided with a recording layer that is initialized to a random state and whose orientation can be fixed by polarized light, then it is preferable to use as the sets of information elements a random state and an arbitrary orientation state or a predetermined orientation state, a random state and a plurality of predetermined fixed orientation states, a first predetermined fixed orientation state and a second predetermined fixed orientation state, or three or more predetermined fixed orientation states.

Secondly, when recording information on a write-once optical recording medium provided with a recording layer that is initialized to a predetermined orientation state of a first orientation direction and whose orientation can be fixed by polarized light, then it is preferable to use as the sets of information elements a predetermined orientation state that is oriented in the first orientation direction of the initialization state and a predetermined fixed orientation state that is oriented and fixed in a second orientation direction different from the first orientation direction, a predetermined orientation state that is oriented in the first orientation direction of the initialization state and a plurality of predetermined fixed orientation states oriented in orientation directions that are different from the first orientation direction as well as mutually different, a second predetermined fixed orientation state that is oriented in a second orientation direction different from the orientation direction of the initialization state and a predetermined fixed orientation state that is oriented in a third orientation direction that is different from the first orientation direction and the second orientation direction, or a plurality of predetermined fixed orientation states oriented in orientation directions that are different from the first orientation direction of the initialization state as well as mutually different, Thirdly, when recording information on a write-once optical recording medium provided with a recording layer that is initialized to an arbitrary orientation state and whose orientation can be fixed by polarized light, then it is preferable to use as the sets of information elements a first predetermined fixed orientation state that is oriented in a first orientation direction and a second predetermined fixed orientation state that is oriented in a second orientation direction different from the first orientation direction, or a plurality of predetermined fixed orientation states oriented in orientation directions that are different from the first orientation direction of the initialization state as well as mutually different.

Fourthly, when recording information on a write-once optical recording medium provided with a recording layer that is initialized to first predetermined fixed orientation state in which all information recording unit regions have been oriented and fixed to a first orientation direction, then it is possible to use as the set of information elements the first predetermined fixed orientation state of the initialization state and a random state attained by destroying the film structure of the recording layer.

Fifthly, when recording information on a write-once optical recording medium provided with a recording layer that is initialized to an arbitrary orientation state in which the information recording unit regions have been oriented and fixed to an arbitrary orientation direction, then it is possible to use as the set of information elements the arbitrary orientation state of the initialization state and a random state attained by destroying the film structure of the recording layer.

The following is an explanation of methods for reproducing recorded information. To specify the information elements, it is possible to regard predetermined fixed orientation states and predetermined orientation states with like orientation directions as like information elements. Consequently, it is possible to reproduce recorded information in the same manner as in the reproduction methods described in Embodiment 5.

EMBODIMENT 7

Figure 23:
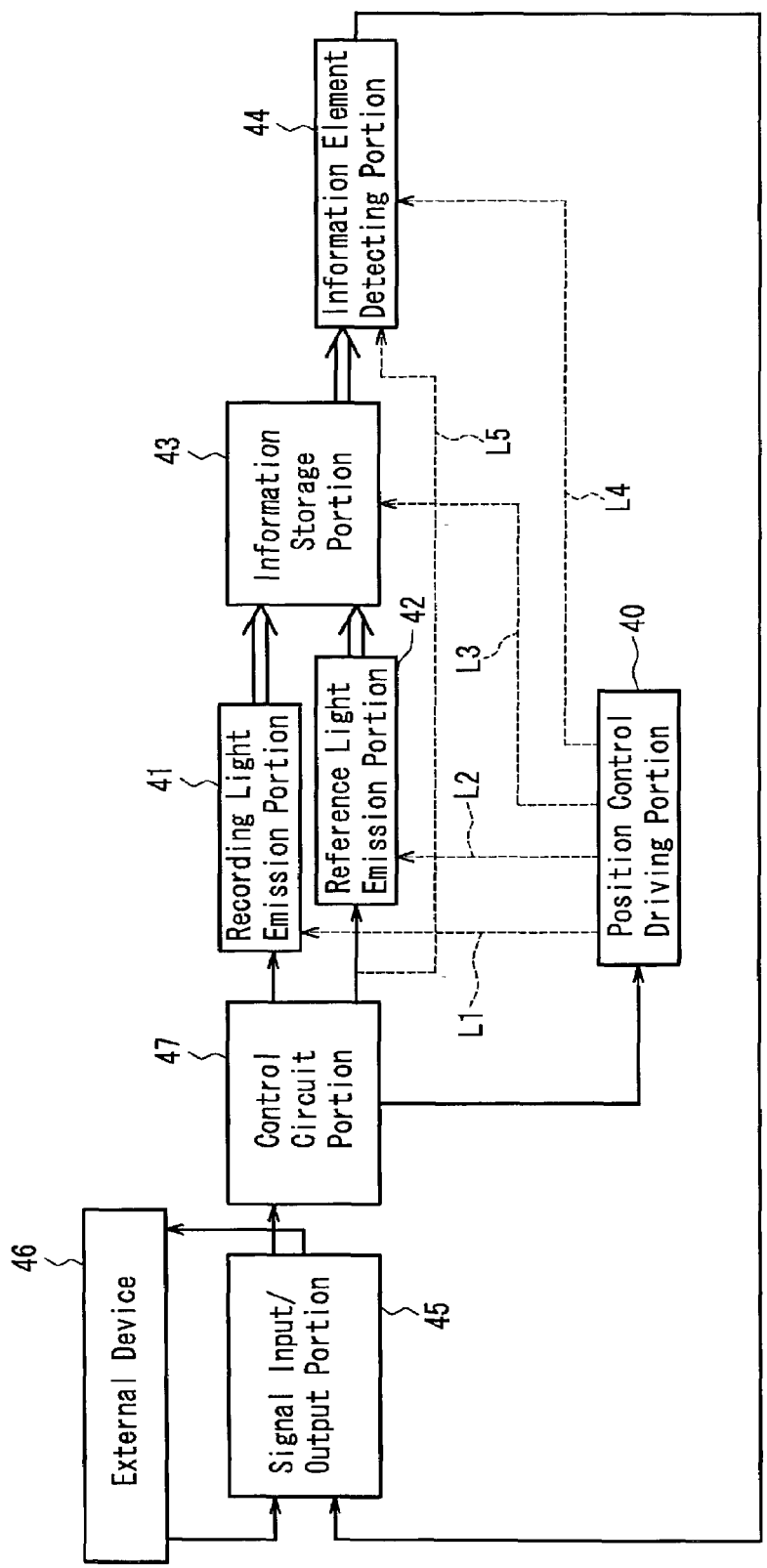
FIG. 23 is a block diagram illustrating the configuration of a information recording/reproducing device in accordance with the present invention.

Embodiment 7 illustrates an information recording/reproducing device for recording and reproducing information on an erasable optical recording medium or a write-once optical recording medium. FIG. 23 is a block diagram illustrating the configuration of this information recording/reproducing device. The control lines L1 to L5, which are indicated by broken lines in FIG. 23, depend on the configuration of the information recording/reproducing device, and if only the optical recording medium is driven, then the control line L3 from the position control driving portion 40 to the information storage portion 43 is sufficient. If only the irradiated light is moved, then the control line L1 from the position control driving portion 40 to the recording light emission portion 41 and the control line L2 from the position control driving portion 40 to the reference light emission portion 42 are necessary. However, either L1 and L2 or L3 have to be provided. For an information recording/reproducing device provided with an information element detecting portion 44 having a movable polarizer, or an information recording/reproducing device in which the information element detecting portion 44 moves in the course of irradiation of reference light, the control line L4 from the position control driving portion 40 to the information element detecting portion 44 is necessary. Signals from the information element detecting portion 44 are sent to the signal input/output portion 45, if necessary exchanged with an external device 46, and then entered into a control circuit portion 47. From there the signals are sent to the position control driving portion 40, the recording light emission portion 41 and the reference light emission portion 42.

The information recording/reproducing device may incorporate an optical recording medium, or the optical recording medium may be of a removable type, so that it can be inserted and retrieved. Compared to conventional information recording/reproducing devices using magnetic disks, magnetic tapes, flexible disks (FDs), optomagnetic disks and CDs, the main differences are the recording medium, the method for recording information and the method for reproducing information. For the operation method of the information recording/reproducing device according to the present invention, roughly the same technology as for conventional information recording/reproducing devices can be utilized.

Figure 24:
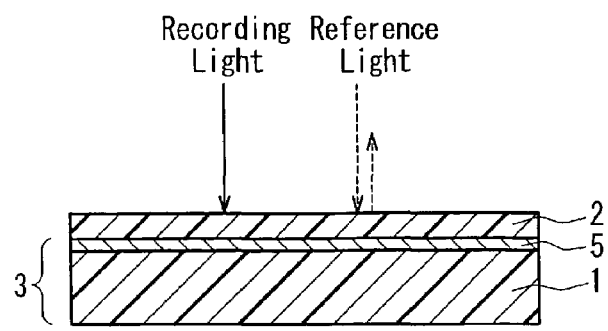
FIG. 24 is a schematic cross-sectional view showing the irradiation directions of recording light and reference light with respect to an optical recording medium provided with an optically reflective medium substrate, in accordance with the present invention.

As recording media, it is possible to use reflective-type reproduction optical recording media or transmissive-type reproduction optical recording media. In case of a reflective-type reproduction optical recording medium, both the recording light and the reference light should be incident from the side of the recording layer 2 of the recording medium 3, as shown in FIG. 24. It is possible to guide the recording light and the reference light from the recording light emission portion and the reference light emission portion arranged at suitable positions with an optical system (optical transfer system), but in general, it is preferable that the optical path from the recording light emission portion to the optical recording medium and the optical path from the reference light emission portion to the optical recording medium are straight lines, because changing the propagation direction by reflective plates or the like also may change the polarization direction. It is also preferable that the reference light is perpendicularly incident on the optical recording medium, because this reduces changes in the polarization components of the reference light due to reflections at the optical reflection film 5 of the recording medium. That is to say, it is preferable that the recording light emission portion and the reference light emission portion are arranged above the recording layer 2 of the optical recording medium and the recording light and the reference light are emitted perpendicularly onto the optical recording medium.

In this case, light that has passed through the recording layer and has been reflected at the optically reflective film 5 may be guided to an optical sensor with beam splitters, half mirrors or the like. In order to improve the recording/reproducing precision, it is essential that the orientation of the reflection plane of the beam splitters or half mirrors is optimized in accordance with the recording method.

When using an optical recording medium provided with recording layers on the front and the rear side of the recording medium, then it is preferable that a recording light emission portion and a reference light emission portion for the front side recording layer as well as a recording light emission portion and a reference light emission portion for the rear side recording layer are provided. It is also possible to provide only one set of recording light emission portion and reference light emission portion and to guide the recording light and the reference light to the front and the rear recording layers with an optical system.

Figure 25A:
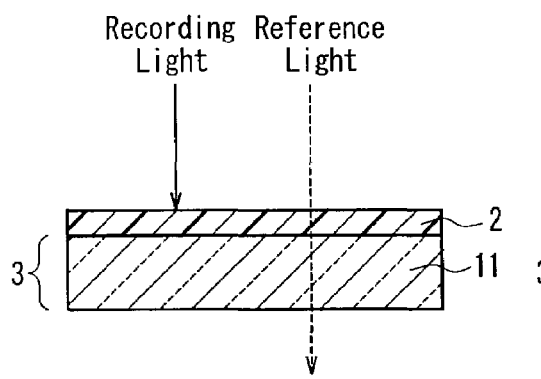
FIGS. 25A to 25D are schematic cross-sectional views showing the irradiation directions of recording light and reference light with respect to an optical recording medium provided with an optically transmissive medium substrate, in accordance with the present invention.
Figure 25B:
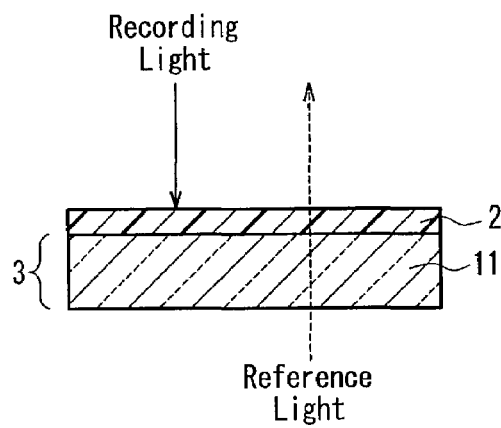
Figure 25C:
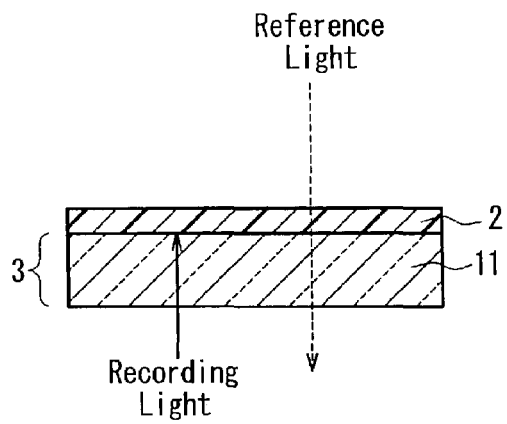
Figure 25D:
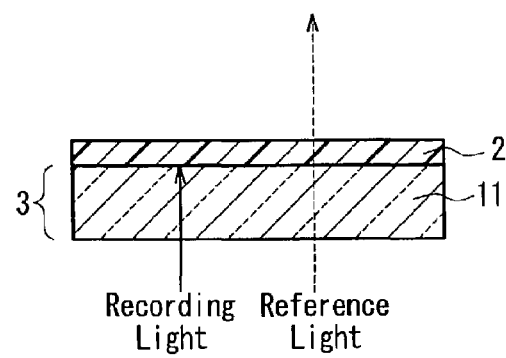

In case of a transmissive-type reproduction optical recording medium, it is possible to let the reference light be incident from the recording layer side of the optical recording medium, but it is also possible to let it be incident from the side opposite the recording layer. The same is true for the recording light. FIGS. 25A to 25D are schematic cross-sectional views showing the irradiation directions of recording light and reference light with respect to the recording layer 2 of an optical recording medium provided with an optically transmissive medium substrate 3. In FIG. 25A, the recording light and the reference light are irradiated from the side of the recording layer 2. In FIG. 25B, the recording light is irradiated from the side of the recording layer 2, and the reference light is irradiated from the side of the medium substrate 3. In FIG. 25C, the recording light is irradiated from the side of the medium substrate 3, and the reference light is irradiated from the side of the recording layer 2. In FIG. 25D, the recording light and the reference light are irradiated from the side of the medium substrate 3.

As in the above-described case of a reflective-type optical recording medium, it is preferable that the optical path from the recording light emission portion to the optical recording medium and the optical path from the reference light emission portion to the optical recording medium are straight lines. It is also preferable that the reference light is perpendicularly incident on the optical recording medium, because this reduces changes in the polarization components of the reference light due to refraction when passing through the recording medium.

EMBODIMENT 8

Embodiment 8 illustrates a preferable configuration of an information recording/reproducing device for recording and reproducing information on an erasable optical recording medium or a write-once optical recording medium.

First, recording and reproduction taking the random state and a predetermined orientation state as information elements, and recording and reproduction taking the area ratio between a first partitioned region in the random state and a second partitioned region in a predetermined orientation state as information elements is explained with reference to FIGS. 26A to 26C.

Figure 26A:
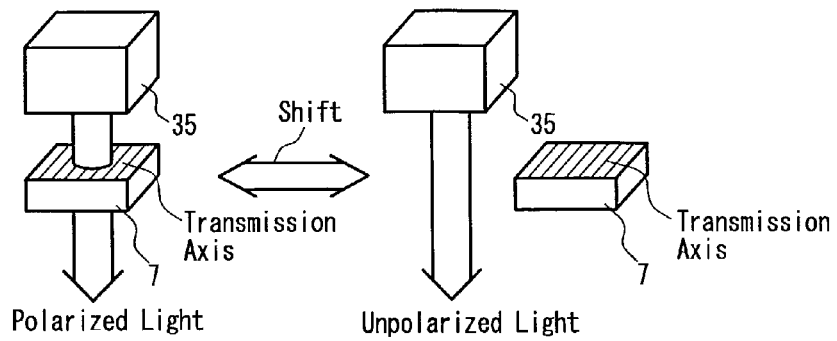
FIGS. 26A to 26C are schematic perspective views showing configuration examples of the light emission portions (that is, the recording light emission portion and the reference light emission portion), in accordance with the present invention.

As the recording light emission portion, it is preferable to use a recording means A including two unpolarized recording light sources and a polarizer that is arranged in the optical path of light emitted from one of the unpolarized light sources and that has a transmission axis that is arranged in a predetermined orientation, or to use a recording means B including one unpolarized recording light source, a shiftable polarizer whose transmission axis is arranged in a predetermined orientation and a driving means for selectively shifting the polarizer into or out of the optical path of light emitted from the unpolarized light source (see FIG. 26A).

The following four reproduction means A to D including a reference light emission means and an information element detection means are preferable as reproduction means.

In the reproduction means A, the reference light emission portion has one unpolarized reference light source, and the information element detecting portion has an optical sensor. The intensity of the unpolarized reference light from the reference light emission portion that has passed through the recording layer is measured by the optical sensor, and a predetermined electrical signal based on the measurement result is output to the signal input/output portion.

In the reproduction means B, the reference light emission portion has one unpolarized light source for reference light, and a polarizer that is arranged in the optical path of the light emitted from the unpolarized light source and whose transmission axis is set to a predetermined direction. The information element detection includes an optical sensor. The intensity of the polarized reference light from the reference light emission portion that has passed through the recording layer is measured by the optical sensor, and a predetermined electrical signal based on the measurement result is output to the signal input/output portion.

In the reproduction means C, the reference light emission portion has one unpolarized light source for reference light. The information element detecting portion has an optical sensor and an analyzer that is arranged in the optical path of the light entering the optical sensor and whose transmission axis is set to a predetermined direction. The intensity of the unpolarized reference light from the reference light emission portion that has passed through the recording layer and then through the analyzer is measured by the optical sensor, and a predetermined electrical signal based on the measurement result is output to the signal input/output portion.

In the reproduction means D, the reference light emission portion has one unpolarized light source for reference light, and a polarizer that is arranged in the optical path of the light emitted from the unpolarized light source and whose transmission axis is set to a predetermined direction. The information element detecting portion has an optical sensor and an analyzer that is arranged in the optical path of the light entering the sensor and whose transmission axis is set to a predetermined direction. The intensity of the reference light that has passed through the recording layer and then through the analyzer is measured by the optical sensor, and a predetermined electrical signal based on the measurement result is output to the signal input/output portion.

If the recording means A or B and the reproduction means B or D are used, the same polarizer can be used for the polarizer of the recording means and the polarizer of the reproduction means, which is preferable.

Furthermore, assuming that the transmission axis of the analyzer is not influenced by the recording layer and that the polarized recording light is guided over the same route to the analyzer as the reference light, it is most preferable that the transmission axis of the analyzer is perpendicular to the propagation direction of this virtual polarized recording light and that it is parallel or perpendicular to the polarization direction of this virtual polarized recording light.

Secondly, the following is an explanation of recording and reproducing when taking a first predetermined orientation state and a second predetermined orientation state as information elements, or recording and reproducing when taking an area ratio between a first partitioned region in a first predetermined orientation state and a second partitioned region in a second predetermined orientation state as information elements.

As the recording light emission portion, it is preferable to use a recording means C having one unpolarized recording light source, two shiftable polarizers whose transmission axes are set in different predetermined directions, and a driving device for selectively arranging one of the two polarizers in the optical path of the light emitted from the unpolarized light source; a recording means D having one unpolarized recording light source, a pivotable or rotatable polarizer arranged in the optical path of the light emitted from the unpolarized light source, and a driving device for pivoting or rotating the polarizer; a recording means E having two unpolarized recording light sources, two polarizers that are arranged respectively in the optical paths of the light emitted from the two unpolarized light sources and whose transmission axes are set to predetermined directions.

It is preferable to use the reproducing means B to D as the reproducing means provided with a reference light emission portion and an information element detecting portion.

In the recording means E, it is even more preferable to arrange the transmission axes of the two polarizers at a right angle, which allows the reading of information elements with high precision. Furthermore, when using the recording means C or D and using the reproduction means B or D, it is possible to use one polarizer for both the reference light emission portion and the recording light emission portion.

Furthermore, assuming that the transmission axis of the analyzer is not influenced by the recording layer and that the polarized recording light is guided over the same route to the analyzer as the reference light, it is most preferable that the transmission axis of the analyzer is perpendicular to the propagation direction of this virtual polarized recording light and that it is parallel or perpendicular to the polarization direction of this virtual polarized recording light.

Thirdly, the following is an explanation of recording and reproducing using a higher base representation taking a random state and a plurality of different predetermined orientation states as information elements, with reference to FIGS. 26 to 28.

The following five recording means F to J are preferable as recording means provided with a recording light emission portion, and the following reproducing means E to I are preferable as reproducing means provided with a reference light emission portion and an information element detecting portion.

Figure 26B:
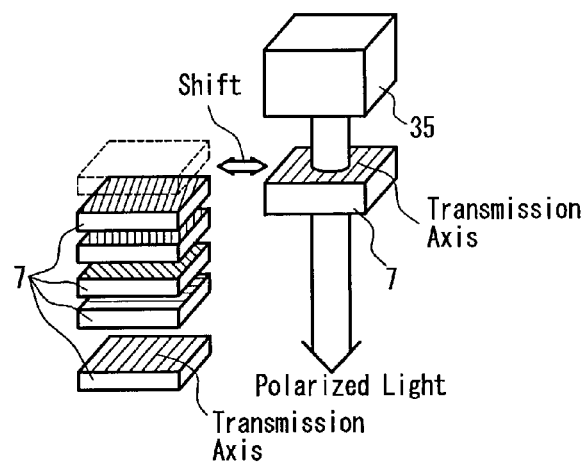
Figure 26C:
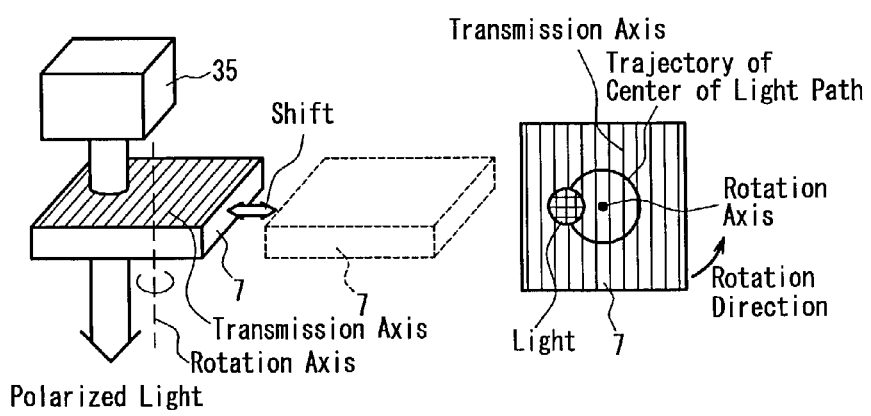

The recording means F is provided with a recording light emission portion having one unpolarized recording light source, a polarizer that is shiftable and pivotable or rotatable, and a driving device for arranging the polarizer into or out of the optical path of the light emitted from the unpolarized light source and pivoting or rotating the polarizer (see FIG. 26C).

Figure 27A:
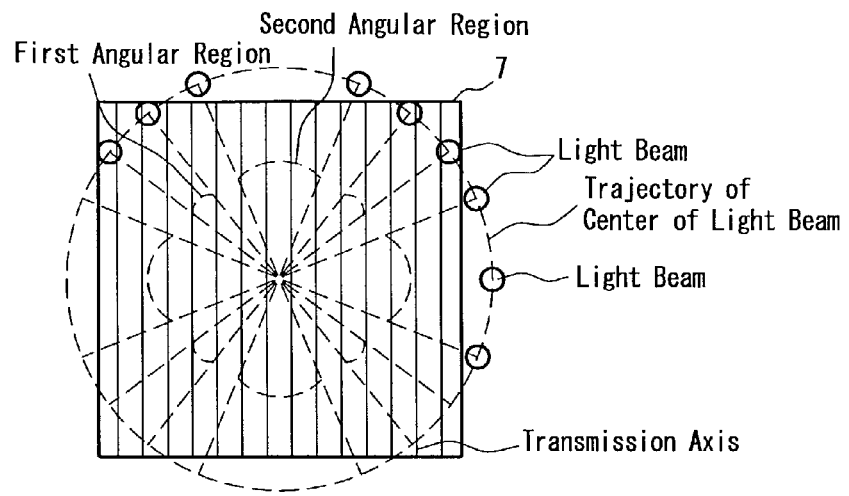
FIGS. 27A and 27B are schematic perspective views showing configuration examples and utilization methods of a polarizer for emitting unpolarized light and several kinds of polarized light of different polarization directions using one polarizer, by rotating or pivoting this polarizer, in accordance with the present invention.
Figure 27B:
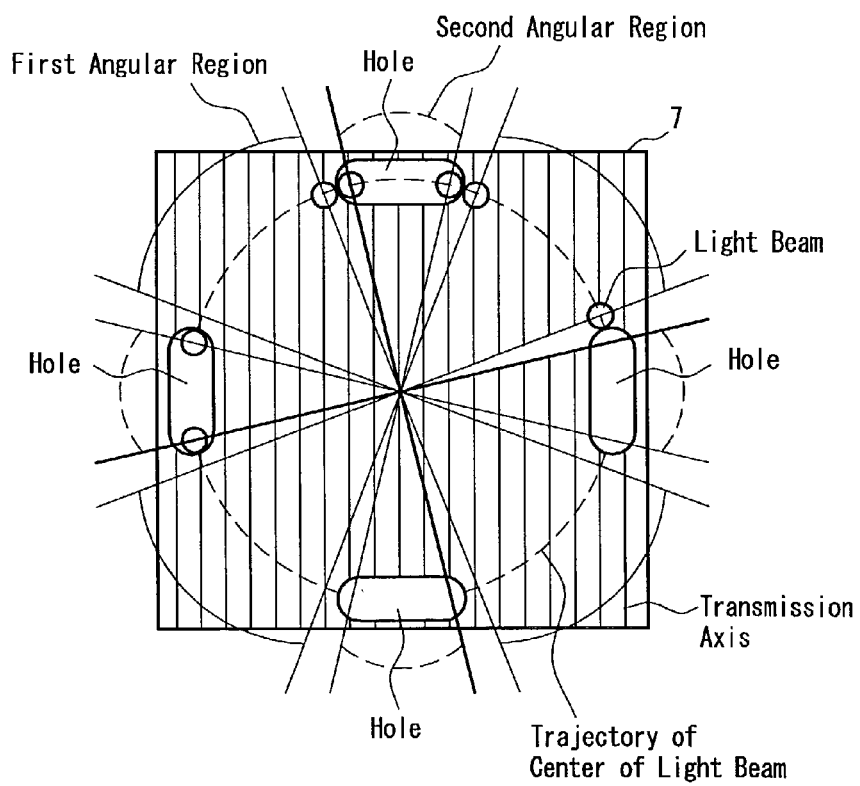

The recording means G is provided with a recording light emission portion having one unpolarized recording light source, a polarizer that is pivotable or rotatable, and a driving device for pivoting or rotating the polarizer (see FIGS. 27A and 27B). In accordance with the pivoting or rotation of the polarizer, the recording light emission portion emits selectively unpolarized recording light or one of a plurality of polarized recording lights with different polarization directions, depending on whether the light emitted from the unpolarized light source passes through the polarizer in a first angular rotation region or in a second angular rotation region.

The recording means H is provided with a recording light emission portion having two unpolarized recording light sources, a pivotable or rotatable polarizer that is arranged in the optical path of the light emitted from one of the two unpolarized light sources, and a driving device for pivoting or rotating the polarizer.

The recording means I is provided with a recording light emission portion having one unpolarized recording light source, a plurality of shiftable polarizers with different predetermined transmission axes, and a driving device for selectively arranging one of the plurality of polarizers in the optical path of light emitted from the unpolarized light source.

The recording means J is provided with a recording light emission portion having at least three unpolarized light sources, and a plurality of polarizers that can be arranged one each in the optical path of the light emitted from all but one of the unpolarized light sources, and whose transmission axes are set to different predetermined directions (FIG. 26B).

Figure 28A:
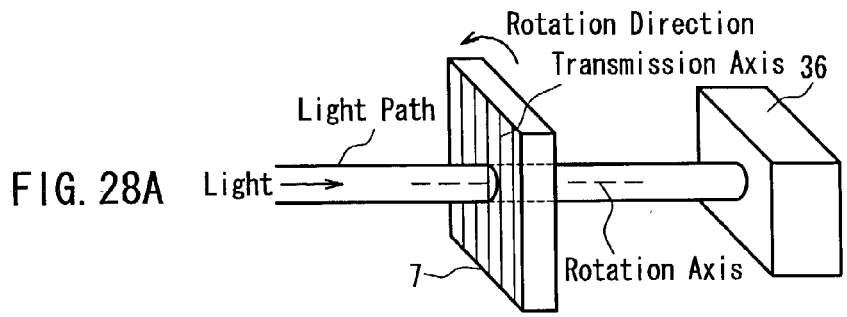
FIGS. 28A to 28C are schematic perspective views showing configuration examples of the information element detecting portions that detect differences in the intensity distribution of polarized light components due to differences in the information elements, in accordance with the present invention.

In the reproduction means E, the reference light emission portion has one unpolarized reference light source, and the information element detecting portion has an optical sensor, a pivotable or rotatable polarizer that is arranged in the optical path of light that is incident on the optical sensor, and a driving device for pivoting or rotating the polarizer. By successively changing the transmission axis of the polarizer to predetermined directions by pivoting or rotating the polarizer, the intensity of the unpolarized reference light from the reference light emission portion that has passed through the recording layer and further passed through the polarizer at different directions of the transmission axis is measured successively, and based on the result of the measured relative intensities, a predetermined electrical signal is output to the input/output device (FIG. 28A).

Figure 28B:
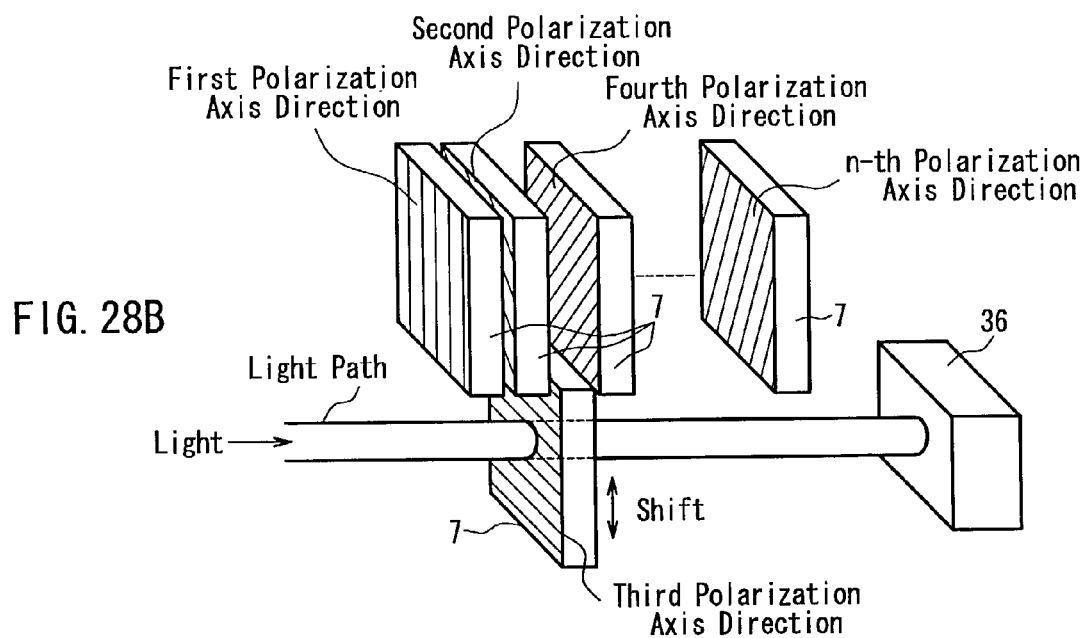

In the reproduction means F, the reference light emission portion has one unpolarized reference light source, and the information element detecting portion has an optical sensor, a plurality of shiftable polarizers whose transmission axes are fixed at different predetermined directions, and a driving device for selectively arranging one of the plurality of polarizers in the optical path of the light entering the optical sensor. By sequentially arranging the plurality of polarizers in the optical path for each information recording unit region, the intensity of light that has passed through the recording layer and further passed through the polarizers is measured successively, and based on the result of the measured relative intensities, a predetermined electrical signal is output to the input/output device (FIG. 28B).

Figure 28C:
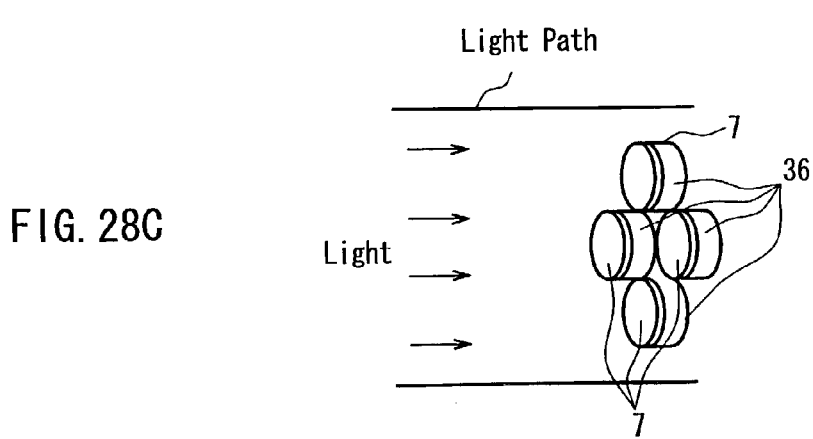

In the reproduction means G, the reference light emission portion has one unpolarized reference light source, and the information element detecting portion has a plurality of optical sensors, and a plurality of polarizers that are arranged one each for each optical sensor in the optical path of the light entering the optical sensors, and whose transmission axes are set to different predetermined directions. The intensity of the unpolarized reference light beams from the reference light emission portion that have passed through the recording layer and further passed through the plurality of polarizers is measured at once with the optical sensors, and based on the result of the relative intensities measured with the sensors, a predetermined electrical signal is output to the input/output device (FIG. 28C).

In the reproduction means H, the reference light emission portion has one unpolarized reference light source, a pivotable or rotatable polarizer that is arranged in the optical path of the light emitted from the unpolarized light source, and a driving device for pivoting or rotating the polarizer, and sequentially emits polarized reference light with a plurality of different polarization directions by pivoting or rotating the polarizer, thus changing the direction of the transmission axis of the polarizer. The information element detecting portion has an optical sensor, and for each information recording unit region successively measures the intensity of reference light sequentially emitted by the reference light emission portion that has passed through the recording layer, and based on the result of the successively measured intensities, a predetermined electrical signal is output to the input/output device.

In the reproduction means I, the reference light emission portion has one unpolarized reference light source, a plurality of polarizers whose transmission axes are set to different directions, and a driving device for selectively arranging once of the plurality of polarizers in the optical path of the light emitted from the unpolarized light source, and sequentially emits polarized reference light of a plurality of different kinds with different polarization directions by sequentially arranging the polarizers in the optical path so that the light emitted from the unpolarized light source passes through the various polarizers. The information element detecting portion has an optical sensor, and for each information recording unit region successively measures the intensity of reference light sequentially emitted by the reference light emission portion that has passed through the recording layer, and based on the result of the successively measured intensities, a predetermined electrical signal is output to the input/output device.

When using any of the recording means F to H and the reproducing means H, then it is possible to use the polarizer of the reproduction means and its driving device also as the polarizer of the recording means and its driving device. Furthermore, when using the recording means I and the reproducing means I, the set of polarizers of the recording means and their driving device also can be used as the set of polarizers of the recording means and their driving device.

Fourthly, the following is an explanation of the recording and reproducing using a higher base representation taking three or more predetermined orientation states as the information elements.

It is preferable that at least three recording means having a recording light emission portion are provided (recording means K to M), and for the reproducing means having a reference light emission portion and an information element detecting portion, the reproducing means E to I are preferable.

The recording means K is provided with a recording light emission portion having one unpolarized recording light source, a pivotable or rotatable polarizer that is arranged in the optical path of the light emitted from the unpolarized light source, and a driving device for pivoting or rotating the polarizer.

The recording means L is provided with a recording light emission portion having one unpolarized recording light source, a plurality of shiftable polarizers whose transmission axes are set to different directions, and a driving device for arranging one of the plurality of polarizers selectively in the optical path of the light emitted from the unpolarized light source.

The recording means M is provided with a recording light emission portion having a plurality of unpolarized recording light sources, and a plurality of polarizers whose transmission axes are set to different directions, which are arranged one each in the optical paths of the light emitted from the unpolarized light sources, fixed to the unpolarized light sources.

When using the recording means K and the reproducing means H, the polarizer of the recording means and its driving device also can be used as the polarizer of the reproducing means and its driving device.

EMBODIMENT 9

Embodiment 9 illustrates a preferable example of an information recording/reproducing device for recording and reproducing information on a write-once optical recording medium. It should be noted that when Embodiment 9 refers to the recording means and the reproducing means in Embodiment 8, the orientation recording light and the unpolarized orientation light sources should be understood to mean reactive recording light and unpolarized reaction light sources, or destructive recording light and unpolarized destructive light sources, as appropriate.

The write-once information recording/reproducing device of this embodiment is provided with an information storage portion having a write-once optical recording medium; a signal input/output portion for input and output, with respect to an external device, of operation instruction signals and information signals resulting from converting information into electrical signals; a recording light emission portion for emitting at least one kind of recording light that writes information elements by changing the orientation state of the chemisorptive molecules constituting the recording layer in the write-once optical recording medium, in accordance with the information signals from the signal input/output portion; a reference light emission portion for emitting at least one kind of reference light that does not change the orientation state of the chemisorptive molecules constituting the recording layer, used to reproduce the information recorded on the write-once optical recording medium; a position control driving portion for selectively irradiating the recording light and the reference light onto predetermined positions of the write-once optical recording medium; an information element detecting portion that detects differences in an intensity or differences in an intensity distribution of polarized light components of the reference light that has been emitted from the reference light emission portion and passed through the recording layer, and outputs a predetermined electrical signal in accordance with a result of this detection to the signal input/output portion; and a control circuit portion for controlling the recording operation by coordinating the recording light emission portion and the position control driving portion, and controlling the reproduction operation by coordinating the reference light emission portion, the position control driving portion and the information element detecting portion.

For the initialization state of the write-once optical recording medium, it is possible to use a random state, an orientation state in which no information elements have been written, a fixed orientation state in which one kind of information elements has been written, or an oriented state in which one kind of information elements has been written. Here, an oriented state in which one kind of information elements has been written means an arbitrary orientation state or a predetermined orientation state, and a fixed orientation state in which one kind of information elements has been written means a predetermined fixed orientation state or an arbitrary fixed orientation state. The following explains configurations of these information recording/reproducing devices for the respective initialization states of the write-once optical recording medium.

First, an information recording/reproducing device is explained that performs recording and reproduction of a write-once optical recording medium whose initialization state is the random state, taking the random state and a predetermined fixed orientation state as information elements, or taking the area ratio between a first partitioned region in the random state and a second partitioned region in a predetermined fixed orientation state as information elements.

For the recording light emission portion, it is preferable to use a recording means having one unpolarized reaction light source, and one polarizer that is arranged in the optical path of the light emitted from the unpolarized light source and whose transmission axis is set to a predetermined direction. As the reproducing means provided with a reference light emission portion and an information element detecting portion, it is preferable to use one of the reproducing means A to D described in Embodiment 8.

Second, an information recording/reproducing device is explained that performs recording and reproduction of a write-once optical recording medium whose initialization state is the random state, taking a first predetermined fixed orientation state and a second predetermined fixed orientation state as information elements, or taking the area ratio between a first partitioned region in the first predetermined fixed orientation state and a second partitioned region in the second predetermined fixed orientation state as information elements.

For the recording means provided with the recording light emission portion, it is preferable to use one of the recording means C to E in Embodiment 8. For the reproducing means provided with the reference light emission portion and the information element detecting portion, it is preferable to use one of the reproducing means A to D described in Embodiment 8.

Third, an information recording/reproducing device is explained that performs recording and reproduction in ternary representation on a write-once optical recording medium whose initialization state is the random state, taking the random state, a first predetermined fixed orientation state and a second predetermined fixed orientation state as information elements, or taking the area ratio between a first partitioned region in the first predetermined fixed orientation state and a second partitioned region in the second predetermined fixed orientation state as information elements.

For the recording means provided with the recording light emission portion, it is preferable to use one of the recording means C to E described in Embodiment 8. For the reproducing means provided with the reference light emission portion and the information element detecting portion, it is preferable to use one of the reproducing means E to I described in Embodiment 8. When using the recording means C and the reproducing means I, or the recording means D and the reproducing means H, the polarizer of the recording means and its driving device also can be used as the polarizer of the reproducing means and its driving device.

Fourth, an information recording/reproducing device is explained that performs recording and reproduction in a higher base representation on a write-once optical recording medium whose initialization state is the random state, taking the random state, and at least three different predetermined fixed orientation states as information elements, or taking at least three different predetermined fixed orientation states as information elements.

For the recording means provided with the recording light emission portion, it is preferable to use one of the recording means F to J described in Embodiment 8. For the reproducing means provided with the reference light emission portion and the information element detecting portion, it is preferable to use one of the reproducing means E to I described in Embodiment 8.

When using the recording means K and the reproducing means H, the polarizer of the recording means and its driving device also can be used as the polarizer of the reproducing means and its driving device.

Fifth, an information recording/reproducing device is explained that performs recording and reproduction on a write-once optical recording medium whose initialization state is an orientation state into which no information elements have been written, taking a first predetermined fixed orientation state and a second predetermined fixed orientation state as information elements, or taking the area ratio between a first partitioned region in the first predetermined fixed orientation state and a second partitioned region in the second predetermined fixed orientation state as information elements.

For the recording means provided with the recording light emission portion, it is preferable to use one of the recording means C to E described in Embodiment 8. For the reproducing means provided with the reference light emission portion and the information element detecting portion, it is preferable to use one of the reproducing means B to D.

If the direction of the transmission axes of the two polarizers in the recording means C or E cross at right angles, then the information elements can be read out with high precision, which is even more preferable. Furthermore, when using the recording means C or D and the reproducing means B or D, then a single polarizer can be used for both the polarizer of the reference light emission portion and the polarizer of the recording light emission portion.

Sixth, an information recording/reproducing device is explained that performs recording and reproduction in a higher base representation on a write-once optical recording medium whose initialization state is an orientation state into which no information elements have been written, taking at least three different predetermined fixed orientation states as information elements.

For the recording means provided with the recording light emission portion, it is preferable to use one of the recording means F to J described in Embodiment 8. For the reproducing means provided with the reference light emission portion and the information element detecting portion, it is preferable to use one of the reproducing means E to I described in Embodiment 8.

When using the recording means K and the reproducing means H, the polarizer of the recording means and its driving device also can be used as the polarizer of the reproducing means and its driving device.

Seventh, an information recording/reproducing device is explained that performs recording and reproduction on a write-once optical recording medium whose initialization state is an arbitrary orientation state, taking an arbitrary orientation state and a predetermined fixed orientation state as information elements. For this, it is necessary that the tilt angle of the chemisorptive molecules forming the predetermined fixed orientation state is different from the tilt angle of the chemisorptive molecules forming the arbitrary orientation state.

For the recording means provided with the recording light emission portion, it is preferable to use the recording means N. For the reproducing means provided with the reference light emission portion and the information element detecting portion, it is preferable to use one of the reproducing means B to D described in Embodiment 8. It is also possible to use the reproducing means A as the reproducing means, but in this case, the tilt angles (inclination angles) of the chemisorptive molecules forming the initialization state and the chemisorptive molecules forming the predetermined fixed orientation state have to be different.

Eighth, an information recording/reproducing device is explained that performs recording and reproduction in ternary representation on a write-once optical recording medium whose initialization state is an arbitrary orientation state, taking the arbitrary orientation state, a first predetermined fixed orientation state and a second predetermined fixed orientation state as information elements. For this, it is necessary that the tilt angle of the chemisorptive molecules forming the predetermined fixed orientation states is different from the tilt angle of the chemisorptive molecules forming the arbitrary orientation state.

For the recording means provided with the recording light emission portion, it is preferable to use one of the recording means F to J described in Embodiment 8. For the reproducing means provided with the reference light emission portion and the information element detecting portion, it is preferable to use one of the reproducing means E to I described in Embodiment 8.

Ninth, an information recording/reproducing device is explained that performs recording and reproduction in higher base representation on a write-once optical recording medium whose initialization state is an arbitrary orientation state, taking the arbitrary orientation state and at least three different predetermined fixed orientation states as information elements. For this, it is necessary that the tilt angle of the chemisorptive molecules forming the predetermined fixed orientation states is different from the tilt angle of the chemisorptive molecules forming the arbitrary orientation state.

For the recording means provided with the recording light emission portion, it is preferable to use one of the recording means F to J described in Embodiment 8. For the reproducing means provided with the reference light emission portion and the information element detecting portion, it is preferable to use one of the reproducing means E to I described in Embodiment 8.

When using the recording means K and the reproducing means H, the polarizer of the recording means and its driving device also can be used as the polarizer of the reproducing means and its driving device.

Tenth, an information recording/reproducing device is explained that performs recording and reproduction on a write-once optical recording medium whose initialization state is a predetermined orientation state, taking the predetermined orientation state and a predetermined fixed orientation state as information elements, or taking an area ratio between a first partitioned region in the predetermined orientation state and a second partitioned region in the predetermined fixed orientation state as information elements.

For the recording means provided with the recording light emission portion, it is preferable to use the recording means N. For the reproducing means provided with the reference light emission portion and the information element detecting portion, it is preferable to use one of the reproducing means B to D described in Embodiment 8. It is also possible to use the reproducing means A as the reproducing means, but in this case, the tilt angles (inclination angles) of the chemisorptive molecules forming the predetermined orientation state and the chemisorptive molecules forming the predetermined fixed orientation state have to be different.

Eleventh, an information recording/reproducing device is explained that performs recording and reproduction in ternary representation on a write-once optical recording medium whose initialization state is a predetermined orientation state, taking the predetermined orientation state, a first predetermined fixed orientation state and a second predetermined fixed orientation state as information elements.

For the recording means provided with the recording light emission portion, it is preferable to use one of the recording means F to J described in Embodiment 8. For the reproducing means provided with the reference light emission portion and the information element detecting portion, it is preferable to use one of the reproducing means E to I described in Embodiment 8.

Twelfth, an information recording/reproducing device is explained that performs recording and reproduction in higher base representation on a write-once optical recording medium whose initialization state is a predetermined orientation state, taking the predetermined orientation state and at least three different predetermined fixed orientation states as information elements.

For the recording means provided with the recording light emission portion, it is preferable to use one of the recording means F to J described in Embodiment 8. For the reproducing means provided with the reference light emission portion and the information element detecting portion, it is preferable to use one of the reproducing means E to I described in Embodiment 8.

When using the recording means K and the reproducing means H, the polarizer of the recording means and its driving device also can be used as the polarizer of the reproducing means and its driving device.

Thirteenth, an information recording/reproducing device is explained that performs recording and reproduction on a write-once optical recording medium whose initialization state is an arbitrary fixed orientation state, taking that arbitrary fixed orientation state and a random state achieved by structural destruction of the recording layer as information elements.

For the recording light emission portion, it is preferable to use the recording means O having one unpolarized reaction light source. For the reproducing means provided with the reference light emission portion and the information element detecting portion, it is preferable to use one of the reproducing means A to D described in Embodiment 8. If the structurally destroyed recording layer does not have the ability to be oriented by polarized light, then it is possible to use the recording means N as the recording means.

Fourteenth, an information recording/reproducing device is explained that performs recording and reproduction on a write-once optical recording medium whose initialization state is an predetermined fixed orientation state, taking that predetermined fixed orientation state and a random state achieved by structural destruction of the recording layer as information elements, or taking an area ratio between a first partitioned region in the predetermined fixed orientation state and a second partitioned region in the random state as information elements.

For the recording means provided with the recording light emission portion, it is preferable to use the recording means O. For the reproducing means provided with the reference light emission portion and the information element detecting portion, it is preferable to use one of the reproducing means A to D described in Embodiment 8. If the structurally destroyed recording layer does not have the ability to be oriented by polarized light, then it is possible to use the recording means N as the recording means.

EMBODIMENT 10

Figure 29:
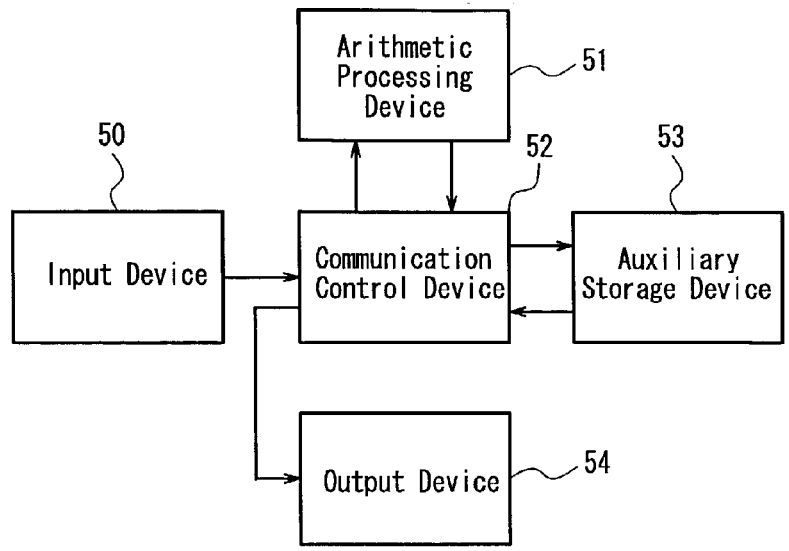
FIG. 29 is a block diagram illustrating the configuration of a computer system in accordance with the present invention.

Embodiment 10 illustrates a computer system provided with an information recording/reproducing device incorporating an erasable optical recording medium (referred to as "integrated information storage device" in the following), or the erasable optical recording medium explained in Embodiment 3 and an information recording/reproducing device for recording and reproducing information on this erasable optical recording medium (referred to as "removable information storage device" in the following) as an auxiliary storage device. FIG. 29 is a block diagram illustrating the configuration of the computer system.

The computer system can be configured by an arithmetic processing device 51 having a main memory, an auxiliary storage device 53, an input device 50, an output device 54 and a data communication control device 52 controlling the exchange of data between those devices. Ordinarily, computers include an arithmetic processing device 51 and a data communication control device 52, so that it is sufficient to connect the auxiliary storage device 53, the input device 50 and the output device 54 to the computer in a state in which communication among the devices is possible. The communication between the devices can be accomplished by cables or the like, but wireless communication with electromagnetic waves is also possible.

A keyboard, a scanner, a digital camera, a microphone or the like can be used as the input device 50, and a monitor, a printer, a speaker or the like can be used as the output device 54. Furthermore, a touch-panel-type input/output device integrating input device and output device into one is also possible. An erasable optical recording medium used for the auxiliary storage device 53 has been explained in Embodiment 3, and integrated information storage devices and removable information storage devices have been explained in Embodiments 7 and 8, so that their further explanation has been omitted.

EMBODIMENT 11

A computer system can be configured in the same manner as the computer system in Embodiment 10, except that it includes an information recording/reproducing device incorporating a write-once optical recording medium, or the write-once optical recording medium explained in Embodiment 3 and an information recording/reproducing device for recording and reproducing information on this write-once optical recording medium, as a video storage device.

When using a write-once optical recording medium, it is preferable that a removable information storage device is used as an auxiliary storage device.

EMBODIMENT 12

Embodiment 12 illustrates a video recording/reproducing system provided with a video recording/reproducing device incorporating an erasable optical recording medium (referred to as "integrated video storage device" in the following), or the erasable optical recording medium explained in Embodiment 3 and an information recording/reproducing device for recording and reproducing information on this erasable optical recording medium (referred to as "removable video storage device" in the following).

Figure 30:
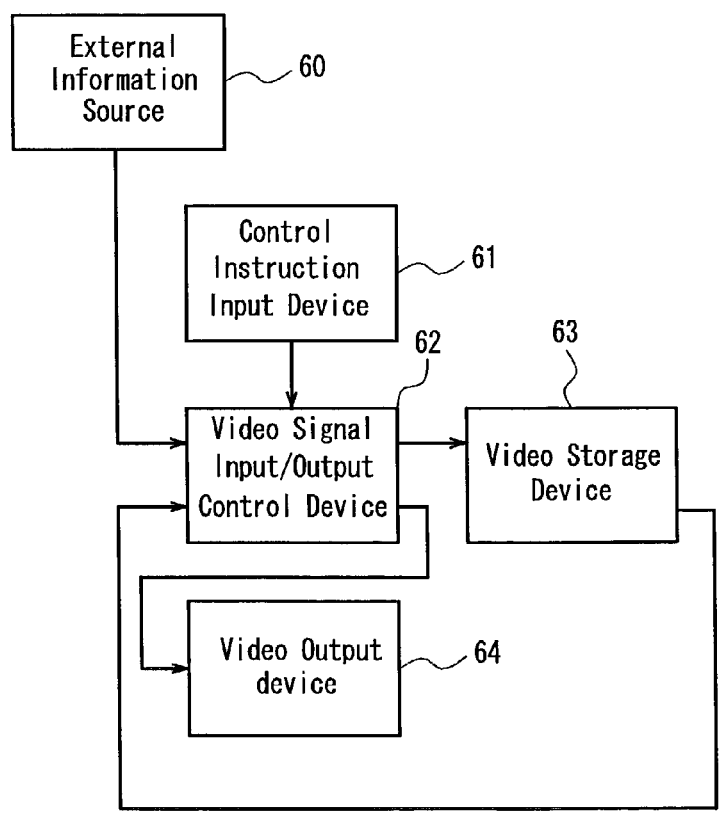
FIG. 30 is a block diagram illustrating the configuration of a video information recording/reproducing system in accordance with the present invention.

The erasable optical recording medium has been explained in Embodiment 3, and integrated information storage devices and removable information storage devices have been explained in Embodiments 7 and 8, so that their further explanation has been omitted. FIG. 30 is a block diagram illustrating the configuration of the video recording/reproducing system.

The video recording/reproducing system can be configured by a video signal input/output device 62, a video storage device 63, a video output device 64, and a control instruction input device 61. Here, the term "video" encompasses still pictures as well as moving pictures and audio.

The signal from the external information source 60, for example an external video signal sender, may be a wireless electromagnetic signal such as a TV broadcast, a radio broadcast or a satellite broadcast, or it may be a wired signal, such as a cable TV broadcast or a telephone communication signal. The output device may be a television, a monitor or a printer.

EMBODIMENT 13

A video recording/reproducing system can be configured in the same manner as in Embodiment 12, except that it includes an information recording/reproducing device incorporating a write-once optical recording medium, or the write-once optical recording medium explained in Embodiment 3 and an information recording/reproducing device for recording and reproducing information on this write-once optical recording medium, as a video storage device.

When using a write-once optical recording medium, it is preferable that a removable information storage device is used as an auxiliary storage device.

WORKING EXAMPLES

The following is an explanation of working examples detailing the present invention. The following is a brief outline of the working examples explained below.

Working Example 1 and Working Example 2 relate to an optical recording film. Working Example 1 illustrates an erasable optical recording film, whereas Working Example 2 illustrates a write-once optical recording film.

Working Example 3 and Working Example 4 relate to an optical recording medium. Working Example 3 illustrates an erasable optical recording medium, whereas working example 4 illustrates a write-once optical recording medium.

Working Examples 5 to 10 relate to an information recording/reproducing device for erasable optical recording media. Working Example 5 illustrates the case of a binary recording using an optical recording medium that is initialized with a random orientation and taking a random state and a predetermined orientation state as the information elements. Working Example 6 illustrates the case of a binary recording using an optical recording medium that is initialized with a predetermined orientation and taking a random state and a predetermined orientation state as the information elements. Working Example 7 illustrates the case of a binary recording using an optical recording medium that is initialized with a random orientation and taking a first predetermined orientation state and a second predetermined orientation state as the information elements. Working Example 8 illustrates the case of a binary recording using an optical recording medium that is initialized with a predetermined orientation and taking a first predetermined orientation state and a second predetermined orientation state as the information elements. Working Example 9 illustrates the case of a higher base recording using an optical recording medium that is initialized with a random orientation and taking three different predetermined orientation states as the information elements. Working Example 10 illustrates the case of a higher base recording using an optical recording medium that is initialized with a predetermined orientation and taking three different predetermined orientation states as the information elements.

Working Examples 11 to 16 relate to an information recording/reproducing device for write-once optical recording media. Working Example 11 illustrates the case of a binary recording using an optical recording medium that is initialized with a random orientation and taking a random state and a predetermined fixed orientation state as the information elements. Working Example 12 illustrates the case of a binary recording using an optical recording medium that is initialized with a fixed predetermined orientation and taking the predetermined orientation state of the initialization state and a fixed predetermined orientation state as the information elements. Working Example 13 illustrates the case of a binary recording using an optical recording medium that is initialized with a random orientation and taking a first fixed predetermined orientation state and a second fixed predetermined orientation state as the information elements. Working Example 14 illustrates the case of a higher base recording using an optical recording medium that is initialized with a random orientation and taking three fixed orientation states of different orientations as the information elements. Working Example 15 illustrates the case of a higher base recording using an optical recording medium that is initialized with a predetermined orientation and taking three fixed orientation states of different orientations as the information elements. Working Example 16 illustrates the case of recording information using an optical recording medium that has been initialized in a rubbing process to a predetermined orientation.

Working Example 17 and Working Example 18 relate to computer systems using an information recording/reproducing device for optical recording media as an auxiliary storage device. Working Example 17 illustrates the case of using an erasable optical recording medium as the optical recording medium, and Working Example 18 illustrates the case of using a write-once optical recording medium as the optical recording medium.

Working Example 19 and Working Example 20 relate to computer systems using an information recording/reproducing device for optical recording media as a video information storage device. Working Example 19 illustrates the case of using an erasable optical recording medium as the optical recording medium, and Working Example 20 illustrates the case of using a write-once optical recording medium as the optical recording medium.

Working Example 1

First, a glass substrate 1 that has been processed into disk shape was prepared as a base material and rinsed thoroughly. Then, aluminum (Al) including 2% by weight of silicon (Si) was vacuum vapor deposited on the surface of the glass substrate 1 to form an optically reflective film 5. The thickness of the optically reflective film 5 was set to about 500 nm. Then, functional groups including active hydrogen resulting from natural oxidation were introduced into the topmost surface of the optically reflective film 5 by exposure to a moist air atmosphere, thus producing a substrate 3 whose topmost surface has functional groups including active hydrogen.

Next, a linear chlorosilane surface active agent A (also referred to as "chemisorptive compound" in the following) of the formula $CH_3-COO-C_6H_4-(CH_2)_6-SiCl_3$, which has a trichlorosilyl group ($-SiCl_3$), which is a functional group chemically bonding with the active hydrogen of the substrate, at one end and includes $-COOC_6H_4-$, an optically absorbing functional group, was prepared. Then, the chlorosilane surface active agent A was dissolved to a concentration of about 1% by weight in thoroughly dehydrated hexadecane, which is a non-aqueous solvent, thus preparing a chemisorptive solution 34 (chemisorptive solution preparation step).

The substrate 3 was immersed in the chemisorptive solution 34 under a dry atmosphere (of not more than 30% relative humidity) for about one hour (see FIG. 2). Thus, the chlorosilane surface active agent A was chemisorbed to the surface of the substrate 3, and a monomolecular optical recording film 2, chemically bonded as $CH_3-COO-C_6H_4-(CH_2)_6-Si(-O-)_3$ to the substrate 3, was formed (recording film formation step) (see FIG. 2).

After that, the substrate 3 was retrieved from the chemisorptive solution 34, rinsed with thoroughly dehydrated n-hexane 32, which is a non-aqueous organic solvent, to rinse off the unreacted silane-based surface active agent remaining on the substrate 3 (rinsing step). Then, the substrate 3 was exposed to air including a water component (moisture) to fabricate the optical recording film 2.

In this series of steps, the trichlorosilyl group in the chlorosilane-based surface active agent A and hydroxyl groups at the surface of the optically reflective film 5 (many $-OH$ groups are created by forming $Al_2O_3$ at the surface by natural oxidation of Al and further reacting it with water molecules in air), undergo a dechlorination reaction, forming chemical bonds with the surface of the optical recording film 5. Moreover, when the substrate is exposed to air after the chemisorption, siloxane bonds among the chemisorptive molecules are created by reaction with the water component in the air, so that a recording layer in the form of a monomolecular film including optically absorbing $-COOC_6H_4$ is formed at the surface of the optical recording film 5 (see FIG. 1).

Furthermore, since hydrocarbon groups (in this case, $-CH_3$ and $-(CH_2)_n$) are hydrophobic, the $-CH_3$ groups are chemisorbed to the hydrophilic surface such that the molecules of the chlorosilane surface active agent stand obliquely on the surface.

Next, the substrate 3 was rotated, and first polarized orientation light was focused in dots from a substantially perpendicular direction onto the surface of the substrate 3, making the polarization direction of the polarized orientation light substantially parallel to the rotation direction of the substrate. The $-COOC_6H_4-$ groups, which are optically absorbing groups, have the property of absorbing light of a wavelength of 230 to 300 nm, so that polarized light from a super-high pressure mercury lamp of a wavelength of 254 nm was used for the polarized light. The diameter of the focused polarized orientation light on the surface of the recording layer 2 (referred to as "spot diameter" in the following) was set to 1.2 µm, and its intensity was set to 500 mJ/cm$^2$ (initialization step) (see FIG. 31A).

Figure 31A:
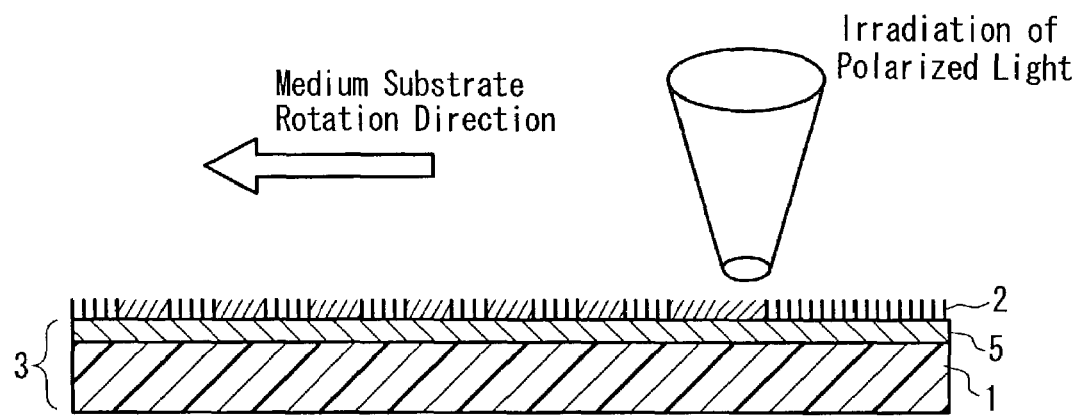
FIGS. 31A to 31C are schematic diagrams illustrating Working Example 1 of the present invention.
Figure 31B:
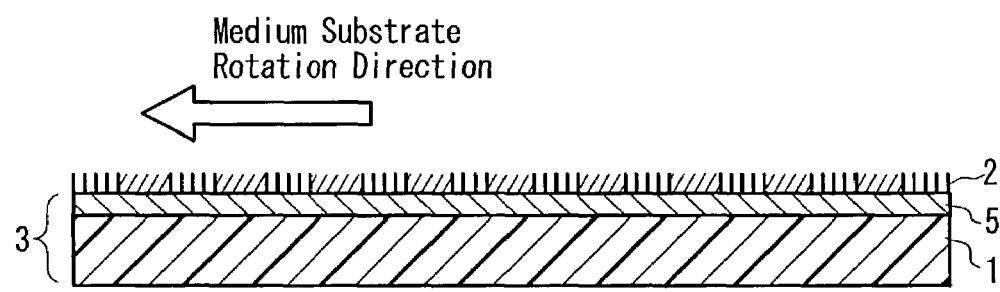
Figure 31C:
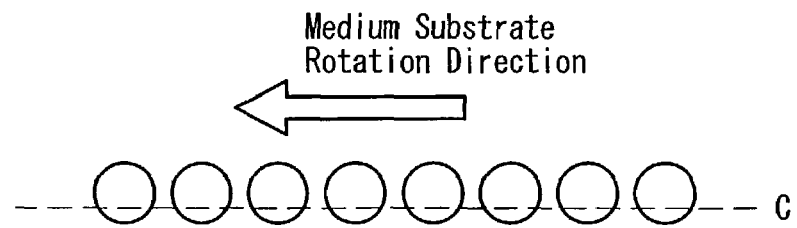

After the irradiation of the polarized orientation light, the surface of the disk-shaped optical recording medium was examined with a microscopic Fourier transform infrared spectroscope (referred to as "microscopic FT-IR" in the following), and it was found that the dots were lined up in concentric circles, and the chemisorptive molecules 6 included in the dots were arranged substantially parallel to the rotation direction of the substrate 3 (FIGS. 31B and 31C).

Furthermore, examining the surface with the microscopic FT-IR confirmed that when dots are first irradiated with a first polarized orientation light and then with a second polarized orientation light with the same propagation direction but different polarization direction, the chemisorptive molecules were oriented substantially parallel to the polarization direction of the second polarized orientation light. It was also confirmed that if unpolarized orientation light is irradiated instead of the first polarized orientation light, a random state without specifiable orientation direction results.

Irradiating polarized light of a wavelength corresponding to the absorption peak of the chemisorptive molecules 6 constituting the recording film, it was possible to align the long axis orientation of the chemisorptive molecules 6 included in the dots to be substantially parallel to the rotation direction of the substrate 3 at a low energy of about 250 mJ/cm$^2$.

Also, an erasable optical recording film could be formed in a similar manner when using a silane-based surface active agent having an alkoxysilyl group or an isocyanate group instead of the trichlorosilyl group. More specifically, erasable optical recording media could be manufactured with chemisorptive molecules of the following chemical formulas:

$CH_3-(CH_2)_p-Si(CH_3)_2-(CH_2)_q-SiCl_3$ (wherein p and q are preferably integers between 0 and 10);

$CH_3-COO-(CH_2)_2-(CF_2)_n-(CH_2)_2-SiCl_3$ (wherein n is preferably an integer between 7 and 24);

$C_6H_5-(CH_2)_2-(CF_2)_n-(CH_2)_2-SiCl_3$ (wherein n is preferably an integer between 0 and 24);

$N\equiv C-(CH_2)_2-(CF_2)_n-(CH_2)_2-SiCl_3$ (wherein n is preferably an integer between 0 and 24);

$SiCl_3-(CH_2)_2-(CF_2)_n-(CH_2)_2-SiCl_3$ (wherein n is preferably an integer between 1 and 10);

$X-(CH_2)_n-Si(OCH_3)_3$ (wherein X is preferably at least one halogen selected from Cl, Br, I and F, and n is preferably an integer between 1 and 24);

$CH_3-(CH_2)_n-Si(OCH_3)_3$ (wherein n is preferably an integer between 0 and 24);

$CH_3-(CH_2)_p-Si(CH_3)_2-(CH_2)_q-Si(OCH_3)_3$ (wherein p and q are preferably integers between 0 and 10);

$HOOC-(CH_2)_2-(CF_2)_n-(CH_2)_2-Si(OCH_3)_3$ (wherein n is preferably an integer between 7 and 24);

$NH_2-(CH_2)_2-(CF_2)_n-(CH_2)_2-Si(OCH_3)_3$ (wherein n is preferably an integer between 7 and 24);

$C_6H_5-(CH_2)_2-(CF_2)_n-(CH_2)_2-Si(NCO)_3$ (wherein n is preferably an integer between 0 and 24);

$N\equiv C-(CH_2)_2-(CF_2)_n-(CH_2)_2-Si(OC_2H_5)_3$ (wherein n is preferably an integer between 0 and 24);

$X-(CH_2)_n-SiCl_3$ (wherein X is preferably at least one halogen selected from Cl, Br, I and F, and n is preferably an integer between 1 and 24);

$Br-(CH_2)_8-SiCl_3$ $CF_3-(CH_2)_8-CO-(CH_2)_{10}-SiCl_3$ $CF_3-(CH_2)_5-COO-(CH_2)_{10}-SiCl_3$ $CH_3-(CH_2)_8-Si(CH_3)_2-(CH_2)_{10}-SiCl_3$ $CH_3-(CH_2)_5-Si(CH_3)_2-(CH_2)_8-SiCl_3$ $CF_3-COO-(CH_2)_{14}-SiCl_3$ $C_6H_5-(CH_2)_8-SiCl_3$ $N\equiv C-(CH_2)_2-(CF_2)_6-(CH_2)_2-SiCl_3$ $SiCl_3-(CH_2)_2-(CF_2)_6-(CH_2)_2-SiCl_3$ $CF_3-(CH_2)_2-(CF_2)_4-(CH_2)_2-SiCl_3$ $CF_3-(CF_2)_6-(CH_2)_2-SiCl_3$ $CF_3-(CF_2)_8-(CH_2)_2-SiCl_3$ $CH(CF_3)_2-O-(CH_2)_{15}-Si(CH_3)_2Cl$ $CF_3-CF_2-(CH_2)_2-Si(CH_3)_2-(CH_2)_{15}-SiCl_3$ $CF_3-(CF_2)_4-(CH_2)_2-Si(CH_3)_2-(CH_2)_9-SiCl_3$ $CF_3-(CF_2)_7-(CH_2)_2-Si(CH_3)_2-(CH_2)_9-SiCl_3$ $CF_3-COO-(CH_2)_{15}-Si(CH_3)Cl_2$ $CF_3-(CF_2)_5-(CH_2)_2-SiCl_3$ $CF_3-CH_2-C^*H(CH_3)-CH_2-O-CO-(CH_2)_{10}-SiCl_3$ (wherein C* represents optically active carbon. The same is true in the following.)

$CF_3-CH_2-C^*H(CH_3)-CH_2-O-CO-C_6H_4-O-CO-C_6H_4-O-(CH_2)_5-SiCl_3$ $SiF(CH_3)_2-O-Si(CH_3)_2-O-Si(CH_3)_2-O-Si(CH_3)_2Cl$ $CF_3-SiO-Si(CH_3)_2-O-Si(CH_3)_2-O-Si(CH_3)_2-O-Si(CH_3)_2-O-SiCl_3$

Furthermore, in the rinsing step, hydrocarbon-based n-hexane including an alkyl group was used as the dehydrated solvent, but other than that, it was also possible to rinse with "Freon 113" (by 3M Corp.) including fluorocarbon groups, chloroform including chlorocarbon groups or hexamethyldisiloxane including siloxane groups.

Working Example 2

A monomolecular optical recording film was formed in the same manner as in Working Example 1, expect that a linear chlorosilane surface active agent B of the formula $CH_3-C_6H_4-CH=CH-CO-C_6H_4-O-(CH_2)_6-SiCl_3$, which has a trichlorosilyl base ($-SiCl_3$), that is, a functional group chemically bonding by chemical reaction with the active hydrogen of the substrate, and a chalcone group ($C_6H_5-CH=CH-CO-C_6H_4-$), which is a photoreactive functional group, was used for the chemisorptive molecules constituting the optical recording film.

Next, the optical recording medium was rotated, and first polarized reaction light, whose polarization direction was substantially parallel to the rotation direction of the substrate, was focused in dots from a substantially perpendicular direction onto the surface of the substrate. The chalcone groups ($C_6H_5-CH=CH-CO-C_6H_4-$), which are photoreactive functional groups, have an optical absorption peak at a wavelength of 314 nm, so that the h-line of a super-high pressure mercury lamp of a wavelength of 313 nm was used for the first polarized reaction light. The spot diameter of the focused first polarized reaction light on the surface of the recording layer was set to 1.0 μm, and its intensity was set to 300 mJ/cm².

After the irradiation of the first polarized reaction light, the surface of the disk-shaped optical recording medium was examined with a microscopic FT-IR, and it was found that the dots were lined up in concentric circles, and the chemisorptive molecules 6 included in the dots were arranged substantially parallel to the rotation direction of the substrate.

Furthermore, examining the surface with the microscopic FT-IR confirmed that when dots are first irradiated with a first polarized orientation light and then with a second polarized orientation light with the same propagation direction but different polarization direction, the chemisorptive molecules were not oriented in the direction of the second polarized reaction light, but the orientation direction was permanent. When the irradiating with light or polarized light of about 10 times the intensity of the first polarized reaction light, the structure of the optical recording film was destroyed and changed to a random state. Moreover, when the first polarized reaction light was then irradiated again onto the dots where the chemisorptive molecules had been destroyed and changed to a random state, the chemisorptive molecules could not be oriented.

Recording and reproduction was also possible with the following compounds instead of the $CH_3-C_6H_4-CH=CH-CO-C_6H_4-O-(CH_2)_6-SiCl_3$:

$HC\equiv C-C\equiv C-(CH_2)_n-SiCl_3$ (wherein n is preferably an integer between 0 and 24);

$CH_3-C_6H_4-CH=CH-CO-C_6H_4-(CH_2)_2-(CF_2)_n-(CH_2)_2-SiCl_3$ (wherein n is preferably an integer between 3 and 24);

$CH_2=CH-(CH_2)_2-(CF_2)_n-(CH_2)_2-SiCl_3$;

$CH_3-(CH_2)_7-C\equiv C-C\equiv C-(CH_2)_{10}-SiCl_3$;

$CF_3-C_6H_4-CH=CH-CO-C_6H_4-(CH_2)_2-(CF_2)_4-(CH_2)_2-SiCl_3$;

$CF_3-C_6H_4-CH=CH-CO-(CH_2)_2-(CF_2)_4-(CH_2)_2-SiCl_3$.

Working Example 3

A glass substrate processed into disk-shape was prepared, rinsed thoroughly, and an optically reflective film was formed by vacuum vapor deposition of aluminum (Al) including 2% by weight of silicon (Si) on the surface of the substrate 1. The thickness of the optically reflective film was set to about 200 nm.

Using the medium substrate 3 prepared in this manner and the chlorosilane surface active agent A, a monomolecular film 3 was formed by the same chemisorptive method as in Working Example 1. Thus, a recording layer was reactively formed on the surface of the medium substrate.

Then, the optical recording medium was rotated, and first polarized recording light, whose polarization direction was substantially parallel to the rotation direction of the substrate, was focused in dots from a substantially perpendicular direction onto the substrate surface to format the recording layer (initialization step) (see FIG. 31A). The wavelength of the focused first polarized recording light was 254 nm, the spot diameter on the surface of the recording layer was set to 1.2 μm, and its intensity was set to 500 mJ/cm². Next, unpolarized recording light with a wavelength of 254 nm, a spot diameter of 1.0 μm at the recording layer surface and an intensity of 500 mJ/cm² was irradiated in dots from the propagation direction of the first polarized recording light.

Then, examining the surface with the microscopic FT-IR showed that the regions in dots irradiated with unpolarized recording light were in a random state, and in the regions in dots not irradiated with unpolarized recording light, the orientation was unchanged, and thus the same as after formatting. Furthermore, irradiating the first polarized recording light again, the dots were in the same orientation as after formatting.

Furthermore, examining the surface with the microscopic FT-IR confirmed that the orientation state of the formatted dots did not change when unpolarized reference light or polarized reference light with a wavelength in the visible spectrum was irradiated on them. Similarly, it also could be confirmed that the orientation state of the formatted dots that subsequently had been irradiated with unpolarized recording light did not change when further unpolarized or polarized reference light was irradiated on them.

Irradiating first polarized recording light or first unpolarized recording light with a spot diameter of 0.8 μm onto an erasable optical recording medium of 5.25 inch diameter fabricated as described above, it was possible to record 5 gigabytes of information. Furthermore, when the recording layer was provided on both sides, 10 gigabytes of information could be recorded.

This Working Example 3 has been explained for the case that the silane-based surface active agent A is used for the chemisorptive molecules constituting the recording layer, but it was also possible to manufacture a similar erasable optical recording medium using the chemisorptive molecules described in Working Example 1. Furthermore, when chemisorptive molecules were used in which the optically absorbing functional groups have an aryl backbone group, an arylene backbone group or a carbonyl group, the optical sensitivity was increased, which shortened the time necessary for formatting.

Working Example 4

A glass substrate processed into disk-shape was prepared, rinsed thoroughly, and an optically reflective film was formed by vacuum vapor deposition of aluminum (Al) including 2% by weight of silicon (Si) on the surface of the glass substrate. The thickness of the optically reflective film was set to about 200 nm. Using the medium substrate 3 fabricated in this manner and the chlorosilane surface active agent B, a monomolecular recording layer was formed reactively on the surface of the medium substrate by the same chemisorptive method as in Working Example 1. Thus, a write-once optical recording medium was fabricated.

Then, the optical recording medium was rotated, and first polarized reaction light, whose polarization direction was substantially parallel to the rotation direction of the medium substrate, and which had a wavelength of 365 nm (i-line of a super-high pressure mercury lamp), a spot diameter of 1 μm, and an intensity of 400 mJ/cm$^2$, was irradiated in dots from a substantially perpendicular direction onto the medium substrate surface to format the recording layer.

Then, examining the surface of the write-once optical recording medium with the microscopic FT-IR showed that the dots were aligned in groups of concentric circles, and the chemisorptive molecules in the recording dots were oriented substantially parallel to the rotation direction of the medium substrate.

Furthermore, the orientation direction of the recorded dots did not change when they were irradiated with second polarized reaction recording light having a different polarization direction than the first polarized reaction recording light. Also, when irradiating the dots with destructive unpolarized recording light with an intensity of 4 J/cm$^2$, a portion of the chemisorptive molecules constituting the recording layer was destroyed, leading to a random state.

Irradiating first polarized recording light or first unpolarized recording light with a spot diameter of 0.8 μm onto a write-once optical recording medium of 5.25 inch diameter fabricated as described above, it was possible to record 5 gigabytes of information. Furthermore, when the recording layer was provided on both sides, 10 gigabytes of information could be recorded.

This Working Example has been explained for the case that a silane-based surface active agent B is used as the chemisorptive molecules constituting the recording layer, but it was also possible to manufacture a similar write-once optical recording medium using the chemisorptive molecules described in Working Example 2. Furthermore, when the photoreactive functional groups were chalcone backbone groups, cinnamate backbone groups or diacetylene backbone groups, polymerization or crosslinking with low energy exposure and high efficiency was possible.

Working Example 5

Figure 32:
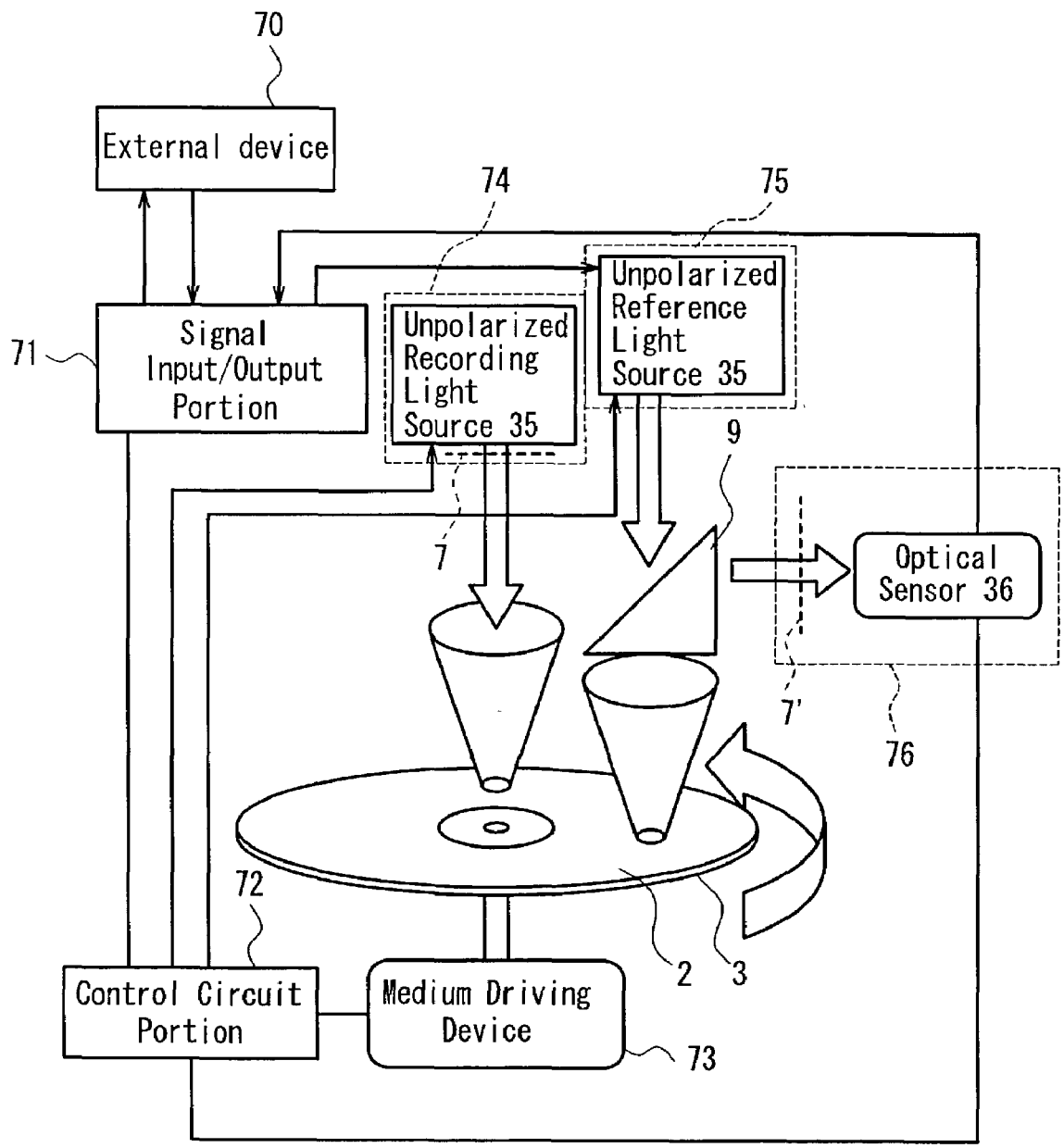
FIG. 32 is a schematic diagram illustrating an erasable information recording/reproducing device in accordance with Working Example 5 of the present invention.

An information recording/reproducing device for recording/reproducing a disk-shaped erasable optical recording medium 3 having a recording layer 2 prepared as in Working Example 3 was fabricated. As shown in FIG. 32, the information recording/reproducing device is provided with a recording light emission portion 74 including a polarizer 7, one unpolarized light source 35, and a shiftable polarization plate driving device; a reference light emission portion 75 including one unpolarized light source; an information element detecting portion 76 including an analyzer 7' receiving light from a beam splitter 9, and one optical sensor 36; a medium driving device 73 for rotatively driving the erasable optical recording medium 3; a position control driving circuit portion 72 including a light emission portion driving device for shifting the recording light emission portion and the reference light emission portion in the radial direction of the optical recording medium; an optical recording medium control circuit portion; and a signal input/output portion 71. Numeral 70 denotes an external device.

In Working Example 5 as well as in Working Examples 5 to 10, dot-shaped focused light is used as the recording light and the reference light, and the dot-shaped regions irradiated with recording light (referred to as "recording dots" in the following) are taken as information recording unit regions.

Here, the orientation of the chemisorptive molecules in the monomolecular recording layer constituting the recording dots was first initialized to a random state. For writing, polarized or unpolarized recording light of 254 nm wavelength and focused to a diameter of about 1.2 μm was irradiated at 500 mJ/cm$^2$ onto the recording layer in accordance with a digital signal while rotating the optical recording medium, thus forming recording dots in which the chemisorptive molecules are in a predetermined orientation state (predetermined orientation regions) and in a random state (random regions).

Next, reference light of 530 nm wavelength and focused to a diameter of about 1 μm was irradiated at 200 mJ/cm2 onto the recording dots, and after passing through the recording layer, the light reflected by the optically reflective film was picked up with the optical sensor to confirm whether the chemisorptive molecules in the recording dots are oriented or not (i.e., whether they are in a random state). That is to say, the information elements were specified by detecting the intensity difference of light reflected by the optically reflective film, which depends on whether the chemisorptive molecules in the dots are in a specific predetermined state or in a random state. The information could be reproduced by performing this specification of information elements sequentially for each of the recording dots. In order to reduce discrepancies in the precision with which the optical irradiation is positioned, and reading errors with the optical sensor, in other words to improve the reading precision, it was very effective to make the spot diameter of the reading light smaller than the spot diameter of the writing light.

As for the deletion of information once it has been recorded, the initialization state could be recreated by irradiating unpolarized recording light onto the recording dots at 500 mJ/cm$^2$ to change the chemisorptive molecules constituting the recording dots to a random state. Furthermore, writing a second time was possible by irradiating polarized recording light on the recording dots that have been reinitialized. That is to say, it was possible to realize an erasable information recording/reproducing device, the information on which can be deleted.

Furthermore, by irradiating polarized or unpolarized recording light on each dot in accordance with a digital signal, it was also possible to rewrite by overwriting without going through the above-described deleting of information.

In the recording layer of the erasable optical recording medium used in this Working Example 5, the chemisorptive molecules constituting the recording layer were fixed by covalent bonding with the surface of the medium substrate, so that no exfoliation or damage occurred even after thousands of reading operations.

In the foregoing, a recording light emission portion having one unpolarized recording light source and a shiftable polarizer capable of emitting polarized recording light and unpolarized recording light was used, but it was also possible to perform writing, reading and rewriting with an information recording/reproducing device using a recording light emission portion provided separately with an unpolarized light source for polarized recording light and an unpolarized light source for unpolarized recording light and emitting polarized or unpolarized recording light by turning the unpolarized recording light sources on or off.

Furthermore, in the above-described working example, a reference light emission portion having one unpolarized reference light source and emitting unpolarized reference light was used, but it was also possible to perform writing, reading and rewriting with an information recording/reproducing device using a reference light emission portion for emitting unpolarized reference light, that has one unpolarized reference light source and a polarizer arranged in the optical path of the light emitted from the unpolarized light source, and whose transmission axis is set to a predetermined direction.

Furthermore, in the above-described working example, an information recording/reproducing device provided with an information element detecting portion including an optical sensor was used, but it was also possible to perform writing, reading and rewriting with an information recording/reproducing device provided with a reference light emission portion having an optical sensor and an analyzer arranged in the optical path of the light entering the optical sensor, and whose transmission axis is set to a predetermined direction.

Furthermore, in the above-described working example, an information recording/reproducing device provided with an information element detecting portion including an optical sensor and a reference light emission portion having one unpolarized reference light source was used, but it was also possible to perform writing, reading and rewriting with an information recording/reproducing device provided with a reference light emission portion for emitting unpolarized reference light having one unpolarized reference light source and a polarizer, and an information element detecting portion having an optical sensor and an analyzer that is arranged in the optical path of the light entering the optical sensor, and whose transmission axis is set to a predetermined direction.

In information recording/reproducing devices having a polarizer in the information element detecting portion, assuming that the transmission axis of the analyzer is not influenced by the recording layer and that the polarized recording light is guided over the same route to the analyzer as the reference light, read-out with the best sensitivity was possible when the transmission axis of the analyzer was perpendicular to the propagation direction of this virtual polarized recording light and parallel or perpendicular to the polarization direction of this virtual polarized recording light.

Working Example 6

Writing, reading and rewriting was also possible with an information recording/reproducing device similar to the information recording/reproducing devices described in Working Example 5, except that it was provided with an erasable optical recording medium in which the recording dots were initialized to a predetermined orientation state by irradiating recording light with a spot diameter of 1.2 μm at 450 mJ/cm$^2$ onto an erasable optical recording medium fabricated as in Working Example 3.

Furthermore, performing a draining orientation process to initialize the recording layer to a predetermined orientation state improved the writing and the reading precision. Furthermore, writing, reading and rewriting similarly was possible with an information recording/reproducing device using an erasable optical recording medium that was initialized to a predetermined orientation state by a rubbing process.

Working Example 7

An information recording/reproducing device was fabricated including an information storage portion having a disk-shaped erasable optical recording medium 11 as produced in Working Example 3; a recording light emission portion having one unpolarized reference light source, two shiftable polarizers whose transmission axes are set to different directions, and a driving device for selectively arranging one of the two shiftable polarizers in the optical path of the light emitted from the unpolarized light source; a reference light emission portion having one unpolarized reference light source, and a polarizer that is arranged in the optical path of the light emitted from the unpolarized light source and whose transmission axis is set to a predetermined direction; an information element detecting portion having an optical sensor; a position control driving circuit portion having a medium driving device for rotatively driving the erasable optical recording medium and a light emission portion driving device for shifting the recording light emission portion and the reference light emission portion in the radial direction across the optical recording medium; an optical recording medium control circuit portion; and a signal input/output portion.

Here, the orientation of the chemisorptive molecules in the monomolecular recording layer constituting the recording dots was first initialized to a random state. For writing, first polarized recording light or second polarized recording light with different polarization directions of 254 nm wavelength and focused to a diameter of about 1.2 µm was irradiated at 500 mJ/cm$^2$ in spots in accordance with a digital signal while rotating the optical recording medium, thus forming recording dots in which the chemisorptive molecules are in a first predetermined orientation state or in a second predetermined orientation state.

Next, reference light of 530 nm wavelength and focused to a diameter of about 1 µm was irradiated at about 200 mJ/cm$^2$ onto the recording dots, and after passing through the recording layer, the light reflected by the optically reflective film was further passed through the analyzer and picked up with the optical sensor to confirm the orientation of the chemisorptive molecules in the recording dots. That is to say, the information elements were specified by detecting the differences in the intensity distribution of the polarized light components reflected by the optically reflective film, which depend on whether the chemisorptive molecules in the dots are in the first predetermined orientation state or in the second predetermined orientation state. The information could be reproduced by performing this specification of information elements sequentially for each of the recording dots. In order to reduce discrepancies in the precision with which the optical irradiation is positioned, and reading errors with the optical sensor, in other words to improve the reading precision, it was very effective to make the spot diameter of the reading light smaller than the spot diameter of the writing light.

As for the deletion of information once it has been recorded, the initialization state could be recreated by irradiating unpolarized recording light onto the recording dots at 500 mJ/cm$^2$ to change the chemisorptive molecules constituting the recording dots to a random state. Furthermore, writing a second time was possible by irradiating polarized recording light on the recording dots that have been reinitialized. That is to say, it was possible to realize an erasable information recording/reproducing device, the information on which can be deleted.

Furthermore, it was also possible to delete information in practice by irradiating the first polarized recording light or the second polarized recording light on all recording dots in the region to be erased. It moreover was possible to delete information in practice by irradiating recording light with a polarization direction that was different from that of the first polarized recording light and the second polarized recording light to change them to an orientation different from the first predetermined orientation state and the second predetermined orientation state.

Furthermore, by irradiating first or second polarized recording light on each recording dot in accordance with a digital signal, it was also possible to rewrite by overwriting without going through the above-described deleting of information.

Furthermore, the reading of information with high sensitivity and precision was possible by setting the polarization direction of the first polarized recording light to be perpendicular to the polarization direction of the second polarized recording light.

In the recording layer of the erasable optical recording medium used in this Working Example 6, the chemisorptive molecules constituting the recording film were fixed by covalent bonding with the surface of the medium substrate, and depend only on the polarization direction of the irradiated polarized light, so that no exfoliation or damage occurred even after thousands of reading operations.

In the foregoing, a recording light emission portion has one unpolarized reference light source, two shiftable polarizers whose transmission axes are set to different predetermined directions, and a driving device for selectively arranging one of the two shiftable polarizers in the optical path of light emitted from the unpolarized light source. But it was also possible to perform writing, reading and rewriting with an information recording/reproducing device using a recording light emission portion provided separately with an unpolarized light source for first polarized recording light, and a polarizer and an unpolarized light source for second polarized recording light and emitting polarized or unpolarized recording light by turning the unpolarized recording light sources on or off.

Furthermore, in the above-described working example, an information element detecting portion was used that is provided with an optical sensor and a reference light emission portion having one unpolarized reference light source and a polarizer that is arranged in the optical path of the light emitted from this unpolarized reference light source and whose transmission axis is set in a predetermined direction. But it was also possible to perform writing, reading and rewriting with an information recording/reproducing device using a reference light emission portion having one unpolarized reference light source and emitting unpolarized reference light as well as an information element detecting portion having an optical sensor and an analyzer that is arranged in the optical path of the light entering the optical sensor and whose transmission axis is set in a predetermined direction.

Furthermore, in the above-described working example, an information element detecting portion including an optical sensor was used. But it was also possible to perform writing, reading and rewriting with an information recording/reproducing device provided with a reference light emission portion having an optical sensor information element detecting portion using a reference light emission portion having an optical sensor and an analyzer that is arranged in the optical path of the light entering the optical sensor and whose transmission axis is set in a predetermined direction.

Furthermore, in the above-described working example, an information element detecting portion having an optical sensor was used. But it was also possible to perform writing, reading and rewriting with an information recording/reproducing device using an information element detecting portion having an optical sensor and an analyzer that is arranged in the optical path of the light entering the optical sensor and whose transmission axis is set in a predetermined direction.

In information recording/reproducing devices having a polarizer in the information element detecting portion, assuming that the transmission axis of the analyzer is not influenced by the recording layer and that the polarized recording light is guided over the same route to the analyzer as the reference light, read-out with the best sensitivity was possible when the transmission axis of the analyzer was perpendicular to the propagation direction of this virtual polarized recording light and parallel or perpendicular to the polarization direction of this virtual polarized recording light.

Working Example 8

Writing, reading and rewriting was also possible with an information recording/reproducing device similar to the information recording/reproducing devices described in Working Example 7, except that it was provided with an erasable optical recording medium in which the recording dots were initialized to a predetermined orientation state by irradiating polarized recording light with a spot diameter of 1.2 µm at 450 mJ/cm² in recording dots onto an erasable optical recording medium fabricated as in Working Example 3.

Furthermore, performing a draining orientation process to initialize the recording layer to a predetermined orientation state improved the writing and the reading precision. Furthermore, writing, reading and rewriting was similarly possible with an information recording/reproducing device using an erasable optical recording medium that was initialized to a predetermined orientation state by a rubbing process.

Working Example 9

An information recording/reproducing device was fabricated including an information storage portion having a disk-shaped erasable optical recording medium 11 as produced in Working Example 3; a recording light emission portion having one unpolarized recording light source, a polarizer that is shiftable and pivotable or rotatable, and a driving device for moving the polarizer into or out of the optical path of light emitted from the unpolarized light source and pivoting or rotating the polarizer; a reference light emission portion having one unpolarized reference light source; an information element detecting portion having an optical sensor, an analyzer that is arranged in the optical path of the light entering the optical sensor and that is pivotable or rotatable, and a driving device for pivoting or rotating the analyzer; a position control driving circuit portion having a medium driving device for rotatively driving the erasable optical recording medium and a light emission portion driving device for shifting the recording light emission portion and the reference light emission portion in the radial direction across the optical recording medium; an optical recording medium control circuit portion; and a signal input/output portion.

Here, the orientation of the chemisorptive molecules in the monomolecular recording layer constituting the recording dots (information recording unit regions) first was initialized to a random state. For writing, polarized recording light with a polarization direction of 0°, 45° or 90°, a wavelength of 254 nm and focused to a spot diameter of about 1.2 µm was irradiated at 500 mJ/cm² in accordance with a digital signal while rotating the optical recording medium and the polarization plate, thus forming recording dots in which the chemisorptive molecules are in a predetermined orientation of 0°, recording dots in which the chemisorptive molecules are in a predetermined orientation of 45°, and recording dots in which the chemisorptive molecules are in a predetermined orientation of 90°. That is to say, a ternary recording taking a predetermined orientation of 0°, a predetermined orientation of 45°, and a predetermined orientation of 90° as the information elements was achieved.

Next, reference light of 530 nm wavelength and focused to a spot diameter of about 1 µm was irradiated at about 200 mJ/cm² onto the recording dots, and after passing through the recording layer, the light reflected by the optically reflective film was picked up with the optical sensor to confirm the orientation of the chemisorptive molecules in the recording dots. That is to say, the information elements were specified by detecting the differences in the intensity distribution of the polarized light components reflected by the optically reflective film, which depend on the orientation direction of the chemisorptive molecules in the dots. The information could be reproduced by performing this specification of information elements sequentially for each of the recording dots.

In order to reduce discrepancies in the precision with which the optical irradiation is positioned, and reading errors with the optical sensor, in other words to improve the reading precision, it was very effective to make the spot diameter of the reading light smaller than the spot diameter of the writing light.

As for the deletion of information once it has been recorded, the initialization state could be recreated by irradiating unpolarized recording light onto the recording dots at 500 mJ/cm² to change the chemisorptive molecules constituting the recording dots to a random state. Furthermore, writing a second time was possible by irradiating polarized recording light on the recording dots that have been reinitialized. That is to say, it was possible to realize an erasable information recording/reproducing device, the information on which can be deleted.

Furthermore, by irradiating first polarized recording light, second polarized recording light or third polarized recording light on each dot in accordance with a new digital signal, it was also possible to rewrite by overwriting without going through the above-described deleting of information.

In the recording layer of the erasable optical recording medium used in this working example, the chemisorptive molecules constituting the recording film were fixed by covalent bonding with the surface of the medium substrate, so that no exfoliation or damage occurred even after thousands of reading operations.

In the working example, an information element detecting portion is used that has an optical sensor, an analyzer that is arranged in the optical path of the light entering the optical sensor and that is pivotable or rotatable, and a driving device for pivoting or rotating the analyzer. But it was also possible to write, read and rewrite information with an information recording/reproducing device using an information element detecting portion having an optical sensor, a plurality of shiftable analyzers whose transmission axes are fixed in different predetermined directions, and a driving device for selectively shifting one of the plurality of analyzers into the optical path of the light entering the optical sensor.

Furthermore, in this working example, a reference light emission portion having one unpolarized reference light source and an information element detecting portion having an optical sensor, an analyzer that is arranged in the optical path of the light entering the optical sensor and that is pivotable or rotatable, and a driving device for pivoting or rotating the analyzer were used. But it was also possible to write, read and rewrite information with an information recording/reproducing device using a reference light emission portion having one unpolarized reference light source, a pivotable or rotatable polarizer arranged in the optical path of the light emitted from the unpolarized light source, and a driving device for pivoting or rotating the polarizer and sequentially setting the transmission axis of the polarizer to a plurality of predetermined orientations, as well as an information element detecting portion having an optical sensor.

Furthermore a smaller information recording/reproducing device could be fabricated by using the same pivotable or rotatable polarizer for the pivotable or rotatable polarizer of the recording light emission portion and the pivotable or rotatable polarizer of the reference light emission portion.

Working Example 10

Writing, reading and rewriting was also possible with an information recording/reproducing device similar to the information recording/reproducing devices described in Working Example 9, except that it was provided with an erasable optical recording medium in which the recording dots were initialized to a predetermined orientation state by irradiating polarized recording light with a spot diameter of 1.2 µm at 450 mJ/cm$^2$ onto an erasable optical recording medium fabricated as in Working Example 3.

Furthermore, performing a draining orientation process to initialize the recording layer to a predetermined orientation state improved the writing and the reading precision. Furthermore, writing, reading and rewriting was similarly possible with an information recording/reproducing device using an erasable optical recording medium that was initialized to a predetermined orientation state by a rubbing process.

Working Example 11

An information recording/reproducing device was fabricated including an information storage portion having a disk-shaped write-once optical recording medium 11 as produced in Working Example 4; a recording light emission portion having one unpolarized recording light source and a polarizer; a reference light emission portion having one unpolarized reference light source; an information element detecting portion having one optical sensor; a position control driving circuit portion having a medium driving device for rotatively driving the write-once optical recording medium and a light emission portion driving device for shifting the recording light emission portion and the reference light emission portion in the radial direction across the optical recording medium; a control circuit portion; and a signal input/output portion.

Here, the orientation of the chemisorptive molecules in the monomolecular recording layer constituting the recording dots (information recording unit regions) first was initialized to a random state. For writing, polarized reaction recording light with a wavelength of 365 nm and focused to a diameter of about 1.2 µm was irradiated at 500 mJ/cm$^2$ in accordance with a digital signal while rotating the optical recording medium, thus forming recording dots in which the chemisorptive molecules are in a predetermined orientation state and recording dots in which the chemisorptive molecules are in a random state.

Next, reference light of 530 nm wavelength and focused to a diameter of about 1 µm was irradiated at about 200 mJ/cm$^2$ onto the recording dots, and after passing through the recording layer, the light reflected by the optically reflective film was picked up with the optical sensor to confirm the orientation of the chemisorptive molecules in the recording dots (i.e. whether it is in a random state or not). That is to say, the information elements were specified by detecting the differences in the intensity of the light reflected by the optically reflective film, which depends on whether the chemisorptive molecules in the dots are in a specified orientation state or in an unspecified random state. The information could be reproduced by performing this specification of information elements sequentially for each of the recording dots. In order to reduce discrepancies in the precision with which the optical irradiation is positioned, and reading errors with the optical sensor, in other words to improve the reading precision, it was very effective to make the spot diameter of the reading light smaller than the spot diameter of the writing light.

When unpolarized light with the same wavelength as the polarized reactive recording light was irradiated at 500 mJ/cm$^2$ onto the recording dots on which information elements have been written by irradiating polarized reactive recording light, the orientation of the recording dots did not change, and the random initialization state could not be recreated. That is to say, a write-once information recording/reproducing device that could not be deleted was achieved. Furthermore, there was also no change in the orientation of the recording dots when irradiating second polarized reactive recording light of a different polarization direction.

The chemisorptive molecules constituting the recording layer of the write-once optical recording medium used in this working example are fixed by covalent bonding with the surface of the medium substrate, and the chemisorptive molecules constituting the recording dots are bonded to one another by polymerization or crosslinking, so that the recording layer is superior to the recording layer of an erasable optical recording medium with respect to recording permanency and resistance against exfoliation and damage, and did not deteriorate even after tens of thousands of reading operations.

Furthermore, in this working example, a reference light emission portion having one unpolarized reference light source and emitting unpolarized reference light was used. But it was also possible to perform writing and reading with an information recording/reproducing device using a reference light emission portion for emitting unpolarized reference light, that has one unpolarized reference light source and a polarizer arranged in the optical path of the light emitted from the unpolarized light source, and whose transmission axis is set to a predetermined direction.

Furthermore, in this working example, an information element detecting portion including an optical sensor was used, but it was also possible to perform writing and reading with an information recording/reproducing device using a reference light emission portion having an optical sensor and an analyzer arranged in the optical path of the light entering the optical sensor, and whose transmission axis is set to a predetermined direction.

Furthermore, in this working example, an information element detecting portion including an optical sensor and a reference light emission portion having one unpolarized reference light portion was used, but it was also possible to perform writing and reading with an information recording/reproducing device using a reference light emission portion for emitting unpolarized reference light having one unpolarized reference light source and a polarizer, and an information element detecting portion having an optical sensor and an analyzer that is arranged in the optical path of the light entering the optical sensor, and whose transmission axis is set to a predetermined direction.

In information recording/reproducing devices having a polarizer in the information element detecting portion, assuming that the direction of the transmission axis of the analyzer is not influenced by the recording layer and that the polarized recording light is guided over the same route to the analyzer as the reference light, read-out with the best sensitivity was possible when the transmission axis of the analyzer was perpendicular to the propagation direction of this virtual polarized recording light and parallel or perpendicular to the polarization direction of this virtual polarized recording light.

Working Example 12

An information recording/reproducing device was fabricated including an information storage portion having a disk-shaped write-once optical recording medium 11 as produced in Working Example 4 whose recording dots have been initialized to a predetermined fixed orientation state by irradiating polarized recording light at 450 mJ/cm$^2$ onto spots focused to 1.2 μm; a recording light emission portion having one unpolarized recording light source; a reference light emission portion having one unpolarized reference light source; an information element detecting portion having one optical sensor; a position control driving circuit portion having a medium driving device for rotatively driving the write-once optical recording medium and a light emission portion driving device for shifting the recording light emission portion and the reference light emission portion in the radial direction across the optical recording medium; a control circuit portion; and a signal input/output portion.

The orientation state of the chemisorptive molecules in the monomolecular recording layer constituting the recording dots first was set to a predetermined fixed orientation state as an initial value, and then to carry out writing, recording dots in which the chemisorptive molecules are in a random state and recording dots in which the chemisorptive molecules are in the initialization orientation state (predetermined fixed orientation state) were formed by irradiating unpolarized recording light, which was turned on and off in accordance with a digital signal, with a spot diameter of 1.2 μm and 313 nm wavelength at a strong energy of 4 mJ/cm$^2$.

Next, reference light of 530 nm wavelength and focused to a diameter of about 1 μm was irradiated at about 200 mJ/cm$^2$ onto the recording dots, and after passing through the recording layer, the light reflected by the optically reflective film was picked up with the optical sensor to confirm the orientation of the chemisorptive molecules in the recording dots (i.e. whether it is in a random state or not). That is to say, the information elements were specified by detecting the differences in the intensity of the light reflected by the optically reflective film, which depends on whether the chemisorptive molecules in the dots are in a specified orientation state or in an unspecified random state. The information could be reproduced by performing this specification of information elements sequentially for each of the recording dots. In order to reduce discrepancies in the precision with which the optical irradiation is positioned, and reading errors with the optical sensor, in other words to improve the reading precision, it was very effective to make the spot diameter of the reading light smaller than the spot diameter of the writing light.

In this information recording/reproducing device, it was not possible to change the orientation state of the chemisorptive molecules constituting the recording dots to a random state by irradiating light (500 mJ/cm$^2$) whose irradiation energy was different from the recording light used for writing. That is to say, writing was not possible. It was further not possible to recreate the initialization state by irradiating recording light irradiated for initialization at 500 mJ/cm$^2$ onto the recording dots changed to the random state by irradiation with recording light. That is to say, a write-once information recording/reproducing device that could not be deleted was achieved.

Thus, that writing in a write-once fashion is possible is because the optically absorbing functional groups in the chemisorptive molecules constituting the recording layer of the optical recording medium are oriented in an orientation direction characteristic of the chemisorptive molecules and polymerized or crosslinked by irradiation with polarized reaction light at initialization, resulting in the fixing of the orientation of the chemisorptive molecules. It should be noted that the optical recording medium has better recording permanency than an erasable optical recording medium, and deterioration did not occur even after tens of thousands of reading operations.

Furthermore, in the above-described working example, a reference light emission portion having one unpolarized reference light source and emitting unpolarized reference light was used. But it was also possible to perform writing and reading with an information recording/reproducing device using a reference light emission portion for emitting unpolarized reference light, that has one unpolarized reference light source and a polarizer arranged in the optical path of the light emitted from the unpolarized light source, and whose transmission axis is set to a predetermined direction.

Furthermore, in the above-described working example, an information element detecting portion including an optical sensor was used. But it was also possible to perform writing and reading with an information recording/reproducing device using a reference light emission portion having an optical sensor and an analyzer arranged in the optical path of the light entering the optical sensor, and whose transmission axis is set to a predetermined direction.

Furthermore, in the above-described working example, an information element detecting portion including an optical sensor and a reference light emission portion having one unpolarized reference light portion was used. But it was also possible to perform writing and reading with an information recording/reproducing device using a reference light emission portion for emitting unpolarized reference light having one unpolarized reference light source and a polarizer, and an information element detecting portion having an optical sensor and an analyzer that is arranged in the optical path of the light entering the optical sensor, and whose transmission axis is set to a predetermined direction.

In information recording/reproducing devices having a polarizer in the information element detecting portion, assuming that the transmission axis of the analyzer is not influenced by the recording layer and that the polarized recording light is guided over the same route to the analyzer as the reference light, read-out with the best sensitivity was possible when the transmission axis of the analyzer was perpendicular to the propagation direction of this virtual polarized recording light and parallel or perpendicular to the polarization direction of this virtual polarized recording light.

Working Example 13

An information recording/reproducing device was fabricated including an information storage portion having a disk-shaped write-once optical recording medium 11 as produced in Working Example 4; a recording light emission portion having one unpolarized recording light source, two shiftable polarizers whose transmission axes have been set to different directions, and a driving device for selectively arranging one of the two shiftable polarizers in the optical path of the light emitted from the unpolarized light source; a reference light emission portion having one unpolarized reference light source and a polarizer arranged in the optical path of the light emitted from the unpolarized light source and whose transmission axis has been set to a predetermined direction; an information element detecting portion having an optical sensor; a position control driving circuit portion having a medium driving device for rotatively driving the write-once optical recording medium and a light emission portion driving device for shifting the recording light emission portion and the reference light emission portion in the radial direction across the optical recording medium; an optical recording medium control circuit portion; and a signal input/output portion.

The orientation of the chemisorptive molecules in the monomolecular recording layer constituting the recording dots first was set to a random state as the initial value, and then, to carry out writing, recording dots in which the chemisorptive molecules are in a first predetermined fixed orientation state and recording dots in which the chemisorptive molecules are in a second predetermined fixed orientation state were formed by irradiating first polarized reaction recording light and second polarized reaction recording light of different orientations with a diameter of 1.2 µm and 313 nm wavelength at 500 mJ/cm$^2$, in accordance with a digital signal, while rotating the optical recording medium.

Next, reference light of 530 nm wavelength and focused to a diameter of about 1 µm was irradiated at about 200 mJ/cm$^2$ onto the recording dots, and after passing through the recording layer, the light reflected by the optically reflective film and further passed through the analyzer was picked up with the optical sensor to confirm the orientation of the chemisorptive molecules in the recording dots. That is to say, the information elements were specified by detecting the differences in the intensity distribution of the polarized light reflected by the optically reflective film, which depends on whether the chemisorptive molecules in the dots are in the first predetermined fixed orientation state or in the second predetermined fixed orientation state. The information could be reproduced by performing this specification of information elements sequentially for each of the recording dots.

In order to reduce discrepancies in the precision with which the optical irradiation is positioned, and reading errors with the optical sensor, in other words to improve the reading precision, it was very effective to make the spot diameter of the reference light smaller than the spot diameter of the recording light. Furthermore, information could be read out with high sensitivity and precision when the polarization direction of the first polarized recording reaction light and the polarization direction of the second polarized recording reaction light were set to be perpendicular to one another.

The chemisorptive molecules constituting the recording layer of the write-once optical recording medium used in this working example are fixed by covalent bonding with the surface of the medium substrate, and the chemisorptive molecules constituting the recording dots are bonded to one another by polymerization or crosslinking, so that the recording layer is superior to the recording layer of an erasable optical recording medium with respect to recording permanency and resistance against exfoliation and damage, and did not deteriorate even after tens of thousands of reading operations.

In the foregoing, a recording light emission portion having one unpolarized reference light source, two shiftable polarizers whose transmission axes are set to different predetermined directions, and a driving device for selectively arranging one of the two shiftable polarizers in the optical path of light emitted from the unpolarized light source. But it was also possible to perform writing, reading and rewriting with an information recording/reproducing device using a recording light emission portion provided separately with an unpolarized light source for first polarized recording light, and a polarizer and an unpolarized light source for second polarized recording light and emitting polarized or unpolarized recording light by turning the unpolarized recording light sources on or off.

Furthermore, in this working example, an information element detecting portion was used that is provided with an optical sensor and a reference light emission portion having one unpolarized reference light source and a polarizer that is arranged in the optical path of the light emitted from this unpolarized reference light source and whose transmission axis is set in a predetermined direction. But it was also possible to perform writing, reading and rewriting with an information recording/reproducing device using a reference light emission portion having one unpolarized reference light source and emitting unpolarized reference light as well as an information element detecting portion having an optical sensor and an analyzer that is arranged in the optical path of the light entering the optical sensor and whose transmission axis is set in a predetermined direction.

Furthermore, in this working example, an information element detecting portion including an optical sensor was used. But it was also possible to perform writing, reading and rewriting with an information recording/reproducing device provided with a reference light emission portion having an optical sensor information element detecting portion using a reference light emission portion having an optical sensor and an analyzer that is arranged in the optical path of the light entering the optical sensor and whose transmission axis is set in a predetermined direction.

Furthermore, in this working example, an information element detecting portion having an optical sensor was used. But it was also possible to perform writing, reading and rewriting with an information recording/reproducing device using an information element detecting portion having an optical sensor and an analyzer that is arranged in the optical path of the light entering the optical sensor and whose transmission axis is set in a predetermined direction.

In information recording/reproducing devices having a polarizer in the information element detecting portion, assuming that the transmission axis of the analyzer is not influenced by the recording layer and that the polarized recording light is guided over the same route to the analyzer as the reference light, read-out with the best sensitivity was possible when the transmission axis of the analyzer was perpendicular to the propagation direction of this virtual polarized recording light and parallel or perpendicular to the polarization direction of this virtual polarized recording light.

Working Example 14

Writing, reading and rewriting was also possible with an information recording/reproducing device similar to the information recording/reproducing devices described in Working Example 13, except that it was provided with a write-once optical recording medium in which the recording dots were initialized to a predetermined orientation state by subjecting the write-once optical recording medium fabricated as in Working Example 4 to a rubbing process.

Working Example 15

An information recording/reproducing device was fabricated including an information storage portion having a disk-shaped write-once optical recording medium 11 as produced in Working Example 4; a recording light emission portion having one unpolarized recording light source, a polarizer that is pivotable or rotatable, and a driving device for pivoting or rotating the polarizer; a reference light emission portion having one unpolarized reference light source; an information element detecting portion having an optical sensor, an analyzer that is arranged in the optical path of the light entering the optical sensor and that is pivotable or rotatable, and a driving device for pivoting or rotating the analyzer; a position control driving circuit portion having a medium driving device for rotatively driving the write-once optical recording medium and a light emission portion driving device for shifting the recording light emission portion and the reference light emission portion in the radial direction across the optical recording medium; an optical recording medium control circuit portion; and a signal input/output portion.

Here, the orientation of the chemisorptive molecules in the monomolecular recording layer constituting the recording dots (information recording unit regions) first was initialized to a random state. For writing, polarized recording light with a polarization direction of 0°, 45° or 90°, a wavelength of 254 nm and focused to a spot diameter of about 1.2 μm was irradiated at 500 mJ/cm² in accordance with a digital signal while rotating the optical recording medium and the polarization plate, thus forming recording dots in which the chemisorptive molecules are in a predetermined fixed orientation of 0°, recording dots in which the chemisorptive molecules are in a predetermined fixed orientation of 45°, and recording dots in which the chemisorptive molecules are in a predetermined fixed orientation of 90°. That is to say, a ternary recording taking a predetermined fixed orientation of 0°, a predetermined fixed orientation of 45°, and a predetermined fixed orientation of 90° as the information elements was achieved.

Next, reference light of 530 nm wavelength and focused to a spot diameter of about 1 μm was irradiated at about 200 mJ/cm² onto the recording dots, and after passing through the recording layer, the light reflected by the optically reflective film was picked up with the optical sensor to confirm the orientation of the chemisorptive molecules in the recording dots. That is to say, the information elements were specified by detecting the differences in the intensity distribution of the polarized light components reflected by the optically reflective film, which depend on the orientation direction of the chemisorptive molecules in the dots. The information could be reproduced by performing this specification of information elements sequentially for each of the recording dots.

In order to reduce discrepancies in the precision with which the optical irradiation is positioned, and reading errors with the optical sensor, in other words to improve the reading precision, it was very effective to make the spot diameter of the reading light smaller than the spot diameter of the writing light.

The chemisorptive molecules constituting the recording layer of the write-once optical recording medium used in this working example are fixed by covalent bonding with the surface of the medium substrate, and the chemisorptive molecules constituting the recording dots are bonded to one another by polymerization or crosslinking, so that the recording layer is superior to the recording layer of an erasable optical recording medium with respect to recording permanency and resistance against exfoliation and damage, and did not deteriorate even after tens of thousands of reading operations.

In this working example, an information element detecting portion including an optical sensor, a pivotable or rotatable polarizer arranged in the optical path of the light entering the optical sensor and a driving device for pivoting or rotating the polarizer was used. But it was also possible to write and read information with an information recording/reproducing device using an information element detecting portion having an optical sensor, a plurality of shiftable analyzers whose transmission axis are fixed to different predetermined direction, and a driving device for selectively arranging one of the plurality of analyzers in the optical path of the light entering the optical sensor.

Furthermore, in this working example, a reference light emission portion having one unpolarized light source and an information element detecting portion including an optical sensor, a pivotable or rotatable analyzer arranged in the optical path of the light entering the optical sensor, and a driving device for pivoting or rotating the analyzer were used. But it was also possible to perform writing, reading and rewriting with an information recording/reproducing device using a reference light emission portion for emitting unpolarized reference light having one unpolarized reference light source, a pivotable or rotatable polarizer that is arranged in the optical path of the light emitted from the unpolarized light source, and a driving device sequentially setting the transmission axis of the polarizer to a plurality of orientations by pivoting or rotating the polarizer, as well as an information element detecting portion having an optical sensor.

Furthermore a smaller information recording/reproducing device could be fabricated by using the same pivotable or rotatable polarizer for the pivotable or rotatable polarizer of the recording light emission portion and the pivotable or rotatable polarizer of the reference light emission portion.

Working Example 16

Writing, reading and rewriting was also possible with an information recording/reproducing device similar to the information recording/reproducing devices described in Working Example 9, except that it was provided with an erasable optical recording medium in which the recording dots were initialized to a predetermined orientation state by subjecting the write-once optical recording medium fabricated as in Working Example 3 to a rubbing process.

Working Example 17

An erasable computer system was provided with a personal computer including a communication control device and an arithmetic processing device having main memory; a keyboard serving as an input device; a monitor serving as an output device; and an information recording/reproducing device fabricated as in any of Working Examples 5 to 10 as an auxiliary storage device.

Working Example 18

Figure 33:
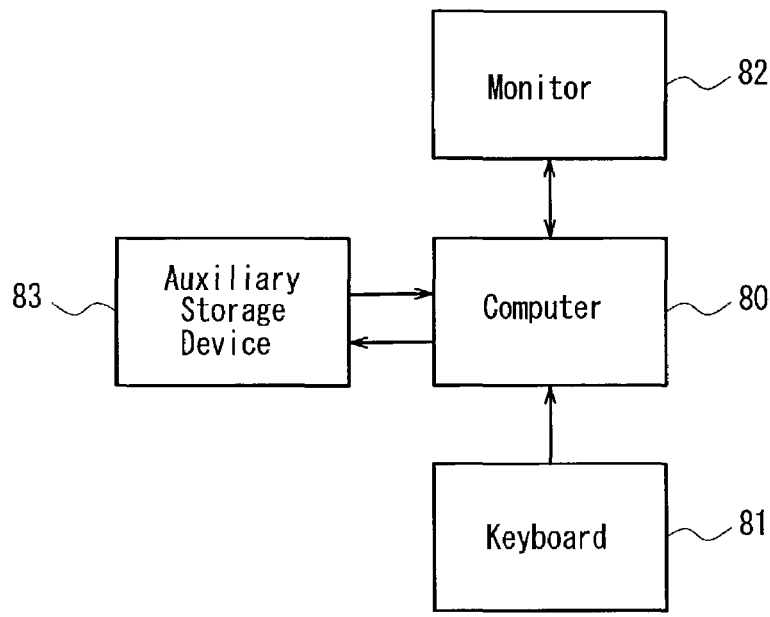
FIG. 33 is a flowchart for a computer system using an information recording/reproducing device with the optical recording medium according to Working Example 18 of the present invention as an auxiliary storage device.

As shown in FIG. 33, a write-once computer system was provided with a personal computer 80 including a communication control device and an arithmetic processing device having main memory; a keyboard 81 serving as an input device; a monitor 82 serving as an output device; and an information recording/reproducing device fabricated as in any of Working Examples 11 to 15 as an auxiliary storage device 83.

Working Example 19

Figure 34:
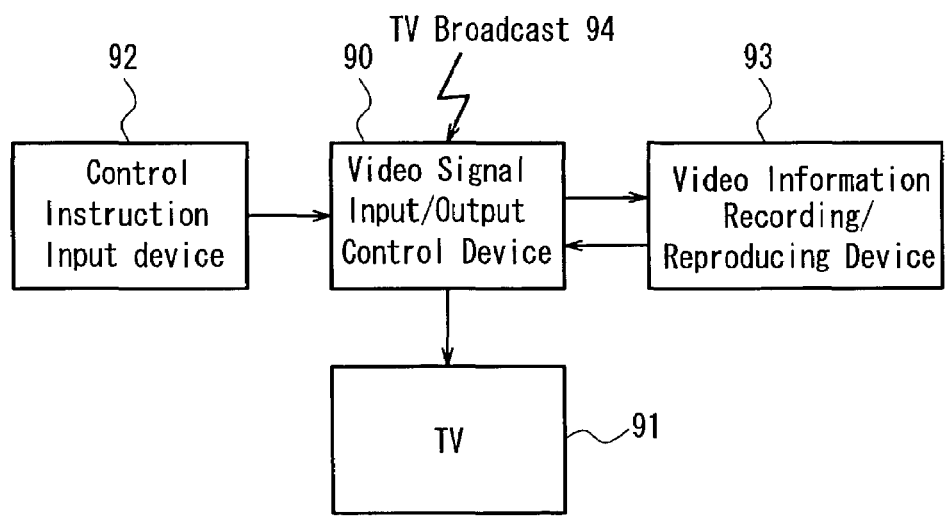
FIG. 34 is a flowchart for a video information recording/reproducing device according to Working Example 19 of the present invention.

As shown in FIG. 34, an erasable video information recording/reproducing system was provided with a video signal input/output control device 90 including a TV tuner for receiving signals from a TV broadcast 94; a control instruction input/output device 92; a TV monitor 91 serving as a video output device; and an information recording/reproducing device fabricated as in any of Working Examples 5 to 10, except that it includes 10 disk-shaped recording media serving as a video information recording/reproducing device 93.

The storage capacity of this system was about 100 gigabytes, and about 40 hours of TV broadcast could be recorded.

Working Example 20

A write-once video information recording/reproducing system was provided with a TV tuner as a video signal input/output control device; a control instruction input device; a monitor serving as a video output device; and an information recording/reproducing device fabricated as in any of Working Examples 5 to 10 as a video information recording/reproducing device 93.

The storage capacity of this system was about 100 gigabytes, and about 40 hours of TV broadcast could be recorded.

As explained in the foregoing, the present invention provides, at low cost, high-density erasable and write-once optical recording media on which an organic thin film is formed without necessitating vacuum vapor deposition for the formation of the recording layer. The present invention also provides an information recording/reproducing device for recording and reproducing information on an optical recording medium, as well as a computer system and a video information recording/reproducing device provided with an optical recording medium and an information recording/reproducing device.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. An optical recording film in form of a monomolecular layer, comprising chemisorptive molecules that are chemically bonded by covalent bonding to a surface of a substrate, wherein the optical recording film has the property that, when irradiated with polarized light, a long axis orientation of the chemisorptive molecules is changed to a direction in which the polarized light is irradiated.

2. The optical recording film according to claim 1, further having the property that the long axis orientation of the chemisorptive molecules is changed to a random direction when irradiated with unpolarized light.

3. The optical recording film according to claim 1, wherein the chemisorptive molecules constituting the optical recording film comprise straight-chain molecules.

4. The optical recording film according to claim 1, wherein the chemisorptive molecules constituting the optical recording film comprise an optically absorbing functional group that absorbs light of a certain wavelength.

5. The optical recording film according to claim 4, wherein the optically absorbing functional group is a UV light absorbing functional group that absorbs light of a wavelength in the UV region.

6. The optical recording film according to claim 5, wherein the UV light absorbing functional group is at least one functional group selected from aryl backbone groups, arylene backbone groups and carbonyl groups.

7. The optical recording film according to claim 1, wherein the chemisorptive molecules constituting the optical recording film further have the property that their long axis orientation can be fixed.

8. The optical recording medium according to claim 7, wherein the photoreactive functional group is a photopolymerizable functional group, and, when irradiated with polarized light, the long axis orientation of the chemisorptive molecules constituting the optical recording film is oriented in said specific direction, and the chemisorptive molecules are fixed in said specific direction by polymerizing or crosslinking with one another.

9. The optical recording film according to claim 8, wherein the photopolymerizable functional group is a UV polymerizable functional group that reacts under light of a wavelength in the UV region.

10. The optical recording film according to claim 9, wherein the UV polymerizable functional group is at least one backbone group selected from a chalcone backbone group, a cinnamate backbone group and a diacetylene backbone group.

11. The optical recording film according to claim 1, wherein the optical recording film is formed directly on the surface of the substrate.

12. The optical recording film according to claim 11, wherein the substrate is made of at least one selected from metal, ceramics, glass and synthetic resin.

13. The optical recording film according to claim 1, wherein a primer layer coating is formed on the surface of the substrate, and the optical recording film is formed on a surface of the primer layer coating.

14. An optical recording medium comprising an optical recording film in form of a monomolecular layer including chemisorptive molecules that are chemically bonded by covalent bonding to a surface of a medium substrate, wherein the optical recording film has the property that, when irradiated with polarized light, a long axis orientation of the chemisorptive molecules is changed to a direction in which the polarized light is irradiated.

15. The optical recording medium according to claim 14, further having the property that the long axis orientation of the chemisorptive molecules is changed to a random direction when irradiated with unpolarized light.

16. The optical recording medium according to claim 14, wherein the chemisorptive molecules constituting the optical recording film comprise straight-chain molecules.

17. The optical recording medium according to claim 14, wherein the chemisorptive molecules constituting the optical recording film comprise an optically absorbing functional group that absorbs light of a certain wavelength.

18. The optical recording medium according to claim 17, wherein the optically absorbing functional group is a UV light absorbing functional group that absorbs light of a wavelength in the UV region.

19. The optical recording medium according to claim 18, wherein the UV light absorbing functional group is at least one functional group selected from aryl backbone groups, arylene backbone groups and carbonyl groups.

20. The optical recording medium according to claim 14, wherein the chemisorptive molecules constituting the optical recording film further have the property that their long axis orientation can be fixed.

21. The optical recording medium according to claim 20, wherein the photoreactive functional group is a photopolymerizable functional group, and, when irradiated with polarized light, the long axis orientation of the chemisorptive molecules constituting the optical recording film is oriented in said specific direction, and the chemisorptive molecules are fixed in said specific direction by polymerizing or crosslinking with one another.

22. The optical recording medium according to claim 21, wherein the photopolymerizable functional group is a UV polymerizable functional group that reacts under light of a wavelength in the UV region.

23. The optical recording medium according to claim 22, wherein the UV polymerizable functional group is at least one backbone group selected from a chalcone backbone group, a cinnamoyl backbone group and a diacetylene backbone group.

24. The optical recording medium according to claim 14, wherein the optical recording film is formed directly on the surface of the substrate.

25. The optical recording medium according to claim 21, wherein the substrate is made of at least one selected from metal, ceramics, glass and synthetic resin.

26. The optical recording medium according to claim 14, wherein a primer layer coating is formed on the surface of the substrate, and the optical recording film is formed on a surface of the primer layer coating.

27. The optical recording medium according to claim 14, wherein the optical recording film includes a plurality of information recording unit regions into which one information element constituting a piece of information can be written by controlling the long axis orientation of the chemisorptive molecules.

28. The optical recording medium according to claim 14, wherein the optical recording film includes a plurality of information recording unit regions into which one information element constituting a piece of information can be written by controlling and fixing the long axis orientation of the chemisorptive molecules by irradiation with polarized light, and once an information element has been written, it cannot be rewritten into any other information element.

29. The optical recording medium according to claim 28, having the property that the fixed orientation regions on the recording film can be destroyed by irradiation of destructive light that destroys the fixed orientation structure, and once it has been destroyed, the fixed orientation structure cannot be reproduced.

30. The optical recording medium according to claim 29, wherein the fixed orientation regions comprise information recording unit regions into which one information element constituting a piece of information can be written by destroying the orientation of the chemisorptive molecules by irradiation with destructive light.

31. The optical recording medium according to claim 14, wherein the medium substrate is optically transmissive.

32. The optical recording medium according to claim 31, wherein the optically transmissive medium substrate is at least one selected from the group consisting of an optically transmissive base material, and a substrate comprising an optically transmissive base material and an optically transmissive coating provided on a surface thereof.

33. The optical recording medium according to claim 32, wherein the optically transmissive coating is at least one selected from the group of silica films and silicon nitride films.

34. The optical recording medium according to claim 14, wherein the medium substrate is an optically reflective medium substrate having optical reflectivity.

35. The optical recording medium according to claim 34, wherein the optically reflective medium substrate includes a metallic aluminum layer.

36. The optical recording medium according to claim 14, wherein the recording layer is formed on a front and a rear side of an optically reflective medium substrate.

37. The optical recording medium according to claim 14, wherein the medium substrate is at least one selected from a disk-shaped medium substrate, a tape-shaped medium substrate, and a card-shaped medium substrate.

38. The optical recording medium according to claim 37,
wherein the medium substrate is a disk-shaped medium substrate, and
wherein the information recording unit regions in the recording layer are arranged in groups of concentric circles or in a spiral shape on the medium substrate.

39. The optical recording medium according to claim 37,
wherein the medium substrate is a tape-shaped or a card-shaped medium substrate; and
wherein the information recording unit regions in the recording layer are arranged in parallel linear groups intersecting at a predetermined angle with a longitudinal direction of the medium substrate.

40. The optical recording medium according to claim 14, wherein all information recording unit regions of the recording layer are initialized to oriented regions in which the long axis orientation of the chemisorptive molecules is oriented.

* * * * *

UNITED STATES PATENT AND TRADEMARK OFFICE
CERTIFICATE OF CORRECTION

PATENT NO. : 7,078,083 B2  Page 1 of 1
APPLICATION NO. : 10/153150
DATED : July 18, 2006
INVENTOR(S) : Ogawa It is certified that error appears in the above-identified patent and that said Letters Patent is hereby corrected as shown below:

Title page second column, References Cited #56: --U.S. Patent 5,324,548, Ogawa et.al.,-- should have been included
Column 76, line 14(claim 8): "photoreactive functional group is" should read --chemisorptive molecules comprise--
Column 77, line 10(claim 21): "said" should read --a--
Column 77, line 25(claim 25): "claim 21" should read --claim 24--
Column 78, line 47(claim 40): "wherein all information" should read --wherein information--

Signed and Sealed this

Third Day of April, 2007

JON W. DUDAS
*Director of the United States Patent and Trademark Office*